US005257194A

United States Patent [19]

Sakita

[11] Patent Number: 5,257,194

[45] Date of Patent: Oct. 26, 1993

[54] HIGHWAY TRAFFIC SIGNAL LOCAL CONTROLLER

[75] Inventor: Masami Sakita, Menlo Park, Calif.

[73] Assignee: Mitsubishi Corporation, Tokyo, Japan

[21] Appl. No.: 694,013

[22] Filed: Apr. 30, 1991

[51] Int. Cl.$^5$ .............................................. G06F 15/48

[52] U.S. Cl. .................................. 364/436; 364/437; 340/911; 340/913; 340/917

[58] Field of Search ....................... 364/436, 437, 438; 340/911, 913, 914, 916, 917, 919, 924

[56] References Cited

U.S. PATENT DOCUMENTS

| | | | |
|---|---|---|---|
| 3,363,185 | 1/1988 | Sanderson et al. | 328/72 |
| 3,652,983 | 3/1972 | Endo et al. | 340/913 |
| 3,764,972 | 10/1973 | Siklos et al. | 340/35 |
| 3,764,973 | 10/1973 | Muramatu et al. | 340/40 |
| 3,828,307 | 8/1974 | Hungerford | 340/35 |
| 3,886,496 | 5/1975 | Spilo et al. | 340/41 R |
| 4,167,784 | 9/1979 | McReynolds et al. | 340/911 |
| 4,167,785 | 9/1979 | McReynolds et al. | 364/437 |
| 4,257,029 | 3/1981 | Stevens | 340/911 |
| 4,322,801 | 3/1982 | Williamson et al. | 364/436 |
| 4,323,970 | 4/1982 | Brunner et al. | 364/436 |
| 4,750,129 | 6/1988 | Hengstmengel et al. | 340/917 |
| 4,907,160 | 3/1990 | Duncan et al. | 364/436 |

OTHER PUBLICATIONS

Sakita, Masami, "Timing Design of Traffic Signals", Transporation Research Recond (No. 1069), Washington, D.C. 1986

*Primary Examiner*—Gary Chin

*Attorney, Agent, or Firm*—Victor R. Beckman

[57] ABSTRACT

A highway traffic control method is shown in which the control method (80) and phasing scheme (82) are defined and recall switches are set (84) every cycle of operation. In time-of-day control methods (FIGS. 14 and 15) timing parameters (86) also are defined every cycle, and common cycle length and planned offset are computed (90) at the local master controller (16). Offset deviation is measured (94) and used along with the computed cycle length for adjustment of the local signal timing (96). Following execution of signal control, the control method, phasing scheme and timing parameters are defined and recall switches set in preparation for the next cycle of operation. In the traffic-responsive method, traffic data from local detectors are obtained and processed (100) and, using this data, signal timing parameters are computed using linear programming (102). In the traffic-adaptive method (FIG. 20 ) real-time detector information is processed (226) and used for further adjustment of signal timing parameters (228). Inputs for the linear programming solution (114) include incoming and saturation flow rates (110) and data from a movement-phase matrix M (126) which defines the relationship between movements and phases. Matrix M is generated using data from a green-green conflict matrix G (128) which identifies conflicting traffic movement. Linear program constraints for less preferred movements (118) are made equalities to reduce the number of multiple solutions. Linear programming is used to obtain maximum, optimum, and minimum cycle lengths and green times. Provision is made for adjustment of linear program solutions if the solution is not acceptable (178, 192 and 206). If the linear program has no solution (172, 188 and 202) maximum, optimum and minimum cycle lengths and green times from time-of-day tables are used.

38 Claims, 28 Drawing Sheets

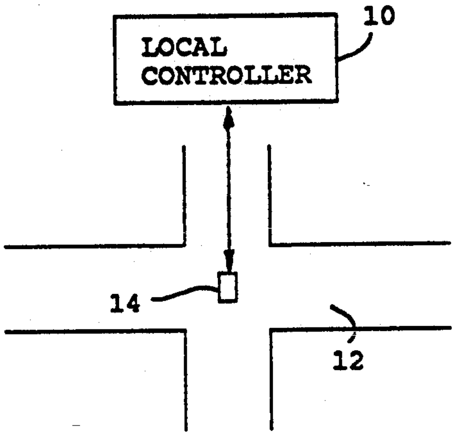
FIG. 1
FIG. 2
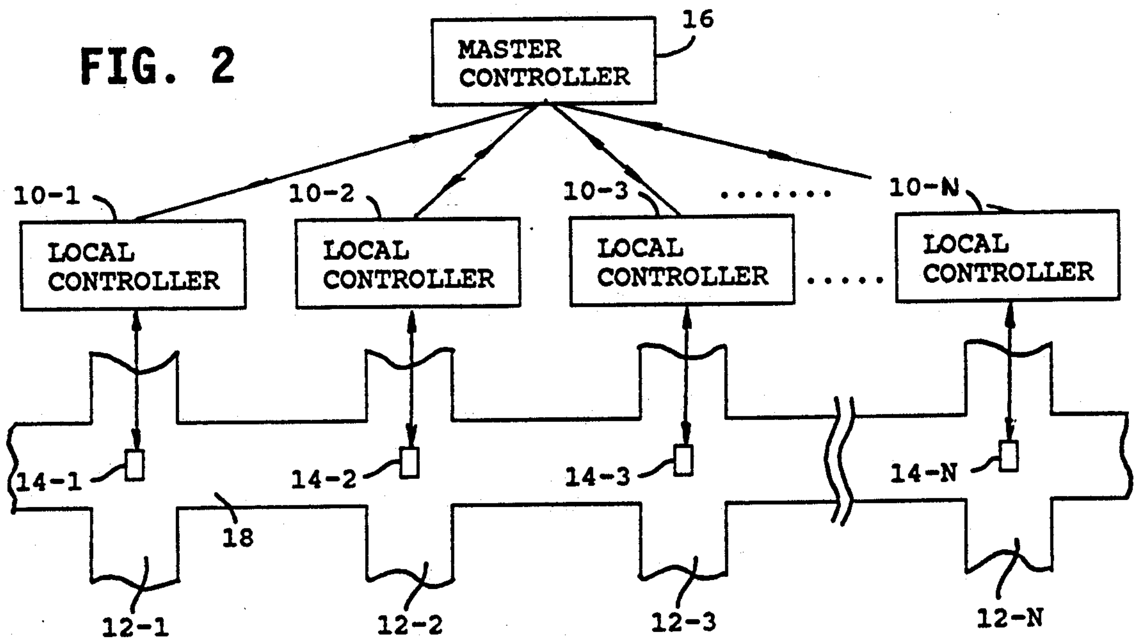

FIG. 3
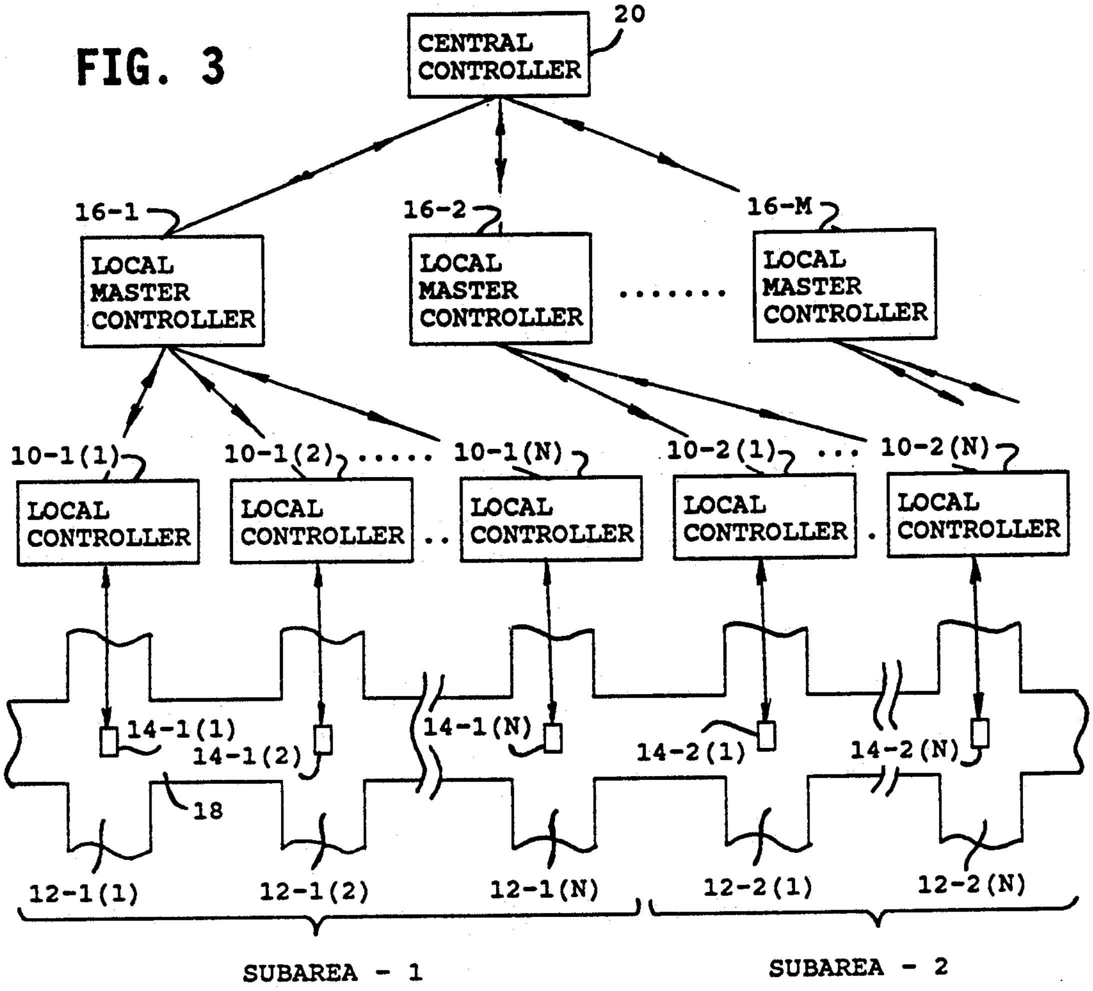
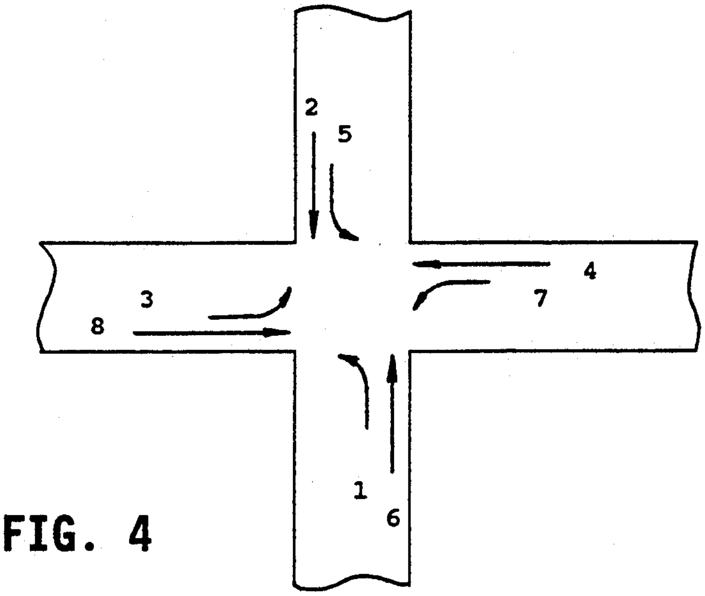
FIG. 4

FIG. 5
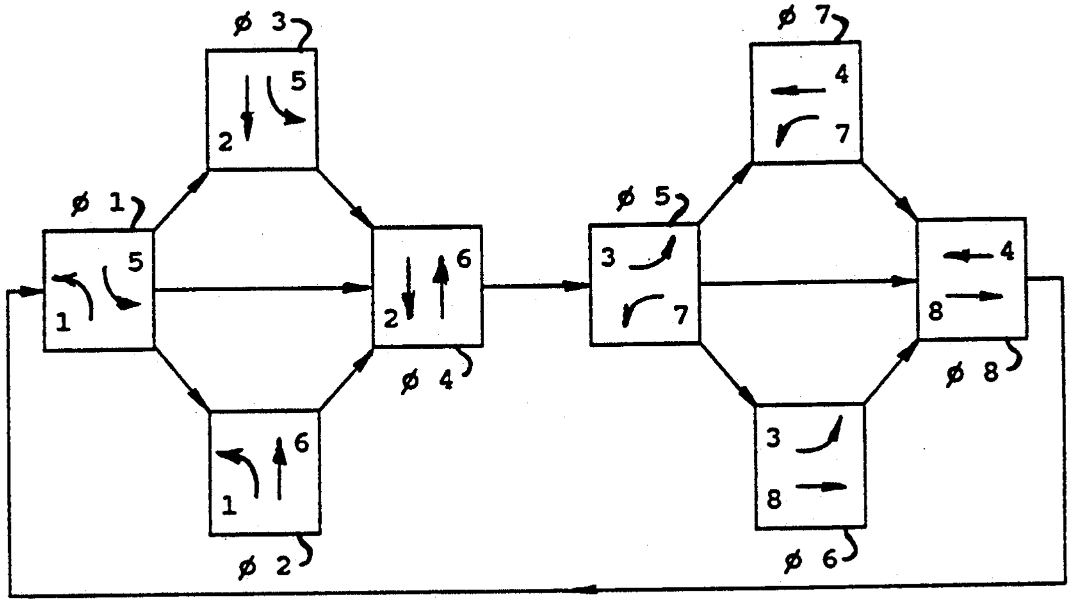
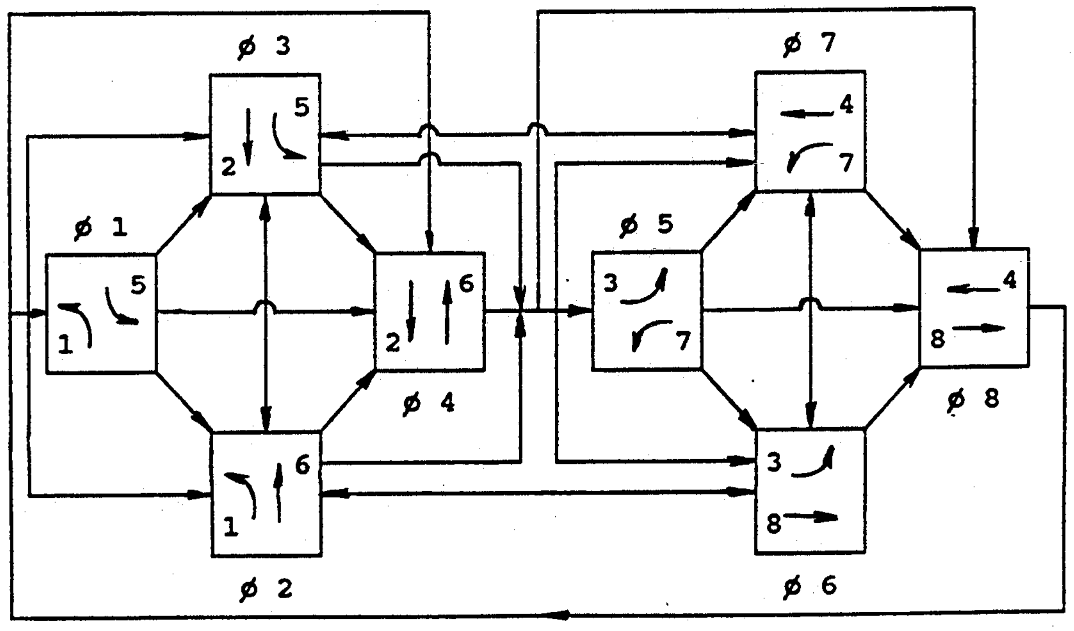
FIG. 6

FIG. 7
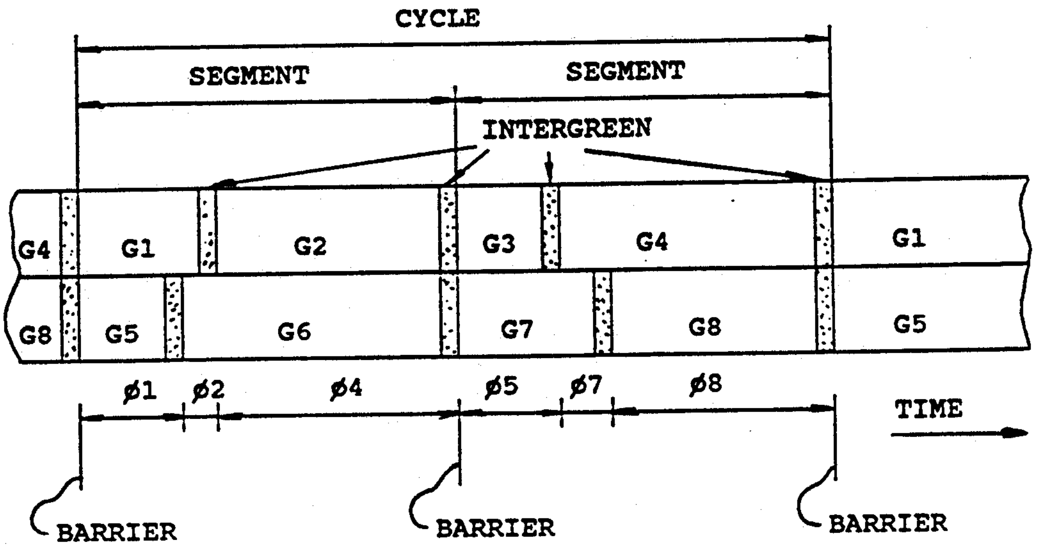
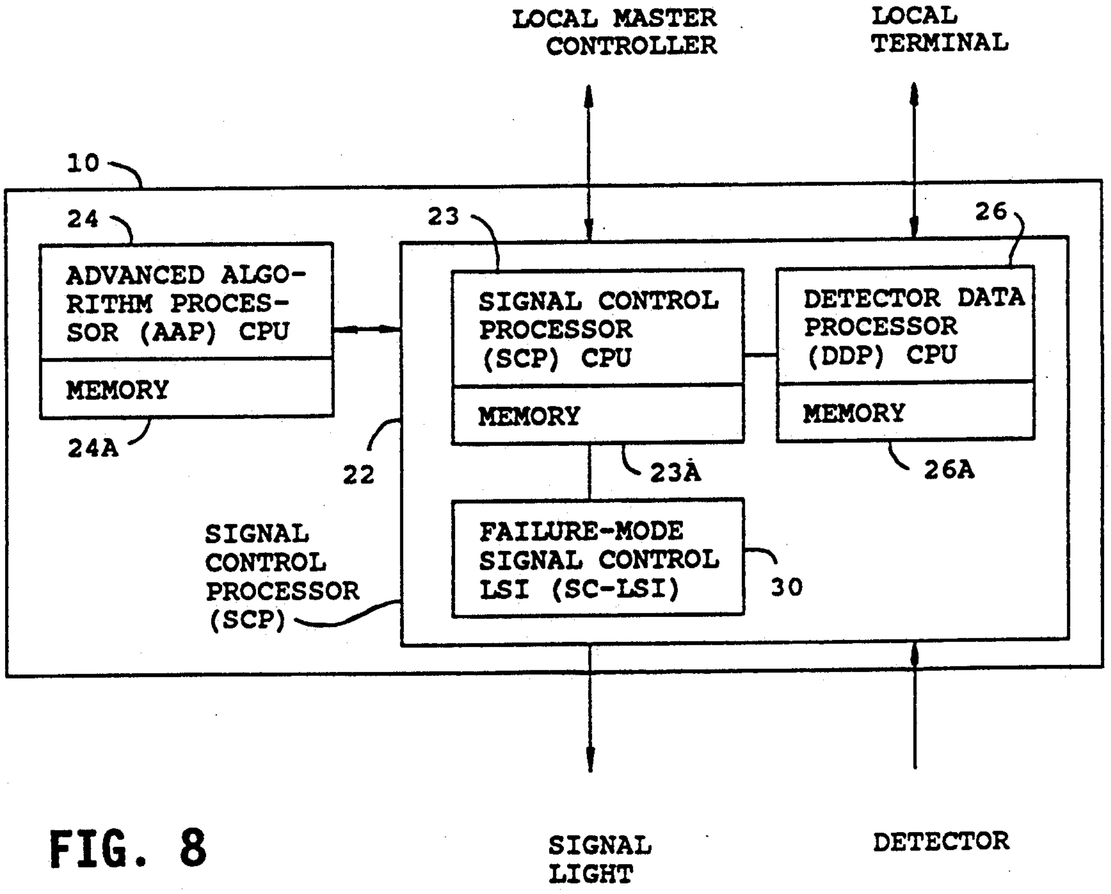
FIG. 8

TRANSITION MATRIX – P

TRAFFIC MOVEMENT (columns) / TRAFFIC MOVEMENT (rows)

| | 1 | 2 | 3 | 4 | 5 | 6 | 7 | 8 |
|---|---|---|---|---|---|---|---|---|
| 1 | 0 | 1 | 0 | 0 | 0 | 0 | 0 | 0 |
| 2 | 0 | 0 | 1 | 0 | 0 | 0 | 0 | 0 |
| 3 | 0 | 0 | 0 | 1 | 0 | 0 | 0 | 0 |
| 4 | 1 | 0 | 0 | 0 | 0 | 0 | 0 | 0 |
| 5 | 0 | 0 | 0 | 0 | 0 | 1 | 0 | 0 |
| 6 | 0 | 0 | 0 | 0 | 0 | 0 | 1 | 0 |
| 7 | 0 | 0 | 0 | 0 | 0 | 0 | 0 | 1 |
| 8 | 0 | 0 | 0 | 0 | 1 | 0 | 0 | 0 |

58

FIG. 11A

GREEN–GREEN
CONFLICT MATRIX – G

TRAFFIC MOVEMENT (columns) / TRAFFIC MOVEMENT (rows)

| | 1 | 2 | 3 | 4 | 5 | 6 | 7 | 8 |
|---|---|---|---|---|---|---|---|---|
| 1 | 0 | 0 | 0 | 0 | 1 | 1 | 0 | 0 |
| 2 | 0 | 0 | 0 | 0 | 1 | 1 | 0 | 0 |
| 3 | 0 | 0 | 0 | 0 | 0 | 0 | 1 | 1 |
| 4 | 0 | 0 | 0 | 0 | 0 | 0 | 1 | 1 |
| 5 | 1 | 1 | 0 | 0 | 0 | 0 | 0 | 0 |
| 6 | 1 | 1 | 0 | 0 | 0 | 0 | 0 | 0 |
| 7 | 0 | 0 | 1 | 1 | 0 | 0 | 0 | 0 |
| 8 | 0 | 0 | 1 | 1 | 0 | 0 | 0 | 0 |

60

FIG. 11B

MOVEMENT–PHASE MATRIX – M

SIGNAL PHASE (columns) / TRAFFIC MOVEMENT (rows) — 62

| | 1 | 2 | 3 | 4 | 5 | 6 | 7 | 8 |
|---|---|---|---|---|---|---|---|---|
| 1 | 1 | 1 | 0 | 0 | 0 | 0 | 0 | 0 |
| 2 | 0 | 0 | 1 | 1 | 0 | 0 | 0 | 0 |
| 3 | 0 | 0 | 0 | 0 | 1 | 1 | 0 | 0 |
| 4 | 0 | 0 | 0 | 0 | 0 | 0 | 1 | 1 |
| 5 | 1 | 0 | 1 | 0 | 0 | 0 | 0 | 0 |
| 6 | 0 | 1 | 0 | 1 | 0 | 0 | 0 | 0 |
| 7 | 0 | 0 | 0 | 0 | 1 | 0 | 1 | 0 |
| 8 | 0 | 0 | 0 | 0 | 0 | 1 | 0 | 1 |

FIG. 11C

SIMULTANEOUS GREEN MATRIX – Q

TRAFFIC MOVEMENT J (columns) / TRAFFIC MOVEMENT I (rows) — 64

| | 1 | 2 | 3 | 4 | 5 | 6 | 7 | 8 |
|---|---|---|---|---|---|---|---|---|
| 1 | 0 | 0 | 0 | 0 | 1 | 2 | 0 | 0 |
| 2 | 0 | 0 | 0 | 0 | 3 | 4 | 0 | 0 |
| 3 | 0 | 0 | 0 | 0 | 0 | 0 | 1 | 2 |
| 4 | 0 | 0 | 0 | 0 | 0 | 0 | 3 | 4 |
| 5 | 1 | 2 | 0 | 0 | 0 | 0 | 0 | 0 |
| 6 | 3 | 4 | 0 | 0 | 0 | 0 | 0 | 0 |
| 7 | 0 | 0 | 1 | 2 | 0 | 0 | 0 | 0 |
| 8 | 0 | 0 | 3 | 4 | 0 | 0 | 0 | 0 |

FIG. 11D

FIG. 22
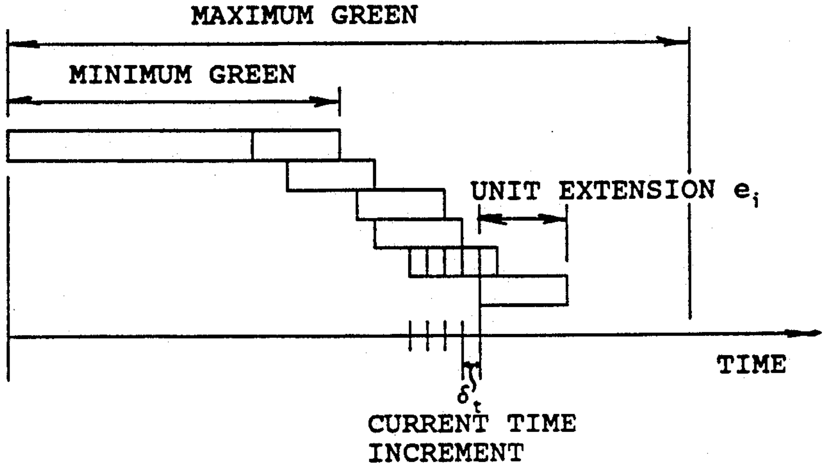
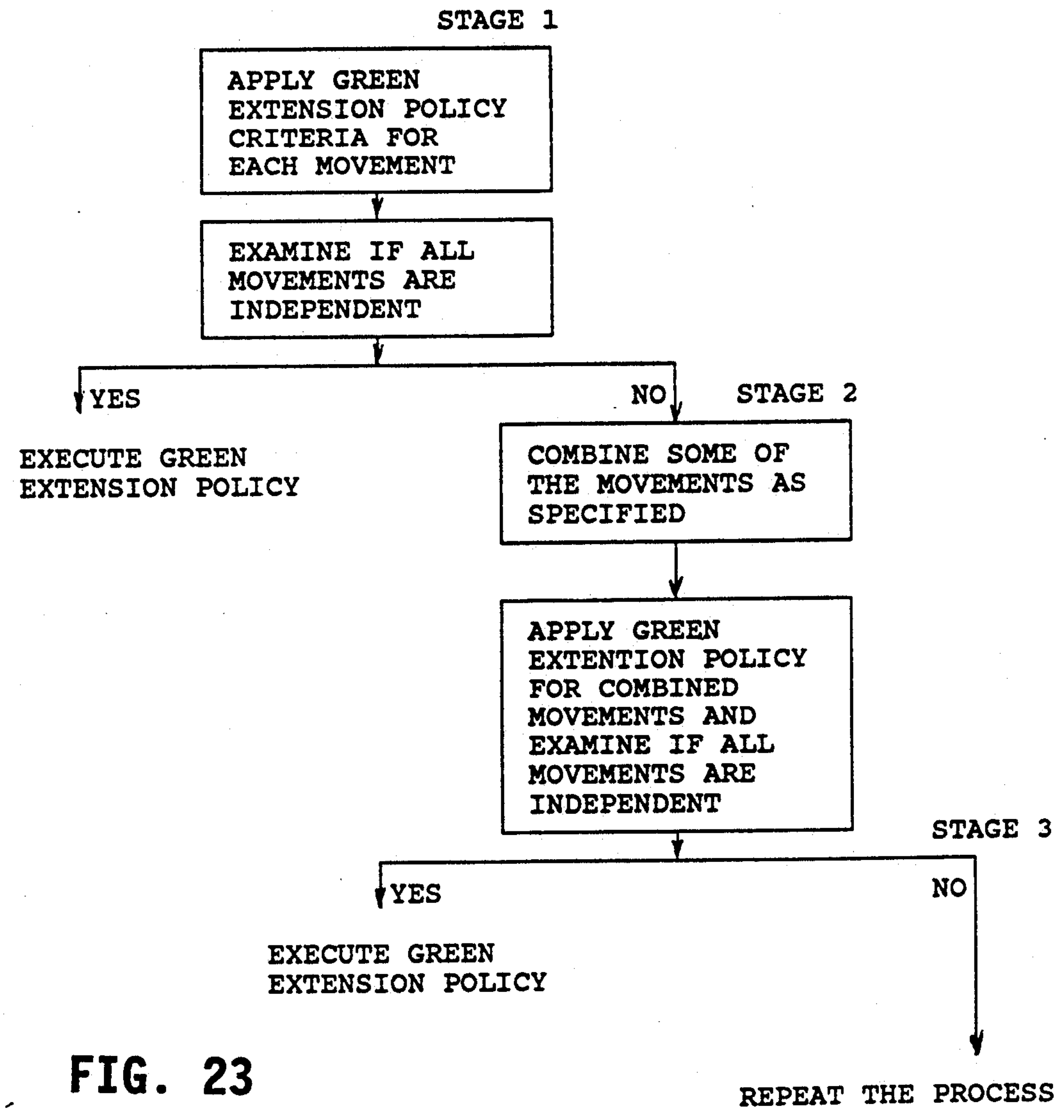
FIG. 23

FIG. 29A

MOVEMENT 1, 2, 3, 4, 5, 6, 7, 8

$$A_t = (20, 0, 0, 0, 15, 0, 0, 0)$$

FIG. 29B

MOVEMENT 1, 2, 3, 4, 5, 6, 7, 8

$$A_t = (5, 0, 0, 0, \delta_t, 0, 0, 0)$$

FIG. 29C

MOVEMENT 1, 2, 3, 4, 5, 6, 7, 8

$$S_l = (0, 0, 0, 0, 1, 0, 0, 0)$$

FIG. 29D

MOVEMENT 1, 2, 3, 4, 5, 6, 7, 8

$$S_r = (1, 0, 0, 0, 0, 0, 0, 0)$$

FIG. 29E $$\underset{S_l}{(0,0,0,0,1,0,0,0)} \times \begin{vmatrix} 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 1 & 0 & 0 & 0 & 0 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 1 & 0 & 0 & 0 \end{vmatrix} = \underset{S_g}{(0,0,0,0,0,1,0,0)}$$

TRANSITION MATRIX, P

FIG. 29F

MOVEMENT 1, 2, 3, 4, 5, 6, 7, 8

$$A_t = (4, 0, 0, 0, 0, 40, 0, 0)$$

HIGHWAY TRAFFIC SIGNAL LOCAL CONTROLLER

FIELD OF THE INVENTION

This invention relates generally to a highway traffic signal local controller and more particularly to a local controller for automatically computing, or adjusting, signal timing for prevailing traffic conditions not only at the local intersection, but also for an areawide system.

BACKGROUND OF THE INVENTION

Two major developments have emerged in signal system design over the last 20 years. One is a microprocessor based local controller that utilizes software that is flexible enough to deal with phase skipping and overlapping using the dual-ring concept. The dual-ring concept is employed, for example, in so-called California 170 local controllers and in NEMA specification local controllers. The other is the development of relatively small area-wide control systems that use a personal computer as the central computer and software developed for the general purpose computer market, such as communication and database management software. Traffic control systems which include computers are shown, for example. in U.S. Pat. Nos. 3,363,185, Sanderson et al; 3,764,972, Siklos et al; 3,828,307, Hungerford; and 3,886,496, Spilo et al.

Prior art signal control systems are not designed to be self-adaptive to ever-changing traffic demands within the system boundary. They require signal parameter update every several years to maintain proper signal timing. With prior art systems human involvement is required in timing plan preparation, which work is performed at the control center under control of the traffic engineer. With the present traffic control system the local controller functions to control signals with minimal interface with the central system.

The new local controller is smart enough (i.e. has sufficient memory and fast enough CPUs) to automatically compute (or adjust) the proper signal timing for the prevailing traffic conditions, not only for the local intersection, but also for the areawide system. The new local controller is designed to be flexible enough to easily accommodate various traffic signal control (or optimization) methods.

The signal indication control (signal switching) software is flexible enough to handle practically all intersection geometries and easily incorporate various signal phasing and timing control algorithms.

In addition, the new local controller is designed to be flexible enough to accommodate most, if not all, traffic signal control (or optimization) methods that will be developed after the system is installed and becomes operational.

Features of the new local controller include the following:

a) The CPU that handles signal control algorithm processing is fast enough to handle most conceivable signal control algorithms.

b) Transmission between the local controller and the local master can encompass all the data types for most conceivable algorithms, and the transmission capacity is large enough to handle these data types.

c) The signal switching mechanism, especially the phasing method, is flexible enough to execute practically all conceivable algorithms.

d) The software design is modular so that any signal control algorithm may be easily plugged into the advanced algorithm processor (AAP).

e) The software design is flexible enough to switch from operating one algorithm to another.

f) The signal control software is able to automatically compute (or adjust) the proper signal timing for the prevailing traffic, not only from the local intersection control standpoint, but also from the area-wide signal control standpoint (if it is not for isolated intersection control).

g) The on-line real-time traffic-responsive and traffic-adaptive signal control algorithm for signal timing reflects the prevailing traffic conditions on an on-line real-time basis and maintains coordination with neighboring intersection signals.

SUMMARY AND OBJECTS OF THE INVENTION

An object of this invention is the provision of an improved traffic signal local controller wherein the local controller handles, on an on-line real-time basis, many of the signal control functions now performed by the central computer and the off-line analysis performed by the traffic engineer.

An object of this invention is the provision of an improved traffic signal local controller of the above-mentioned type which is flexible enough to accommodate most present, and future, traffic signal control, or optimization, methods.

An object of this invention is the provision of a traffic signal local controller which is able to automatically compute, or adjust, the proper signal timing for the prevailing traffic, not only from the local intersection control standpoint, but also from the area-wide signal control standpoint, when employed in an area-wide system of traffic control.

The traffic signal local controller of the present invention includes the use of time-of-day tables including signal control method, signal phasing scheme, recall switch, signal timing parameter and pedestrian green time coefficient tables. Signal control methods which may be implemented include time-of-day failure mode, time-of-day normal mode, traffic-responsive and traffic-adaptive methods. Signal phasing schemes are defined by data included in a transition matrix P and in a simultaneous green matrix Q included in time-of-day tables. The transition matrix P indicates which movement follows another, and the simultaneous green matrix contains data on simultaneous green indications. It here will be noted that as used herein "movement" refers to an individual traffic movement, and "phase" refers to the green display given to a combination of movements. Recall switch "on" for a movement indicates that the movement will receive the green indication even though no green requests are made. Conversely, when the recall switch is "off" for a movement, the movement will not receive the green indication if no green requests are made. Signal timing parameters include minimum, optimum and maximum green times for movements, and minimum, optimum and maximum cycle lengths. The pedestrian green time coefficient table includes coefficients for use in adjusting pedestrian green times in accordance with the time of day to accommodate different pedestrian traffic conditions occurring over the course of the day.

The local controller includes three major processors, 1) the signal control processor, SCP, 2) the advanced algorithm processor, AAP, and 3) the detector data processor, DDP. The signal control processor performs all signal control functions, including communications, signal light switching, and basic signal phasing and timing selection. The advanced algorithm processor determines the signal timing and/or phasing using stored signal control parameters, and the detector data processor performs detector data processing.

Signal timing parameters are selected (using the time-of-day control method) or computed (using either the traffic-responsive or traffic-adaptive method) every cycle of signal control. For all control methods, the control method, phasing scheme and recall switch status are selected from time-of-day tables each signal cycle. Selected, or computed, local signal timing parameters are supplied together with signal timing parameters from other local controllers, to a local master controller where a common cycle length and planned offset are computed. The planned offset then is used by the local controller in the measurement of the offset deviation. Local signal timing parameters then are adjusted within boundaries defined by the minimum and maximum green times and minimum and maximum cycle lengths computed every cycle when operating under the traffic-responsive or traffic-adaptive method. The adjusted signals are used for signal control execution. For operation under the traffic-adaptive method, green extension or cutoff is determined every $\delta_t$ (say, every 0.5 to 1 seconds) using real-time detector data, for further adjustment of local signal timing parameters within the minimum and maximum cycle lengths and green times established every cycle.

Further in accordance with this invention, linear programming solutions for maximum, optimum and minimum cycle lengths and maximum, optimum and minimum phase times are computed each signal cycle using the traffic-responsive or traffic-adaptive control method. A phase-movement matrix, M, is generated using data elements from a green-green conflict matrix. The green-green conflict matrix data elements indicate conflicting pairs of traffic movements for the intersection. The phase-movement matrix generated from the green-green conflict matrix defines the relationship between movements and phases where $M_{ij}=1$, indicates that movement i is included in phase j, and $M_{ij}=0$ indicates otherwise.

Incoming and saturation flow rates, together with data elements from the movement-phase matrix, and lost time constants for each movement, are used to construct linear constraints for use in linear programming solutions of maximum, optimum and minimum cycle lengths and maximum, optimum and minimum phase times. Incoming flow rates are computed using detector data. Either computed saturation flow rates or predetermined values thereof may be employed in the linear program constraints. Maximum, optimum and minimum movement green times for movements to be implemented are computed using said maximum, optimum and minimum phase times. Movement green times are adjusted to meet common cycle length and planned offset determined by a local master controller.

In accordance with another feature of this invention, linear constraints for less preferred movements are made equalities thereby reducing the probability of obtaining more than one solution to the linear program. Also, linear programming solutions are sequentially obtained for maximum, optimum and minimum phase times and cycle lengths. If there is no linear programming solution for maximum cycle length, then maximum, optimum, and minimum green times and cycle lengths are selected from tables of predetermined values thereof, which predetermined values then are used to obtain signal timing parameters for signal light control. If the linear program solution for maximum cycle length is determined to be too short, then the maximum, optimum and minimum green times and cycle lengths are adjusted to acceptable minimum values. If, on the other hand, the linear program solution for maximum cycle length is too long, then the maximum cycle length and green times are adjusted to acceptable maximum values. Operation then continues for linear programming solutions of optimum and minimum cycle lengths. Similar adjustments are made if the linear programming solutions for optimum and maximum cycle times are too short or too long.

As noted above, saturation flow rates for use in the linear programming solutions may be determined in real-time by observation, or predetermined values thereof may be employed. If fixed values are used, then they may be adjusted by a weather coefficient to reduce the rates under inclement weather conditions.

In accordance with another feature of this invention, signal status for each movement is defined by a signal status vector, $A_t$, which indicates the remaining green plus intergreen times for green movements. When one or more remaining green times becomes less than a predetermined value, $\delta_t$, a zero-one lose vector, $S_l$, is generated in which a data element of 1 indicates that the movement will lose green. In addition, a zero-one gain vector, $S_g$, is generated in which a data element of 1 identifies the movement to gain green. Then it is determined whether or not the movement identified by the gain vector, $S_g$, should be skipped. If the decision is negative, it is determined whether or not the new movement identified by the gain vector, $S_g$, will conflict with remaining green movements. If this decision is negative, then new green times are defined for the new movement. With this method, if new arrivals are detected during the intergreen times, the skipping decision may be reexamined to determine whether or not a movement planned to be skipped will not be skipped in view of said arrival. The gain vector, $S_g$, may be generated by taking the outer product of the lose vector, $S_l$, and a transition matrix, P, which matrix identifies transitions between movements. The movement identified by the gain vector, $S_g$, is checked against data elements of a green-green conflict matrix which indicates conflicting pairs of movements. If there is conflict, a new gain vector is generated by taking the outer product of gain vector, $S_g$, (which now is identified as a lose vector, $S_l$) and the transition matrix. With this arrangement, the number of elements in the status vector, $A_t$, is dependent upon the number of movements which, in turn, is dependent upon the intersection geometry. The method is useable with any type of intersection including, for example, diamond intersections, and any type of operation, such as scramble, without the need to rewrite the switching software. With prior art arrangements, separate programs for each intersection geometry are required.

BRIEF DESCRIPTION OF THE DRAWINGS

The above and other objects and advantages of the invention will be better understood from the following description when considered with the accompanying drawings. It here will be understood that the drawings are for purposes of illustration only, and the invention is not limited to specific embodiments disclosed therein. In the drawings, wherein like reference characters refer to the same parts in the several views:

FIG. 1 is a diagrammatic representation of an individual intersection controlled by the novel local controller of this invention, FIG. 2 is a diagrammatic representation showing local controllers at a plurality of intersections and a master controller for use in coordinating local controller operation, FIG. 3 is a diagrammatic representation which is similar to FIG. 2 but showing a plurality of subareas and local master controllers in communication with a central controller, FIG. 4 is a diagrammatic representation of an intersection and showing traffic movements thereat, FIGS. 5 and 6 are phase sequence block diagrams showing different possible signal phase sequences which may be followed in the course of a cycle of operation of traffic signals, FIG. 7 is a signal phase sequence chart depicting a complete cycle of operation of signal lights, FIG. 8 is a simplified block diagram showing of a local controller for use in the present invention, FIG. 11A shows a transition matrix, P, having data elements for indicating transitions between movements, FIG. 11B shows a green-green conflict matrix, G, having data elements for identifying green-green conflict conditions between pairs of traffic movements, FIG. 11C shows a movement-phase matrix, M, having data elements for indicating the relationship between traffic movements and signal phases, FIG. 11D shows a simultaneous green indication matrix, Q, of which the G matrix is a subset, FIG. 22 is a schematic representation of green extension, FIG. 23 is a schematic representation of green extension examination procedure, FIG. 29A through 29F show several vectors employed in signal switching operations.

1. INTRODUCTION

1.1 Use of Controller

Figure 9:
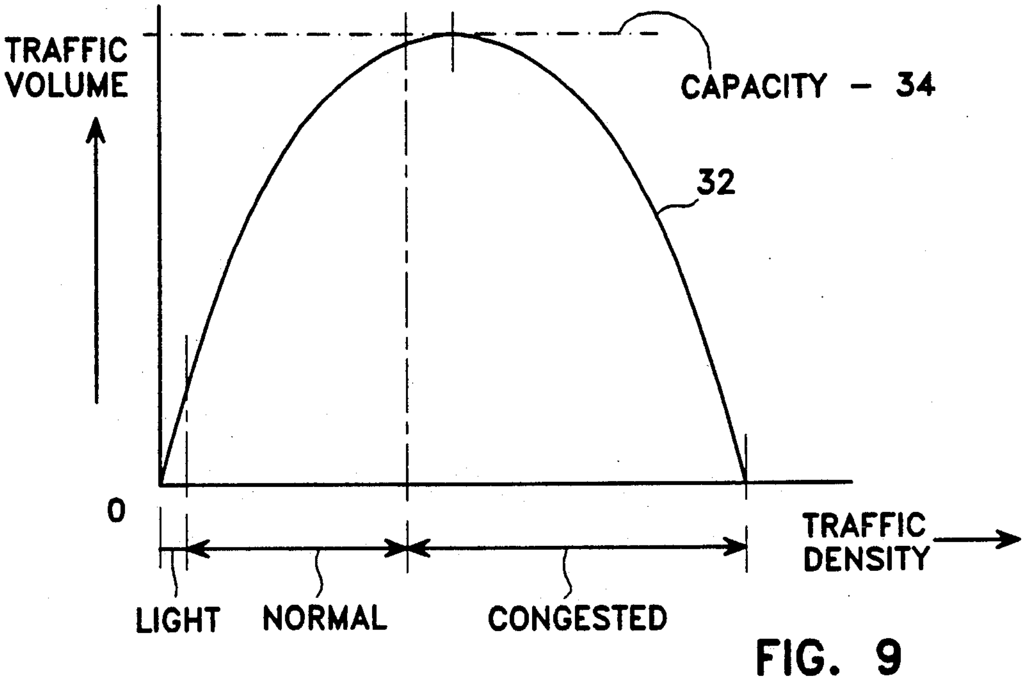
FIG. 9 shows a typical vehicle density versus vehicle volume graph.

The local controller of the present invention is adapted for use in a wide variety of traffic control arrangements including, for example, those illustrated in FIGS. 1 through 3. In FIG. 1, a local controller 10 embodying the present invention is shown used for traffic signal control at an isolated intersection 12. Signal lights operated by the local controller, and detectors for supply of real-time data thereto, are identified by reference numeral 14. The controller is adapted for control of both vehicular and pedestrian traffic, and may be used with any intersection configuration.

Use of local controllers 10 in a small traffic control system which includes a plurality of intersections, is illustrated in FIG. 2. There, reference numerals 10, 12 and 14 for controllers, intersections and lamps and detectors, respectively, are provided with suffixes -1, -2, -3, . . . -N for use in individually identifying the same. In the illustrated system, local controllers 10-1 through 10-N are connected to a local master controller 16. Information flows in both directions between the master controller 16 and associated local controllers 10. In FIG. 2, intersections 12 are located along a main street, or artery, 18 along which traffic flow is to be optimized. Master controller 16 is used in the determination of a common cycle length for signals at intersections 12-1 through 12-N, and to plan the offset at each intersection, which information then is used by the individual local controllers in the computation of the green time for each movement of the next cycle of signal operation. The green time computations made by the local controllers include adjustments for the common cycle and for offset catchup. By providing intersections 12-1 through 12-N with a common cycle length, and by offsetting the times at which signal light cycles at individual intersections begin, signal timing for traffic flow along street 18 is optimized.

A large scale traffic control system which includes novel local controllers 10 of the present invention is shown in FIG. 3, to which figure reference now is made. In this arrangement the system is divided into subareas, with intersections 12-1(1) through 12-I(N) and 12-2(1) through 12-2(N) being included in subareas 1 and 2, respectively. One local master controller 16 is provided for each subarea. For an arrangement with M subareas, there are a total of M local master controllers, and in FIG. 3, local master controllers 16-1, 16-2 and 16-M are depicted. The local master controllers are connected to a central controller 20 which functions to coordinate operations between the subarea local master controllers. Local controllers associated with a given subarea, or section, function in substantially the same manner as local controllers 10-1 through 10-N included in the FIG. 2 system. From the FIG. 1 through 3 diagrams, it will be apparent that local controllers of the present invention are adapted for use in a wide variety of traffic control systems ranging from one including a single local controller at an isolated intersection to a traffic control system of massive size which includes a large number of intersections and associated local controllers.

Reference now is made to FIG. 4 wherein a typical two-way/two-way intersection is shown together with eight permissible traffic movements identified by arrows and associated reference numerals 1 through 8. Right turns are allowed at all times whereby no right turn signal is required. The term movement, as used herein, refers to one movement, or direction of traffic. With the illustrated intersection and movements, it will be apparent that two, and only two, signal movements are simultaneously allowable without conflict. For example, for north-south traffic movements and 5 are simultaneously allowable, as are 1 and 6, 2 and 5, and 2 and 6. Similarly, for east-west traffic, movement pairs 3 and 7, 3 and 8, 4 and 7, and 4 and 8 are simultaneously allowable. All other combinations of simultaneous movements are forbidden. In the present description, each allowable pair of green movements is identified as a signal phase (Ø). For the illustrated intersection eight different signal phases are possible.

Reference now is made to FIG. 5 wherein a phase sequence block diagram showing some possible signal phase sequences which may be followed in the course of a cycle of operation of the signals at the intersection is depicted. For simplicity, only a relatively small number of possible signal phase sequences are shown. In FIG. 5, signal phases are identified by reference characters Ø1 through Ø8. A signal phase sequence can be identified by tracing a sequence of phases, following the arrows, and closing a loop that includes both north-south and east-west legs of the intersection. One possible signal phase sequence for a cycle of operation includes, for example, Ø1, Ø2, Ø4, Ø5, Ø7 and Ø8. Signal phase sequence diagrams for other configurations of intersections such as T intersections and five-legged intersections may be generated. Also, the illustrated intersection may include many more allowable signal phase sequences as depicted in FIG. 6, to which figure reference now is made. There, for example, a signal phase sequence not allowed in the diagram of FIG. 5 includes the sequence of Ø4, Ø7, Ø8 and return to Ø4. As will become apparent, the local controller of the present invention is not limited to operation using signal phase sequences illustrated in FIGS. 5 and 6.

Reference now is made to FIG. 7 wherein a signal phase sequence chart depicting one cycle of operation and end and beginning of other cycles is shown, which chart includes intergreen times. In FIG. 7, the above-mentioned phase sequence Ø1, Ø2, Ø4, Ø5, Ø7 and Ø8 is depicted for the one complete cycle. As seen in FIG. 7, cycle time is the time required for the completion of one set of north-south and east-west movements. With the controller of the present invention, the signal phase sequence, cycle time and movement green times are determined, or selected, every cycle of operation. Operation between north-south and east-west traffic is separated by barriers shown at the beginning of Ø1, between Ø4 and Ø5, and at the end of Ø8. Intergreen time includes amber and intergreen red periods. Green movements G1 through G8 are shown in FIG. 7. Time intervals between barriers are identified as cycle "segments". FIG. 7 is an example of a dual ring sequence of traffic movement wherein two traffic movements receive the green indication simultaneously. As shown in FIG. 7, movements 1, 2, 3 and 4 are included in a first ring and movements 5, 6, 7 and 8 are included in the second ring. Dual rings of the type shown in FIGS. 5 through 7 are identified in the current U.S. NEMA specifications. It here will be noted that the traditional definition of "phase" is used in the present patent application, which is a green display given to a combination of movements in the intersection. In the current U.S. NEMA specifications, a phase is the green display to a movement of traffic in the intersection.

1.2 Simplified Overview of Local Controller—10

Reference now is made to FIG. 8 wherein a simplified block diagram of a local controller 10 is shown. The controller includes three major processors including a signal control processor (SCP) CPU 23 and associated memory 23A, an advanced algorithm processor (AAP) CPU 24 and associated memory 24A, and a detector data processor (DDP) CPU 26 and associated memory 26A. Signal control processor CPU 23 and detector data processor CPU 26 are included in signal control processor (SCP) unit 22 which also includes a failure-mode signal control LSI(SC-LSI) 30. The CPUs may comprise microprocessors. Signal control processor 22 performs all signal control functions, including communications, signal light switching, and basic signal phasing and timing selection. It is the "heart" of the local controller and continuously performs signal indication control, or signal switching. Advanced algorithm processor 24 is the "brain" of the local controller and determines the signal timing and/or signal phasing using stored signal control algorithms. Detector data processor 26 is the "eyes and ears" of the local controller and it is dedicated to detector data processing. Detector inputs are shown supplied to signal control processor 22. Information relating to movements, signal phases, and geometric data is supplied to local controller 10 through a local terminal input. Where the local controller is included in a traffic control system which includes a plurality of coordinated local controllers, such as shown in FIGS. 2 and 3, communication with a local master controller is provided.

From the above, it will be apparent that the present local controller 10 provides for the separation of three basic controller functions as follows: signal indication control (signal switching control) by signal control processor 22, signal phasing and timing decision by the signal control processor CPU 23 and advanced algorithm processor CPU 24, and detector data processing by detector data processor CPU 26. Local controller 10 is so designed that if the advanced algorithm processor 24 fails, the signal control processor 22 can perform signal operations reasonably well without the advanced algorithm processor. Failure-mode signal control large scale integrated circuit (SC-LSI) 30 is used if other signal control processing fail. For example, in the event signal control processor CPU 23 fails, local controller 10 operates in a failure mode under control of SC-LSI 30 whereby signal operation is continued using a simple signal operation scheme.

Local controller 10 of this invention is capable of handling various control methods, including; 1) direct control from a local master controller 16, 2) time-of-day (T-O-D) timing parameter selection using T-O-D selection tables, 3) traffic-responsive on-line timing parameter generation for the current, or predicted, traffic condition including, for example, generation of the next cycle's length and green times for each movement in the cycle using linear programming methods, and 4) on-line real-time traffic-adaptive method employing real-time traffic data together with real-time adaptive controller means for real-time signal control. The on-line real-time traffic-adaptive method of 4) distinguishes over the traffic-responsive on-line timing parameter generation method of 3) by inclusion of means for extending or cutting off green times during the course of an operating cycle to better accommodate real-time traffic. Such on-line real-time traffic adaptive methods may employ algorithms ranging from conventional gap acceptance to, say, artificial intelligence (AI) techniques.

The local controller is capable of operation using different control methods. Reasons for switching control methods may be understood from an examination of traffic density versus traffic volume graph shown in FIG. 9, to which figure reference now is made. There, a typical density versus volume curve 32 is shown wherein volume, measured in vehicles/unit of time, increases with density, measured in vehicles/unit of distance, up to a capacity level identified by reference numeral 34. As density increases beyond the capacity level, volume of traffic passing the intersection decreases. Light, normal and congested traffic conditions are indicated along the density axis of the graph. For purposes of illustration, normal density extends between the light density condition to a density level less than the capacity density. It will be noted that there are only small changes in volume with changes in density adjacent the capacity level. Some control methods may function best in the normal traffic density range, whereas others may function best in the light and congested traffic density ranges. As noted above, with the present controller it is possible to switch traffic control methods. For example only, during light and congested traffic conditions it may be desirable to operate using an on-line real-time traffic adaptive method (method 4) above). During normal traffic conditions it may be desirable to operate using a traffic-responsive on-line timing generation method (method 3) above). With the present controller, selection of operating mode every cycle of operation is provided as described hereinbelow.

Figure 10:
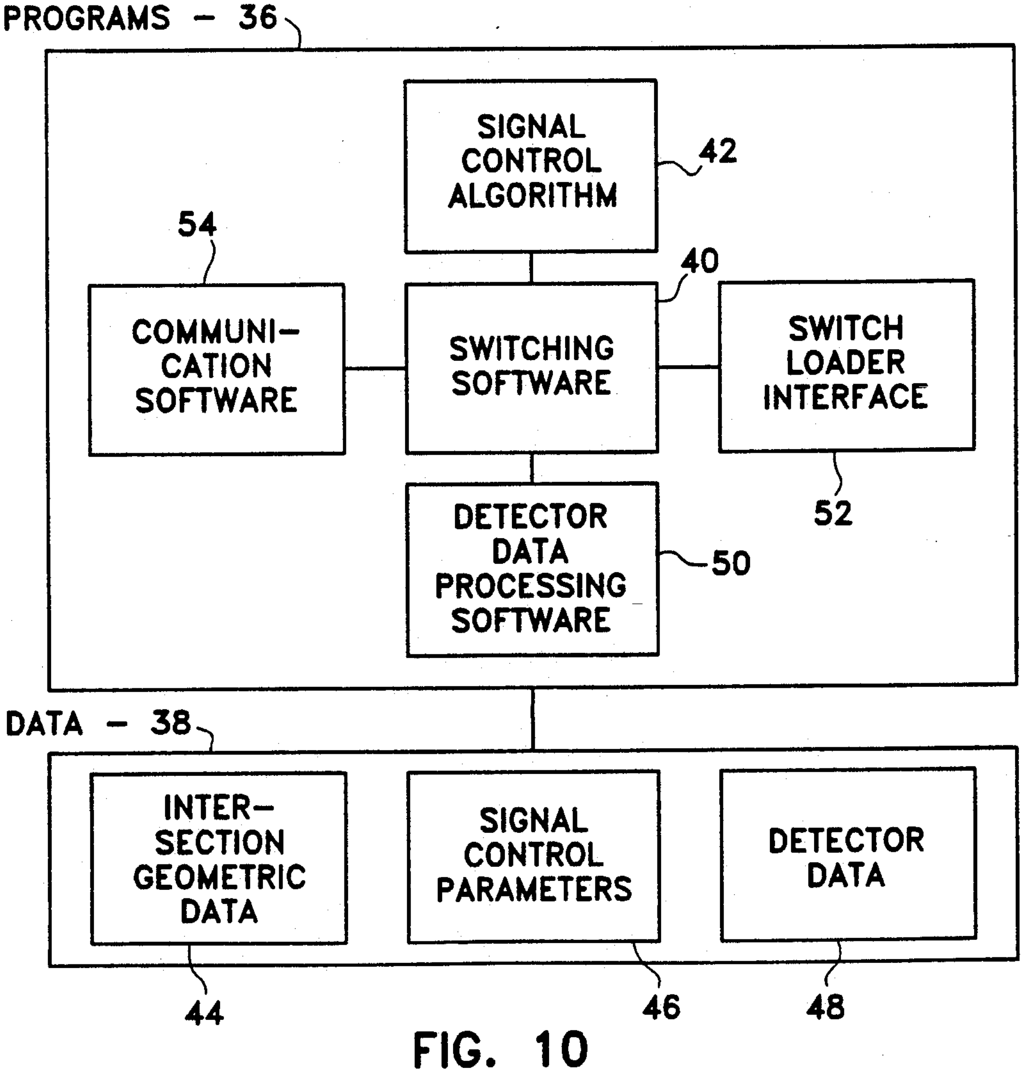
FIG. 10 shows in simplified block diagram form relationship of programs and data in the controller of the present invention.

Reference now is made to FIG. 10 wherein a simplified functional relationship of programs and data is shown in block diagram form which diagram includes a programs block 36 and data block 38. Programs include switching software 40 stored in signal control processor memory 23A (FIG. 8). Switching software provides signal indication control for performing the signal switching function. A plurality of signal control algorithms 42 are stored in signal control processor memory 23A and advanced algorithm processor memory 24A, which algorithms determine both signal timing and phasing sequence. In the embodiment disclosed herein, signal control algorithms for traffic-responsive on-line and for on-line real-time traffic-adaptive control methods are shown, both of which include the use of linear programming. It here will be noted that the use of linear programming in a local controller is described in a publication by the present inventor Masami Sakita, "Timing Design of Traffic Signals", *Transportation Research Record* (No. 1069), Washington, D.C. 1986. The entire disclosure of this publication specifically is incorporated by reference herein.

The switching software 40 uses parameters such as intersection geometric data 44, signal control parameters 46 including signal timing and phasing parameters and the status of recall switches, and detector and push-button data from detector data block 48. Raw detector data are processed by detector data processing software 50 so that the processed data are readily available for use by the switching software 40. The signal lights are controlled by the switching software 40 via a switch loader interface 52. Switching software 40 may be controlled directly from a local master controller 16, or central controller, using communication software 54.

2. SIGNAL CONTROL SOFTWARE

2.1 Introduction

This section describes the traffic control-related software that is implemented in the signal control processor, SCP, of the local controller.

The topics discussed are the following:

(1) Standard signal control methods,
  a. Time-of-day control,
  b. Traffic-responsive control,
  c. On-line real-time traffic-adaptive.
(2) Executing signal control tasks.
(3) Executing signal offset control,
  a. Subarea signal timing computation,
  b. Offset at each intersection,
  c. Offset reference point (ORP),
  d. Offset deviation and offset catchup.

Here, discussion focuses on the standard area-wide signal control, in which many local controllers are connected to the local master controller and signals under the same local master controller are coordinated as shown, for example, in FIGS. 2 and 3. Local controller operation at isolated intersections is a special case of area-wide signal control. The software for isolated intersections is identical to the one used for the area wide signal control.

2.2 Definition of terminology

The signal control function terms used throughout this application are defined below. Descriptions of how the functions operate in signal control or how to obtain the parameters for them are given in later sections.

Control method (or local controller control method)

The control method is the means used for traffic control in the local controller. Four control methods may be implemented including; the normal-mode time-of-day, failure-mode time-of-day, traffic-responsive, and traffic-adaptive methods. The control method may be specified by the time-of-day table in the local controller or by the local master controller.

Control method definition table

The control method definition table defines all the signal control methods.

Time-of-day control method selection table

This table contains the control method definition table IDs to be used at different times of the day.

Ring

A sequence of traffic movements to which green signal indication is given. More than one ring may be operated simultaneously. The most popular scheme is called the dual-ring control method, in which two interdependent rings operate simultaneously, as shown in FIG. 7.

Common cycle length for the subarea

This is the cycle length used for signal operation throughout the subarea. The common cycle length is obtained from the locally computed minimum, optimum, and maximum cycle lengths at each intersection and travel times between different intersection pairs in the subarea.

Background cycle length

The common cycle length is sometimes referred to as the background cycle length. This is because the common cycle length, depending on the control method at each intersection, is not necessarily visible in signal operations.

Locally computed cycle lengths

These are minimum, locally optimum, and maximum cycle lengths at each intersection computed using the traffic data available for that intersection.

Planned offset

The planned offset is the offset time computed by the local master controller using such parameters as the locally computed cycle lengths, observed travel speed, and distances between intersections. The planned offset is measured by the time difference between the offset reference points of the key intersection of the subarea and the intersection of concern.

Planned offset execution time

The planned offset is converted to clock time for offset execution, which is called the planned offset execution time. Sometimes this is termed the "ideal" offset execution time.

Adjusted offset execution time

This is a planned offset execution time that incorporates the necessary adjustment of offset by the local controller. The ideal offset execution time and the adjusted offset execution time could be the same or different.

Actual offset execution time

The clock time of actual offset execution. In the time-of-day and traffic-responsive control methods, the actual offset execution time is identical to the adjusted offset execution time (but not necessarily the same as the ideal offset execution time). In the on-line real-time traffic-adaptive control method, the actual offset execution time could be different from both the ideal and adjusted offset execution times.

Offset reference point

The offset reference point (ORP) is the point in a signal cycle at which the offset deviation is measured. The offset reference point selected for the present system is the start of the amber time immediately before the green time to which the signal coordination is implemented.

Offset deviation

This is the measured difference between the planned offset and the observed offset.

Offset execution time

The offset execution time is the offset reference point of the signal cycle of the concern, expressed in clock time.

Signal phasing scheme

This is the signal phasing method expressed by a transition matrix 58, a green-green conflict matrix 60, and a movement-phase matrix 62, examples of which matrices are shown in FIGS. 11A, 11B, and 11C, respectively. Briefly, the transition matrix 58 indicates the next movement that receives the green signal, and the green-green conflict matrix 60 indicates the movement pairs that conflict with each other. The movement-phase matrix 62 shows all the movements included in each phase. The transition matrix 58 sometimes is referred to as the P matrix, the green-green conflict matrix sometimes is referred to as the G matrix, and the movement-phase matrix 62 sometimes is referred to as the M matrix hereinbelow.

Signal phasing scheme definition tables

These tables contain the signal phasing parameters. Each table has its own ID number for identification purposes.

Time-of-day signal phasing scheme selection table

This table contains the signal phasing definition table IDs to be used at different times of day.

Signal timing parameters

These parameters are the minimum and the maximum green times for each movement, expressed by the minimum green vector, N, the maximum green vector, M, and the optimum green vector, O.

Signal timing parameter tables

These tables contain signal timing parameters. Each table has its own ID number for identification purposes.

Time-of-day signal timing parameter selection table

This table contains the signal timing parameter table IDs to be used at different times of the day.

Capacity factor (or coefficient)

The capacity factor is a tool to calibrate the capacity (or saturation flow rate) more accurately under all weather conditions. The capacity factor is used in computing signal timing for intersections with limited detector installations. The capacity of an approach at an intersection varies depending on the weather, surface conditions, and other environmental and traffic conditions. For non-traffic-responsive signal timing computation, the system uses a capacity factor for normal conditions of 1.0; the capacity factors for a rainy day and a snowy day will be, for example, 0.7 and 0.5, respectively.

The capacity factor ID (or weather condition ID) identifies the capacity factor. The capacity factor ID's and corresponding capacity factors are:

| Capacity Factor ID | Capacity Factor |
|---|---|
| 1 | 0.1 |
| 2 | 0.2 |
| 3 | 0.3 |
| 4 | 0.4 |
| 5 | 0.5 |
| 6 | 0.6 |
| 7 | 0.7 |
| 8 | 0.8 |
| 9 | 0.9 |
| 10 | 1.0 |

Proper values under various conditions will be obtained after a period of experiment following installation of the new system. The capacity factor is determined by the advanced algorithm processor 24. Of course, if detectors are fully installed at every intersection and the detector counts at the stopline are accurate, the capacity factor will not be necessary. It is assumed, however, that in a new system many small intersections will be left unequipped with full detector installations.

Pedestrian Green Coefficient

The pedestrian signal timing consists of the green time, the flashing green time (equivalent to the amber time for the vehicular movements), and the inter-green red time. Of these, the flashing green and the inter-green red times will not be changed often but the green time may be changed as frequently as every cycle, using the time-of-day parameter selection method. The parameter used for this purpose is called the pedestrian green coefficient. The coefficient of 1.0 indicates that the pedestrian green is the same length as the basic green time defined in the intersection geometric data.

Subarea

The subarea is an area that contains a collection of local controllers that are controlled by a local master controller as described above with reference to FIG. 3.

Recall switch "on" or "off"

When the recall switch is "on" for a movement, the movement will receive the green indication even if no green requests are made. When the recall switch is "off" for a movement, the movement will not receive the green indication if no green requests are made.

Signal phase time

The signal phase time denotes the time duration for a signal phase, in which a green display is given to a combination of movements in the intersection. Signal phase times are illustrated in FIG. 7.

Movement phase time

The movement phase time denotes the time duration for a movement, consisting of the green time and the intergreen time (amber time plus intergreen red time) following the green time. Green times and intergreen times also are illustrated in FIG. 7.

Green extension policy

This is the policy regarding green time extension, cutoff, or doing nothing.

Current remaining green time for a movement

This indicates the green time that has been assigned to a movement, when the movement is receiving the green signal. Each traffic movement that is receiving the green signal is assigned a remaining green time.

Desired remaining green time for a movement

The green extension policy is determined in several stages. When a green extension policy is tentatively adopted for a movement in a stage, the algorithm will store the newly computed remaining green time instead of immediately taking an action.

Green-green Conflict matrix

The G matrix (green-green conflict matrix 60 of FIG. 11B) indicates the green-green conflict for any movement pairs.

Simultaneous green indication scheme

In the adaptive control, cases involved with simultaneous green indication are expressed by a simultaneous green matrix (sometimes referred to as the Q matrix) each cell of which can take values 1 to 4. All other cells of the matrix have a value of zero. A simultaneous green matrix 64 is shown in FIG. 11D of the drawings.

2.3 Signal Control Methods

Figure 12:
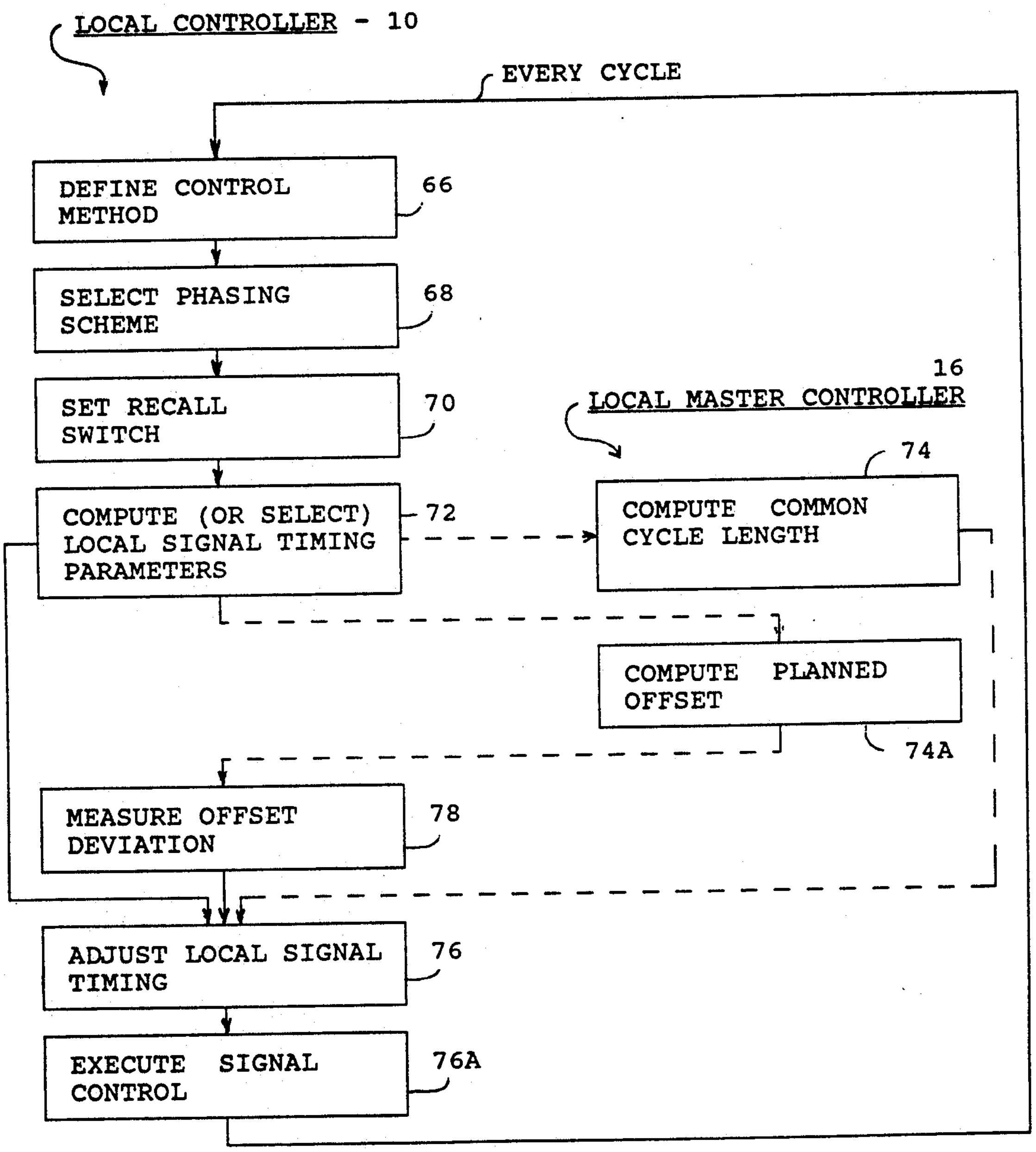
FIG. 12 is a simplified work flow diagram for use in explaining operation of the signal controller of the present invention.

Reference now is made to FIG. 12 wherein the overall work flow of signal control is shown.

The basic time unit of the signal control execution algorithm is one cycle: the signal control-related parameters are computed or selected every cycle. As shown in FIG. 12 the signal execution process includes (1) select, of define, the control method, (block 66), (2) select the phasing scheme, (block 68) (3) set the recall switch, (block 70) and (4) select (or compute) the local signal timing parameters (block 72).

For all control methods, the basic time unit for collecting traffic data for signal timing parameter selection (or computation) is N consecutive signal cycles (traffic measured from the beginning of a cycle to the end of the nth cycle). The measured traffic data are normalized by the duration of measurement and expressed in terms of vehicles per hour (or vehicles per second). The frequency of the signal timing update varies by control method.

In the time-of-day control method, a new timing parameter table is chosen every cycle.

In the traffic-responsive method, the timing parameter is updated every cycle using the last N cycles or predicted next cycle's traffic data.

In the on-line real-time traffic-adaptive method, the basic signal control parameters, such as subarea common cycle length and planned offset (if the offset is controlled in the traffic-responsive method), are updated every cycle using the last N cycles or predicted next cycle's traffic data. The green extension is determined every $\delta_t$ using the real-time traffic information, where $\delta_t$ is on the order of 0.5 seconds.

The local controller selects (or computes) the initial signal control parameters every cycle. They are:

1) Locally computed cycle lengths (minimum, optimum, and maximum),
2) Green time for every traffic movement (minimum, optimum, and maximum),
3) Phasing scheme ID used for timing parameter computation,
4) Recall on-off switch status for each traffic movement, including pedestrian movements and
5) Coordinated traffic movements.

In all three control methods, the locally selected (or computed) optimum cycle length is sent to the local master controller 16 every cycle. The local master controller also uses such data as the distances between different intersection pairs, and average travel speeds on them, and determines the common cycle length for the subarea and the planned offset for each intersection. Using local optimum cycle lengths for each intersection in the subarea, a common cycle length for the subarea is computed at block 74 by the local master controller. At block 74A, the local master controller computes the planned offset for each local controller in the area. Parameters such as locally computed cycle lengths, observed travel speed, and distances between intersections are used by the local master controller in the computation of the planned offset time for each local controller. The computed planned offset from block 74A is used at block 78 where offset deviation is measured. Offset deviation is the measured difference between the planned offset (from block 74A) and the observed current offset.

Using common cycle length information from block 74, and the offset deviation measured at block 78 from the local master controller, local signal timing parameters from block 72 are adjusted at block 76 to provide for coordination between signals within the area, or subarea. As will become apparent hereinbelow "adjustment" of local signal timing parameters includes computation of the next cycles optimum green times for each movement where the time-of-day or traffic responsive method is employed. For the traffic adaptive method of control, adjustment of local signal timing parameters includes real time adjustments to signal timing parameters.

After adjustment at block 76, signals at the intersection are controlled at block 76A. Operation then returns to block 66 where the signal control method to be used the next cycle is selected.

The local master controller also examines the phasing scheme for each intersection in this process and records a better phasing scheme for future reference, if such a scheme is found. There are some differences in the signal timing execution method among the three signal control methods, each of which signal control methods is described hereinbelow.

In real-world operation, the signal operation method will not be changed frequently because it could cause more delays in traffic unless the transition is smooth. It is believed that selection of the control method once an hour is frequent enough. However, the system is designed so that the signal control method may be changed as frequently as every cycle.

The local controller can also operate flashing amber and red control (the major street traffic receives flashing yellow light, and the minor street traffic receives flashing red light). This mode of operation is classified as one of the legitimate signal control methods, and it is stored in the table that contains all the signal control methods. By using the time-of-day control method selection table or by specifying the use of this control method from the higher level controller, the operator can specify when to start and terminate the flashing operation.

2.3.1 Time-of-day Control

The two types of time-of-day signal control tables stored in the local controller are:

Nonpermanent tables stored in the battery backup random access memory, RAM, of the signal control processor, SCP, 22, and permanent tables stored in the electrically programmable read-only memory, EPROM, of the signal control processor, SCP 22.

Figure 13A:
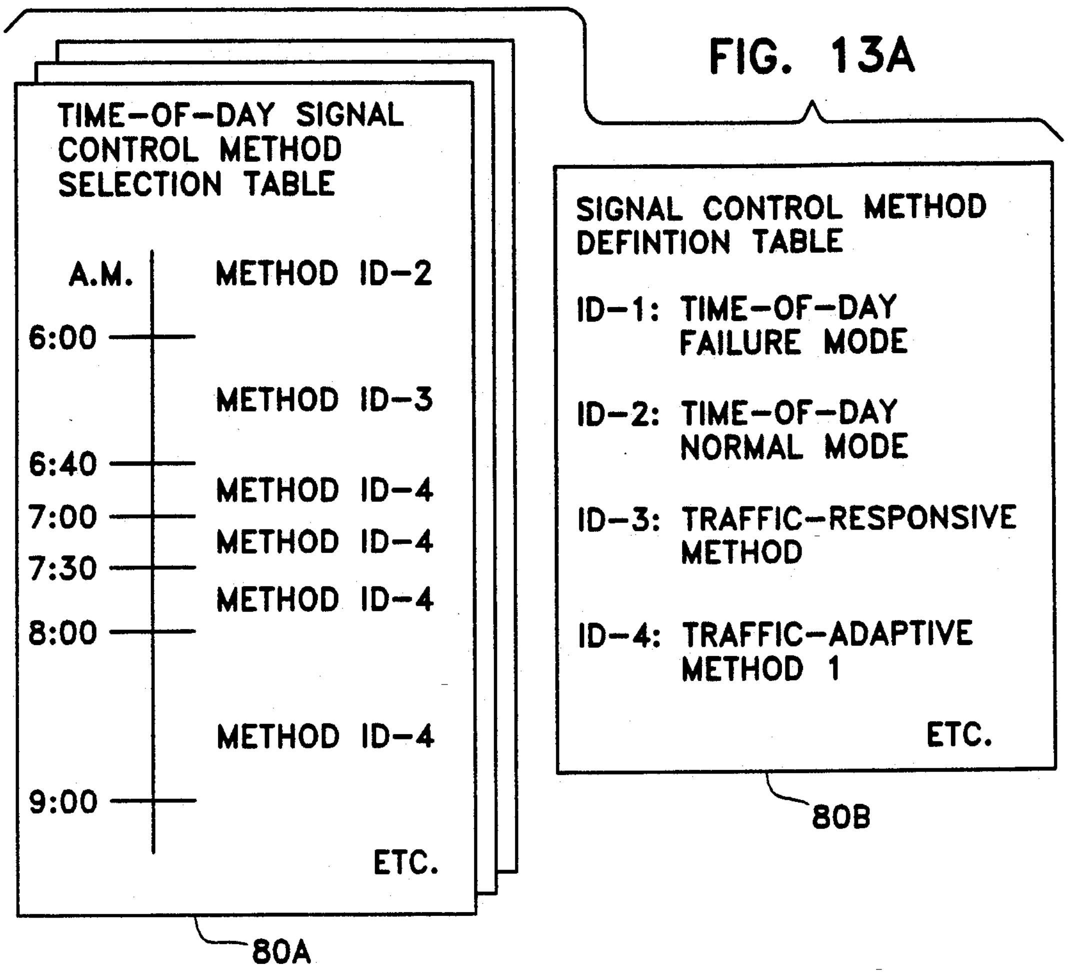
FIG. 13A is a time-of-day selection table and associated definition table for use in selection of the signal control method to be implemented by the controller of this invention.
Figure 13B:
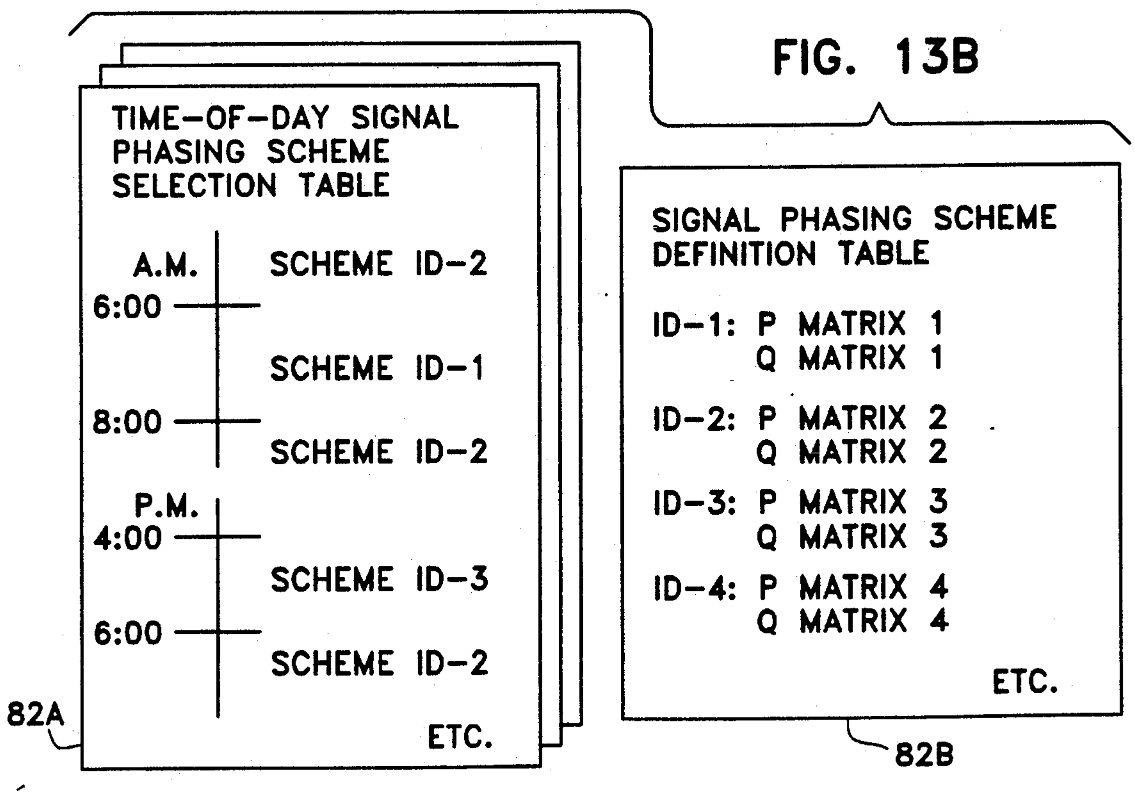
FIG. 13B is a time-of-day selection table and associated definition table for use in selecting a phasing scheme.

Each type of table defines the control method, the phasing scheme, and the signal timing parameters. FIGS. 13A through 13E are representations of the time-of-day control method, phasing scheme, recall switch status, signal timing parameters, and pedestrian green time coefficient selection methods, respectively. In FIG. 13A control method selection table 80A and associated definition table 80B are shown, in FIG. 13B phasing scheme selection table 82A and associated definition table 82B are shown, in FIG. 13C recall switch selection table 84A and associated definition table 84B are shown, in FIG. 13D timing parameter selection table 86A and associated definition table 86B are shown, and in FIG. 13E pedestrian green time coefficient selection table 88A and associated definition table 88B are shown. In each of these methods, the time-of-day control method selection table contains the IDs of the tables to be used at different times of the day. Different tables are provided for:

1. Day of the week and holidays, and
2. Days with special events (Event type ID).

The nonpermanent table is used under normal operations and may be continuously revised over the years and stored in the RAM of the signal control processor SCP of the local controller. The permanent table is used under failure-mode operation (when the communication system fails for more than one cycle or when the battery backup RAM, which stores the nonpermanent time-of-day signal control table, is damaged). Different permanent tables are provided for:

1. Day of the week and holidays, and
2. Days with special events.

The signal control methods using both the nonpermanent and permanent tables are called "time-of-day" control methods, but the processes involved with using these two tables are different.

Normal Time-of-Day Control Operation

Figure 14:
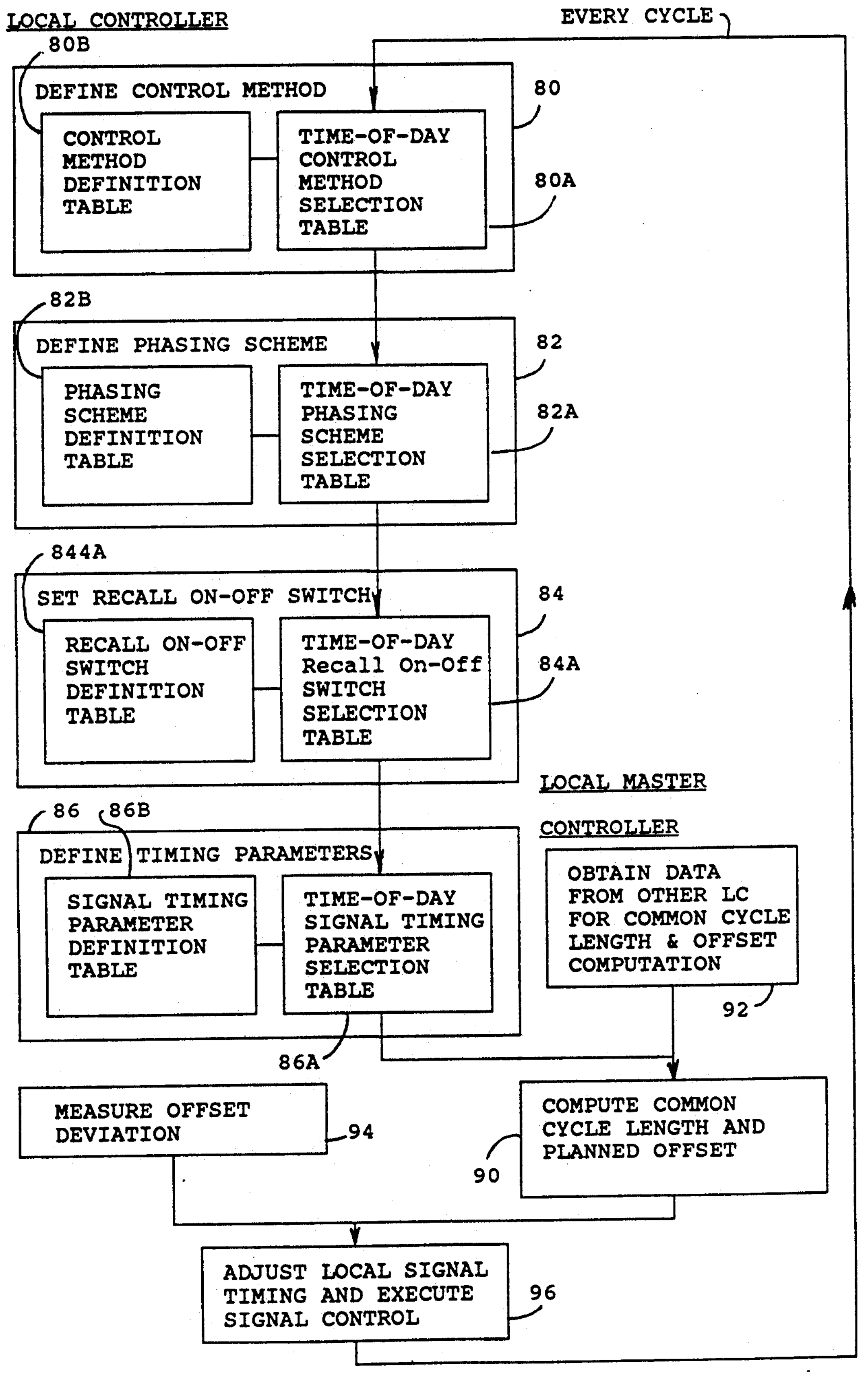
FIG. 14 is a simplified work flow diagram for time-of-day control method under normal operations.

Under normal operations, the time-of-day control tables stored in the battery backup RAM of the signal control processor SCP are used. The whole process is performed once a cycle, and it is depicted by one loop in FIG. 14, to which figure reference now is made. The process is as follows:

(1) Select the signal control method using the time-of-day signal control method selection table (block 80A in FIG. 14) and the signal control method definition table (block 80B).

(2) Select the phasing scheme using the time-of-day phasing scheme selection table (block 82A) and the phasing scheme definition table (block 82B). The phasing scheme definition table contains the P and Q matrices shown in FIGS. 11A and 11D, respectively.

(3) Set the recall switch using the time-of-day recall switch selection table (block 84A) and the recall switch definition table (block 84B). The recall switch definition table contains the movements to be coordinated and the movements to which the recall switch is kept "on".

(4) Select the signal timing parameters using the time-of-day signal timing parameter selection table (block 86A) and the signal timing parameter definition table (block 86B). The signal timing parameter definition table contains the minimum, maximum, and the optimum green time for each movement (the M, N, and 0 vectors). The table also contains the minimum cycle length $C_{min}$, optimum cycle length $C_{opt}$, and the maximum cycle length $C_{max}$.

Under the normal time-of-day control operation method, the phasing and local timing parameters are selected by the local controller, but the local master controller computes the common cycle length for the subarea and the planned offset (block 90). Data is obtained from other local controllers in the subarea for use in computation of the common cycle length and offset computation as indicated at block 92. The local master controller computes the common cycle length for the subarea using the local minimum, optimum, and maximum cycle lengths for each local controller, in a manner described in Subsection 2.4.1 hereinbelow. To compute the planned offset for each local controller, the local master controller uses the common cycle length and travel times between intersections, in a manner described in Subsection 2.4.1 hereinbelow.

The local controller measures the offset deviation (block 94), and adjusts the signal timing to meet the offset requirements (block 96). (See Sections 2.4.2 through 2.4.4 hereinbelow.)

The inputs to this signal control method comprise:

1. Capacity factor ID (default value: 10),
2. Special event ID (default value: 0, or none), and
3. Amber and inter-movement-red requirements (default values: 4 and 2 sec).

The outputs from this signal control method comprise:

1. Cycle ID, date,
2. Clock time,
3. Day of the week, and holiday ID,
4. Capacity factor ID,
5. Special event ID,
6. IDs of tables used,
7. Movements coordinated,
8. Actual phase sequence,
9. Actual green time for each movement,
10. Amber and inter-movement-red for each movement,
11. Actual cycle time,
12. Planned offset execution time,
13. Adjusted offset execution time, and
14. Actual offset execution time.

Failure-Mode Time-Of-Day Control Operation

Figure 15:
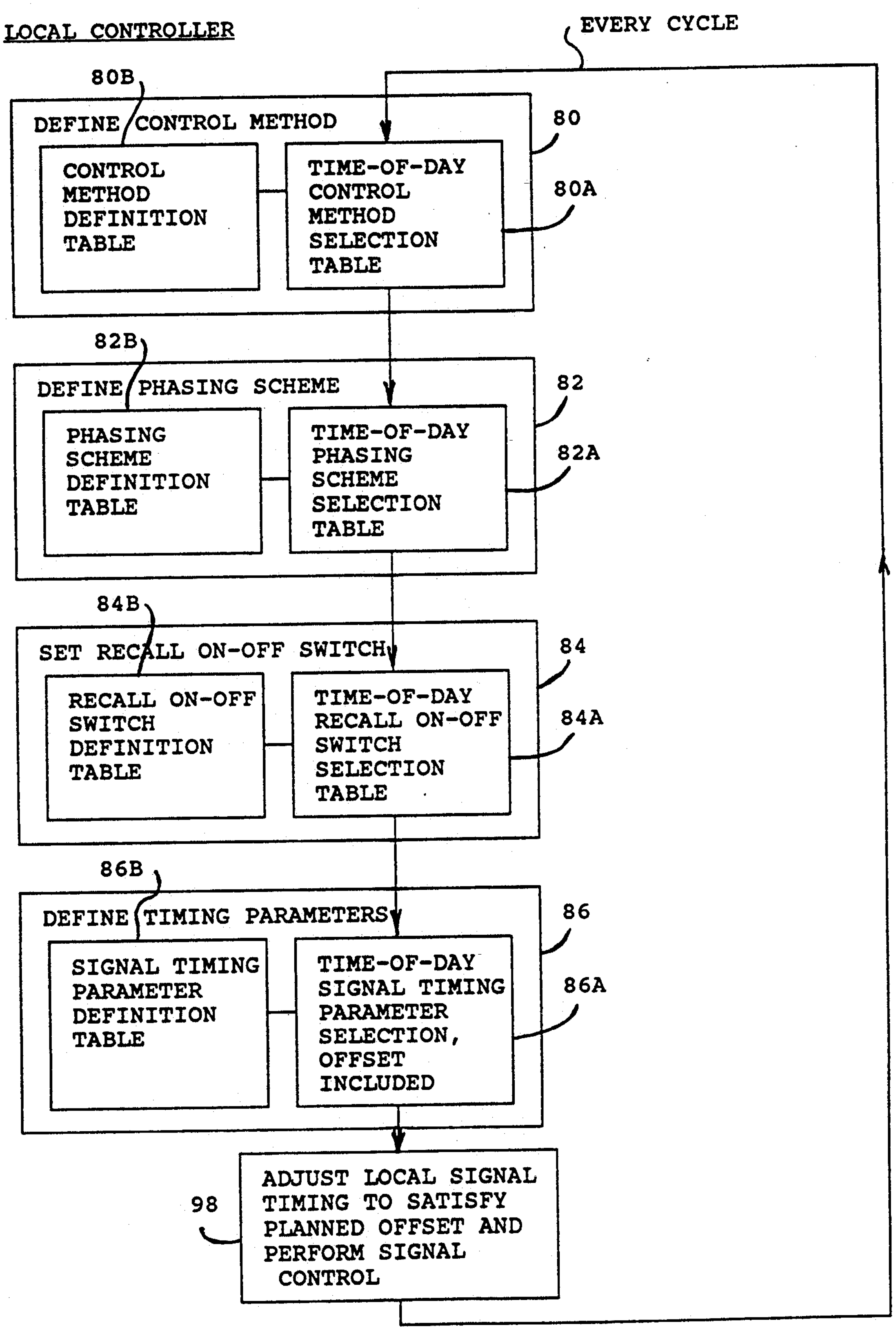
FIG. 15 is a simplified work flow diagram for time-of-day control method under failure mode.

FIG. 15 is a simplified work flowchart for the failure mode time-of-day control operation. The failure mode operation is applied when either the time-of-day control table in the RAM is damaged or the communication system fails. Under this mode at every cycle, the local controller selects the signal control method, the phasing scheme, and the timing parameters from the tables in the SCP of the EPROM, using the time-of-day table look-up method (blocks 80, 82, 84 and 86).

The local controller still adjusts the signal timing to satisfy the planned offset whenever the offset amount defined in the timing parameter table is different from the one defined in the last time increment (block 98).

The time-of-day control method, phasing scheme, and timing parameter selection tables in the EPROM of the signal control processor SCP contain the same characteristics as the ones used for normal time-of-day operation, except that an extra table containing the planned offset execution time (in clock time) is also defined for this method.

No inputs are needed to this signal control method, except that the clock time, the day of the week, and default values for necessary parameters are used.

The outputs from this signal control method comprise:

1. Cycle ID, and date,
2. Clock time,
3. Day of the week, and holiday ID,
4. IDs of tables used,
5. Actual cycle time,
6. Planned offset execution time, and
7. Actual offset execution time.

2.3.2 Traffic-Responsive Signal Control

In the traffic-responsive signal control method, signal timings are generated using the linear programming (LP) approach described in the above-mentioned article by the inventor, "Timing Design of Traffic Signals", *Transportation Research Record* (No. 1069), Washington, D.C., 1986. The signal phasing scheme and the green time for each movement are determined before the signal timing parameters are chosen.

Linear Proqramming Method (Traffic Responsive)

Figure 16:
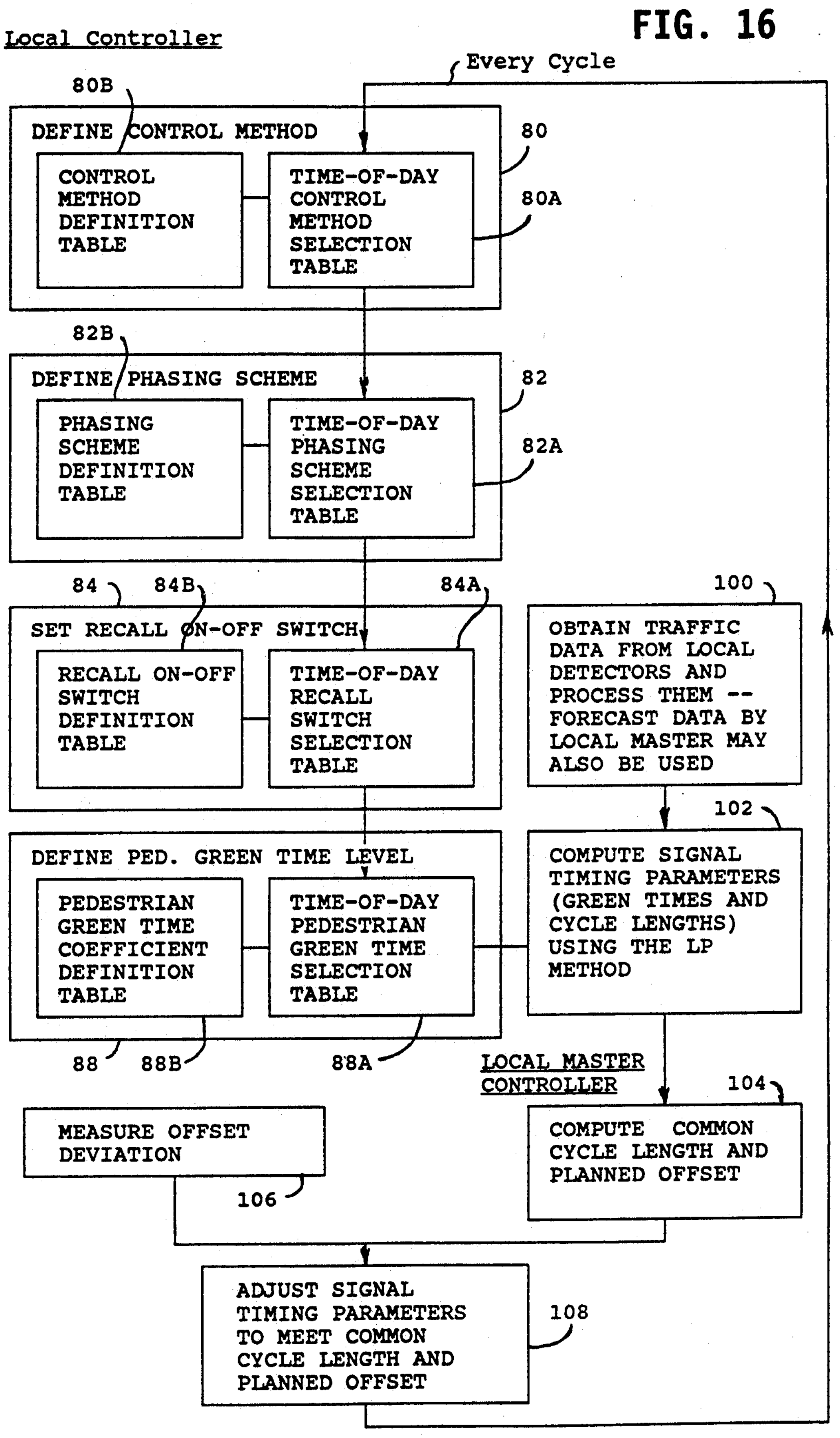
FIG. 16 is a simplified work flow diagram for the traffic-responsive control method.

For this method, the local controller performs the routine presented in FIG. 16 every cycle. The process is as follows:

(1) The local controller defines the signal control method, the signal phasing scheme, the recall switch, and the pedestrian traffic level by the time-of-day table look-up method, as shown at blocks 80, 82, 84 and 88 of FIG. 16.

(2) The local controller collects detector data and processes them so that they can be used for signal timing computation. The local master controller prepares forecasts of traffic demand (if necessary) based on the data from other local controllers in the subarea. The forecast traffic data are sent to the local controller (block 100).

(3) The local controller computes the signal timing parameters with the linear programming method, using either the immediate past or the forecasted traffic data. The outputs are the minimum, optimum, and maximum green times for each movement and the minimum, optimum, and maximum cycle length for the intersection (block 102). The linear programming method is described in detail in this section under the heading "Application of the LP Method".

(4) The local controller sends the locally computed timing parameters to the local master controller.

(5) The local master controller computes the common cycle length and the planned offset (block 104).

(6) The local controller measures the offset deviation (block 106).

(7) The local controller adjusts the local signal timing parameters to accommodate the common cycle length and to catch up with the planned offset (block 108).

The traffic counts used to compute signal timing parameters in the linear programming method will be either (1) locally measured counts at the intersection in the past N cycles or (2) projected counts for the next cycle.

The required pedestrian signal times are obtained using such data as:

(1) The "basic" required green time $g_i$ for pedestrian movement i, which is specified in the intersection geometric data.

(2) The required amber, $y_i$ and inter-green red times, $r_i$, which are specified in the intersection geometric data.

(3) The pedestrian green time variation factor, $a_t$, which is specified in the time-of-day look up table.

The required pedestrian green time for movement i at time t is expressed as $(g_i{*}a_t)$ and the required movement phase time at time t, is expressed as $(g_i{*}a_t)+y_i+r_i$. The required pedestrian movement phase times will become some of the constraints in determining the signal timing parameters in the linear programming method.

Figure 17:
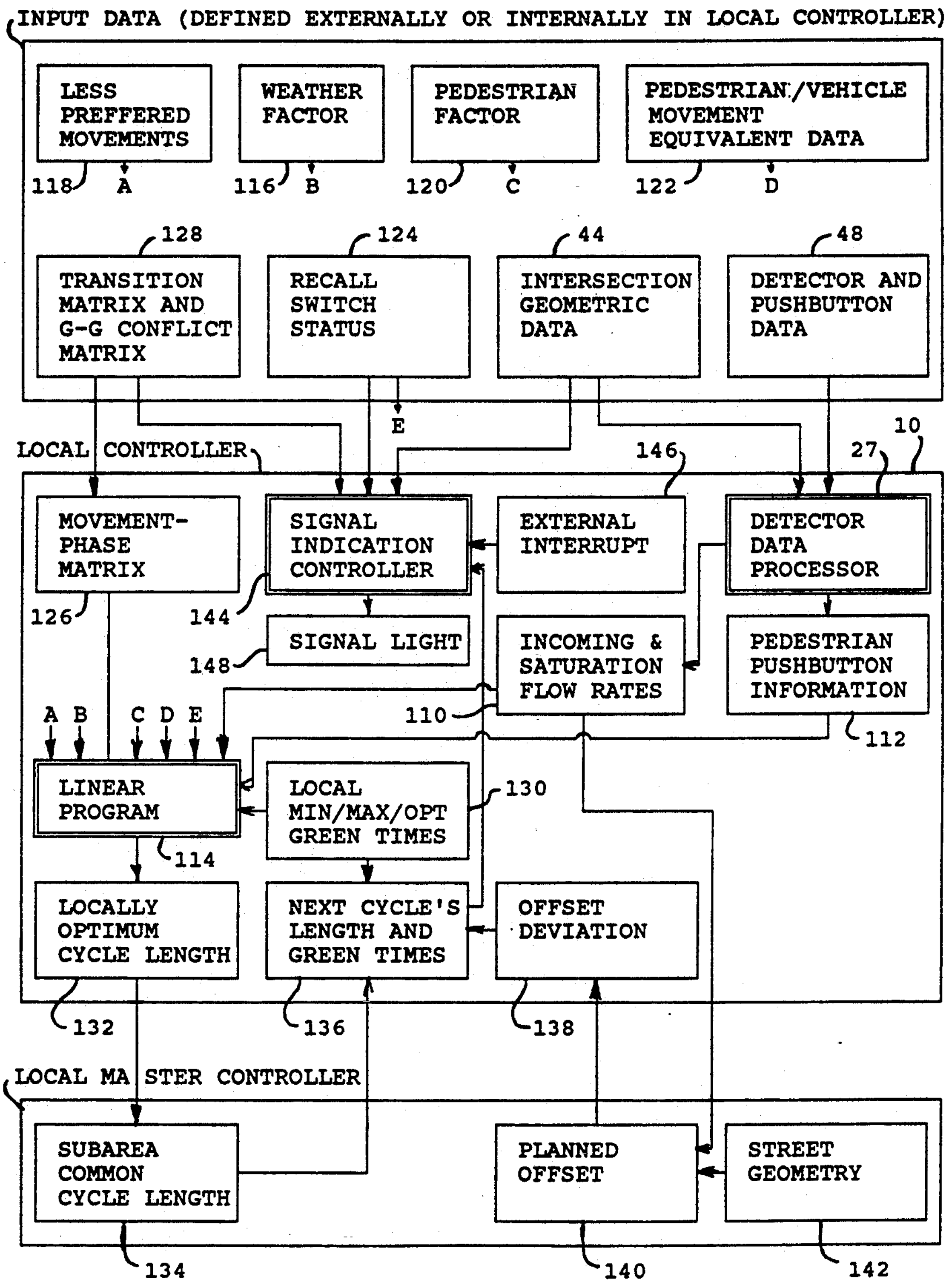
FIG. 17 is a simplified flow chart showing data flow for the traffic-responsive method of operation shown in FIG. 16.

Reference now is made to FIG. 17 wherein a flow chart showing data flow for a traffic-responsive method of operation using linear programming is shown in somewhat greater detail than in FIG. 16 In FIG. 17 detector and pushbutton data 48 are supplied to detector data processor 27. Numerous signal control methods have been suggested in the past and many more signal control methods undoubtedly will be proposed in the future by researchers around the world. Each signal control algorithm could use data that are uniquely defined for it. For example, the linear program method employed in the present invention uses incoming traffic flow and saturation flow data for each movement at the intersection approach. Another algorithm uses the maximum queue length at each approach of the intersection to determine the signal timing plan for the next cycle. Yet another algorithm requires measurements of dynamically changing queue lengths at all intersection approaches to determine the green cutoff on an on-line real-time basis.

Because signal control methods can use any data types, it is not possible to create a superset of detector databases that encompasses all data types. The detector data processor 27 creates and stores all the basic detector data types considered useful in signal control. Some data, such as queue length, may be estimated by processing the detector data further using the advance algorithm processor 24, shown in FIG. 8. The local controller of the present invention is able to handle any type of predefined traffic detector using detector data processor 27. Detector data processor 27 functions as a "universal" interface which takes in inputs from different types of detectors and produces outputs that will be used by signal control processor 22, shown in FIG. 8.

Traffic detector types adapted for connection to detector data processor 27 include conventional loop or ultrasonic detectors, videographic detectors, radar, pedestrian push buttons, preemption and bus detectors, and rail crossing signal detectors. Data taken by the detectors include on/off state of each detector, speed at each detector, speed for each movement or lane, queue length for each movement or lane, pedestrian green request, preemption request, and request for the green signal for the desired movements.

The signal control processor,s detector data-processing software reads in these data and arranges them in a specified format, so that they can be used in signal control. Using only conventional loop and ultrasonic detectors, the detector data processing software 50 (FIG. 10) puts out detector on/off status, cumulative traffic counts, cumulative time occupancy, and estimated vehicular speed every 50 milliseconds or so for each individual detector. Other traffic characteristics data, such as queuing condition and speed, or flow rate, are synthesized by the signal control processor of the local controller from the on/off pulses and detector arrangements. These synthesized data (for example queue length) are not as accurate as those taken from more sophisticated detectors, so the software is designed so that these synthesized data may be automatically replaced when data from the detector with higher accuracy are put into the signal control processor through the "universal" detector interface.

As seen in FIG. 17, detector data processor 27 reads two types of data: detector definition data from intersection geometric data block 44 and detection data from detector and pushbutton data block 48. The detector definition data, or permanent data, define the detector type, detector location and the detector's relationship to traffic movements, and the time interval between data acquisition from the interface. These data are read in whenever new detectors are attached to the local controller. More than one detector type can be attached to a local controller at one time. The detection data (or real-time data) are read in from the detector interface dynamically as the system operates. From the detector definition information, the signal control processor software internally specifies the input data used and output data produced.

For the traffic-responsive method of signal control illustrated in FIG. 17, data derived from detector data processor outputs (and required for linear programming solutions for signal timing) include incoming flow rates and saturation flow rates for each movement as indicated at block 110. Pedestrian pushbutton information shown at block 112 also is derived from detector data processor 27 for use in the linear program. The incoming and saturation flow rates from block 110, and pedestrian pushbutton information from block 112 are shown supplied to linear programming block 114. Pedestrian push-button information, block 112 is an output from the detector data processor, block 27, and becomes relevant only when the recall switch for pedestrians is off.

Various methods for obtaining saturation flow rate from detector outputs may be possible even though the problem is complex and difficult to handle. Detector data processing software to implement the calculation of saturation flow rate from detector data may be included in the advanced algorithm processor 24 of FIG. 8. It here will be noted that in place of calculated saturation flow rates, estimated saturation flow rates for each movement may be used, which estimations may be obtained from observation of traffic at different times of day. Estimated saturation flow rates may be stored in a time-of-day table for use in the linear program solution. Generally, such estimated saturation flow rates are not as accurate as those rates determined in real time.

Weather (or capacity) factor information from block 116 may be supplied to linear programming block 114 for adjustment of estimated saturation flow rates in response to weather conditions, since saturation flow rate may be substantially reduced in inclement weather. In addition, intergreen time may be adjusted for weather. Weather, or capacity, factor is discussed in detail in section 2.2, above.

As noted above, detector data processor 27 not only generates outputs that are used for the present traffic-responsive and traffic-adaptive methods, but also generates other data that may be useful to other signal control methods. With conventional loop or ultrasonic detectors, other data which may be generated by data detector processor 27 include detector status, cumulative traffic counts and occupancy amount for a given time interval, traffic counts and time occupancy for a specified time interval, traffic congestion level for each leg, traffic queue spillover condition for each lane, estimated travel time between intersections and, the number of vehicles in a block. Also, queue length data at the intersection approach may be generated using data detector processor 27.

In addition to weather, or capacity, factor inputs from block 116, less-preferred movement data may be supplied to linear programming block 114 from data input block 118. Often, for example, one movement of non-critical vehicular movements may be determined to be less preferred than another. "Less preferred" movements are those that should not receive longer green times than necessary. For example, if a signal segment consists of a turning movement and a through movement, it may be decided that the turning movement is the "less preferred" of the two, and if there is excess green time for the signal segment of the ring, the traffic engineer will allocate it to the through movement. In this case, the less-preferred movement would be identified at input data block 118. Obviously, less-preferred movements may change during the day in which case inclusion thereof in a time-of-day table would be appropriate. As will become apparent hereinbelow, less preferred movement data is used to convert inequalities to equalities in linear programming constraints to minimize the number of multiple linear program solutions of phase times and cycle length as described hereinbelow.

Pedestrian factor input from block 120 also is supplied to linear programming 84, and also is described above in section 2.2.

Another input for the linear program may include data from a pedestrian/vehicle movement equivalency table, block 122. Here, vehicle movements compatible with pedestrian movements are identified.

Figure 13C:
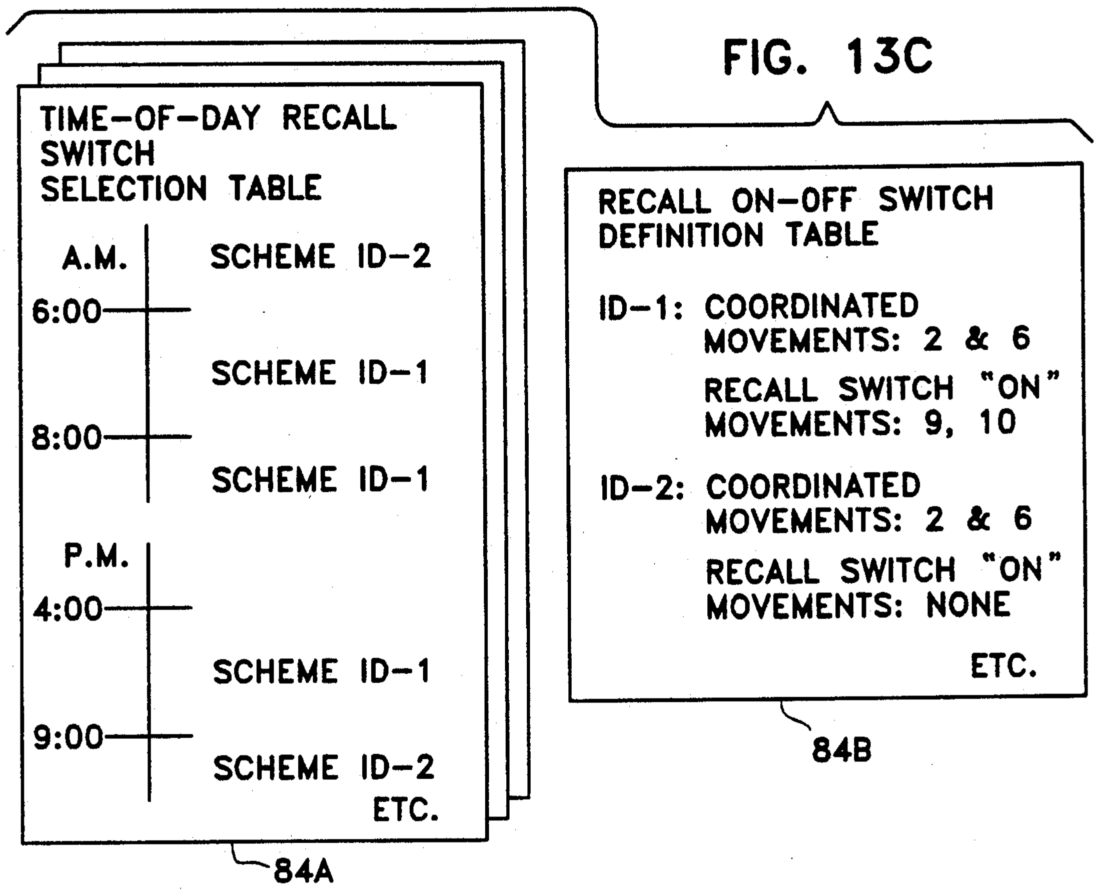
FIG. 13C is a time-of-day selection table and associated definition table for recall switch selection.
Figure 13D:
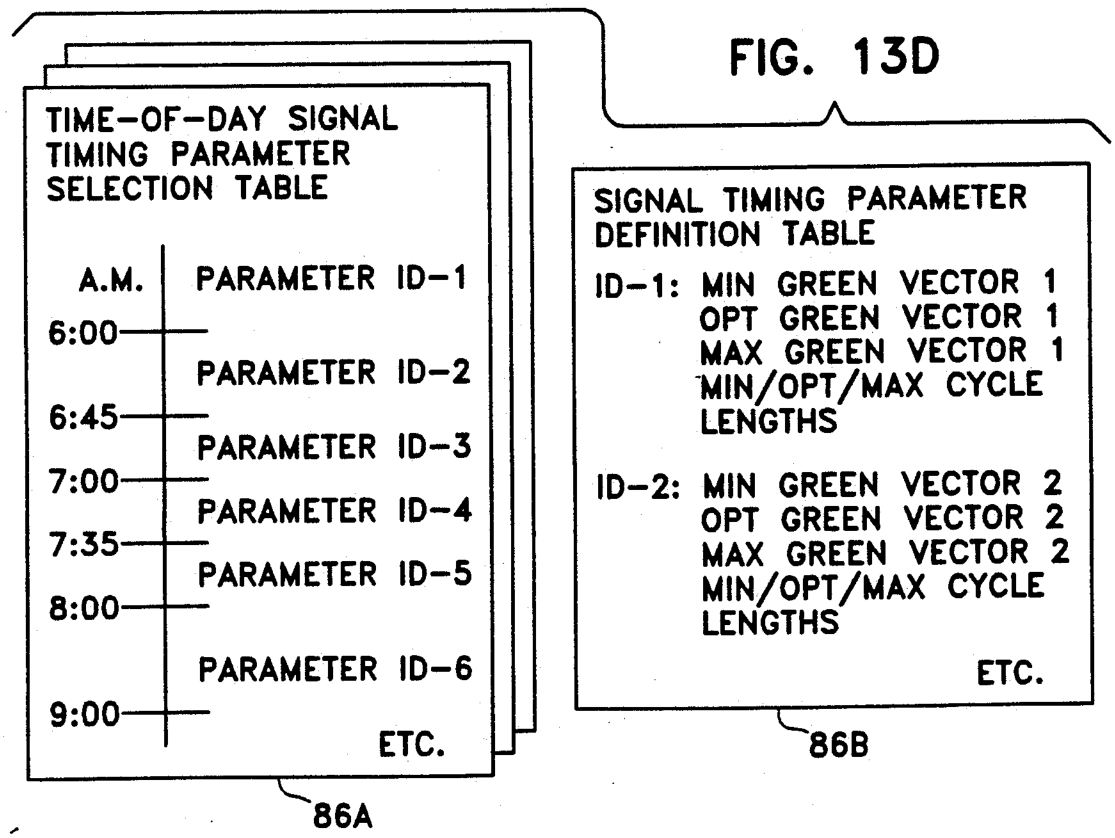
FIG. 13D is a time-of-day selection table and associated definition table for time of day selection of local signal timing parameters.
Figure 13E:
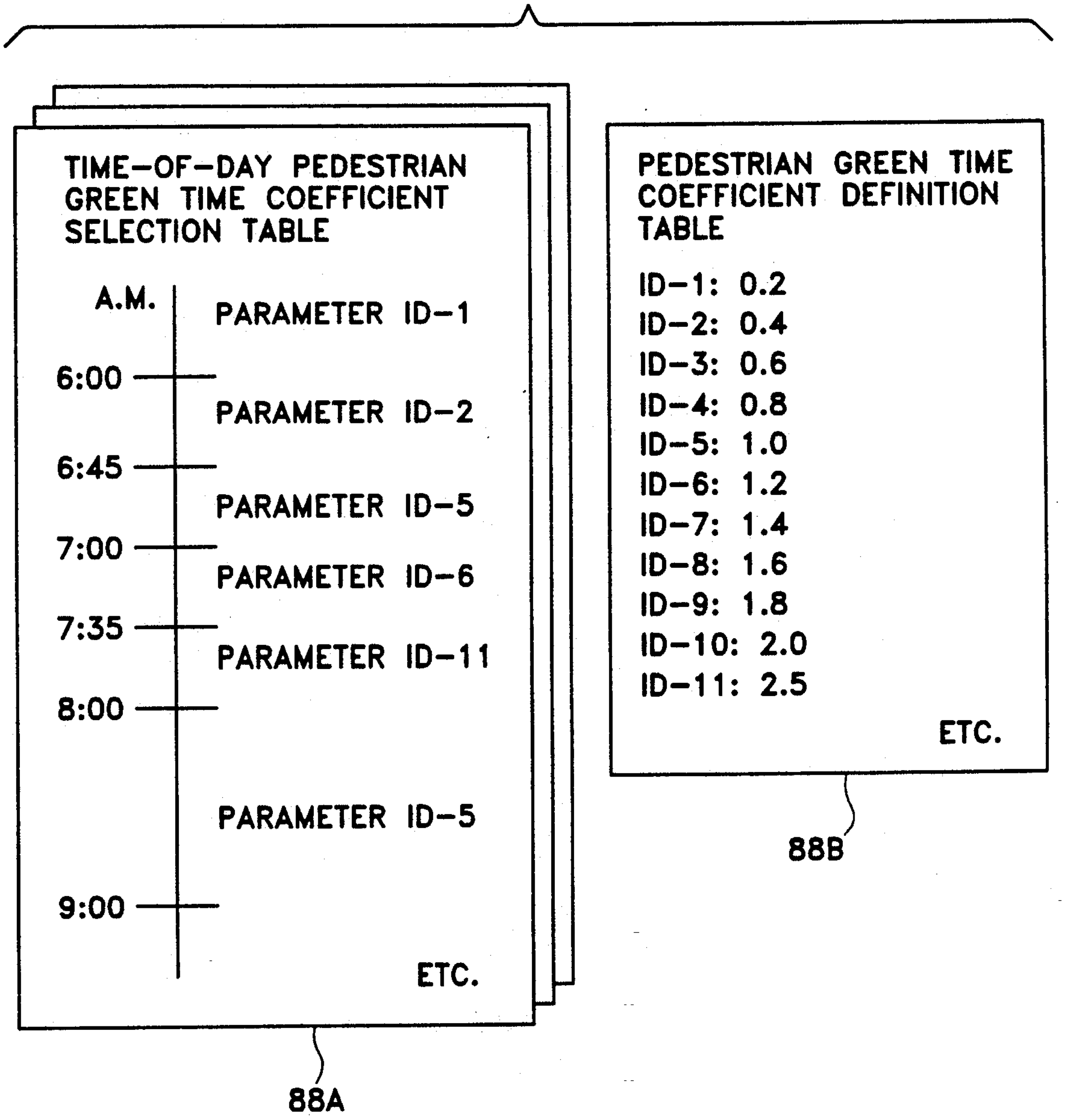
FIG. 13E is a time-of-day selection table and associated definition table for time of day selection of pedestrian green time coefficients.

Recall switch status for each movement also is provided from block 124 to linear programming block 114. As noted above, when the recall switch is "on" for a movement, the movement will receive a green even if no green request is made. Under recall switch "on" condition, phases which include the movement will be included in the linear programming solution. A time-of-day recall switch selection table and associated definition table is shown in FIG. 13C described above.

Input for linear programming block 114 also is provided by a movement-phase matrix, M, from block 127. An example of a movement-phase matrix is shown in FIG. 11C and, as noted above, the matrix indicates the relationship between traffic movements and signal phases. Movement-phase matrix M is generated by the controller from a green-green conflict matrix, G, included in block 128. In FIG. IIB a green-green conflict matrix, G, is shown for the traffic movements depicted in FIG. 4. Data elements 0 indicate that movements are in conflict, and data elements 1 indicate no conflict between movements. The movement-phase matrix, M, shown in FIG. IIC is derived from the green-green conflict matrix, G, by repeating steps (1) through (9) below for $i=1$ to $i=n$, where $n$=the largest movement ID.

(1) Using the green-green (G-G) conflict matrix, look for a movement that will receive the green signal simultaneously with movement i, and call this movement j.

(2) Using the G-G conflict matrix, look for a movement that will receive the green signal simultaneously with movements i, and j. Call this movement l.

(3) Using the G-G conflict matrix, look for a movement that will receive the green signal simultaneously with movements i, j, and l.

(4) Repeat the process until it exhausts all possible movements that could be given the green time simultaneously with movements i, j, l, etc. When the process for this group of movements is done, we call it phase $i_1$.

(5) Using the G-G conflict matrix, look for a non-j movement that will receive the green signal simultaneously with movement i, and call this movement j'.

(6) Using the G-G conflict matrix, look for a movement that will receive the green signal simultaneously with movements i, and j'. Call this movement l'.

(7) Using the G-G conflict matrix, look for a movement that will receive the green signal simultaneously with movements i, j', and l'.

(8) Repeat the process until it exhausts all possible movements that could be give the green time simultaneously with movements i, j', l', etc. When the process for this group of movements is done, we call it phase $i_2$.

(9) Repeat the process until it exhausts all possible combinations for movement i.

Linear programming block 114 computes signal timing parameters using linear programming techniques described in detail hereinbelow. Outputs from linear programming block 114 are supplied to block 130 where the minimum, the maximum, and the optimum green times for each traffic movement to be implemented are determined. The local optimum cycle length, block 132, is the locally optimum, for that intersection, cycle length. This is an output from linear programming block.

The local optimum cycle length from block 132 is supplied to the local master controller 16 where, at block 134, it is used together with optimum cycle length data from other local controllers within a subarea, for the generation of a common cycle length for the subarea.

The next cycle's cycle length and optimum green times for each movement to be implemented are determined at block 136. Inputs for block 136 include minimum, maximum and optimum green times for local control from block 130, common cycle length from block 134, and the amount of offset deviation from block 138.

The planned offset for each intersection, block 140, is computed by the local master controller using input data such as distances between neighboring intersections and traffic flow rate for each movement, which data is supplied thereto from street geometry block 142 and incoming and saturation flow rates block 110, respectively. The offset deviation, block 138, is obtained by computing the difference between the planned offset (from block 140) and the current offset reference point.

As noted above, the offset deviation from block 138 is one of the inputs to block 136 to be used to obtain the next cycle's optimum green times and cycle length. In the traffic responsive method shown in FIG. 17 the cycle length and optimum green times for the next cycle are deterministically defined by block 136.

The next cycle's length and green times from block 136 are supplied to signal indication controller, or signal switch, block 144. Signal indication controller 144 is a flexible switching mechanism which, in addition to next cycle's length and green times from block 136 is provided with inputs from transition matrix, P, and green-green conflict matrix, G, (block 128), recall on/off switch status (block 124), intersection geometric data (block 44) and external interrupts from block 146. Transmission matrix, P, identifies which traffic movement follows another. A transition matrix is shown in FIG. 11A described above. In the transition matrix illustrated in FIG. 11A, movement 2 follows 1, 3 follows 2, 4 follows 3, 1 follows 4, 6 follows 5, 7 follows 6, 8 follows 7 and 5 follows 8. An external interrupt (block 146 of FIG. 17) may be generated when the system is operated by a special control mode, such as local manual control and central interrupt control, or with emergency vehicle control, railroad crossing, bus preemption control, or the like. When a special mode of control is in effect, the signal indication control is overridden by external interrupts. A detailed description of signal indication controller 144 is provided hereinbelow. For present purposes, it will be understood that the signal indication controller controls signal lights identified as signal light indicator block 148. Block 148 represents the green, yellow, red, flashing yellow, flashing green, or flashing red signal light status sent from the signal switch, block 144.

Application of the LP Method

The minimum, optimum, and maximum cycle lengths at each intersection are determined to satisfy both local and system wide optimization of traffic control. The local signal timing parameters such as:

1. The minimum, optimum, and maximum green times for each traffic movement, and
2. The minimum, optimum, and maximum cycle lengths are directly obtained for each intersection using the linear programming method disclosed by the inventor in the above mentioned article, "Timing Design of Traffic Signals", *Transportation Research Record* (No. 1069) Washington, D.C. 1986.

The phasing scheme matrix, here the M matrix shown in FIG. IIC, used in the linear programming method defines the relationship between the signal phase and the traffic movement at the intersection, is automatically generated by the controller from the green-green conflict matrix G shown in FIG. IIB in the manner described above. The traffic data used in the linear programming method include data on the incoming traffic flow to the intersection approach and the saturated outgoing traffic flow from the intersection approach, which is called the saturation flow. These traffic data may be either predicted ones for the immediate future cycles or observed ones in the immediate past cycles.

The linear programming method works if and only if the saturation flow rate for each movement is greater than the incoming traffic flow rate for the same movement. If the degree of saturation (incoming flow/saturation flow) is greater than a certain value, the signal timing will be determined by imposing artificial conditions in the LP method. The artificial conditions are discussed hereinbelow under the heading, "Condition Imposed on Oversaturated Conditions."

Figure 18A:
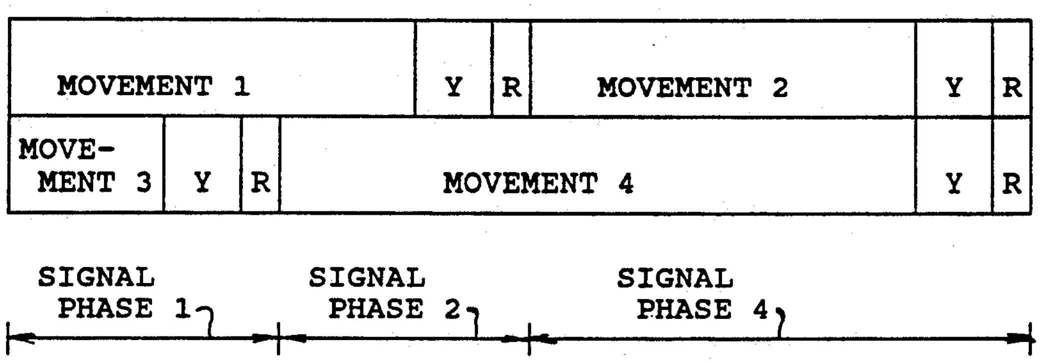
FIG. 18A is a phase sequence diagram showing all phase times longer than the intergreen times.
Figure 18B:
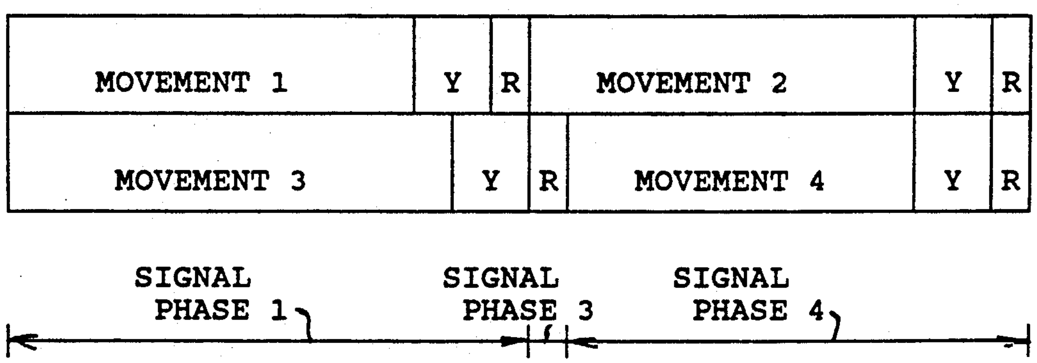
FIG. 18B is a phase sequence diagram in which one signal phase time is shorter than the intergreen time, FIGS. 19A, 19B and 19C together show a flow chart showing operation when the linear program has no solution or the linear programming solution is not acceptable.

To obtain the green times, first the "signal phase times" are obtained by solving a linear program, and then the "movement phase times" from the "signal phase times" are computed. The green times in turn are obtained from the "movement phase times". FIGS. 18A and 18B are examples of signal phase sequence combinations to illustrate phase time and the movement.

The signal phase time denotes the time duration for a signal phase. As noted above, as used in the present application, a phase is a green display given to a combination of movements at the intersection. In the early fixed phase traffic signals, the signal phase time always consisted of the green time, amber time and the intergreen red time following the green time. In the movement oriented signal controller, that is not the case. Sometimes a phase time can be so short that the ending of the intergreen time for one traffic movement overlaps with the starting time of the intergreen time that handles another traffic movement as illustrated in FIG. 18B.

The movement phase time denotes the time duration for a movement, consisting of the green time and the inter green time (amber time plus inter-green red time) following the green time. Unless the signal controller skips the green indication for the movement, the movement phase time is always longer than the duration for the amber and the inter-green red. The movement phase time also may be interpreted as the time duration consisting of the effective green time and the lost time for that movement.

The terminology used in the LP method is defined as follows:

$t_{min,j}$=minimum signal phase time for phase j (sec)
$t_{opt,j}$=optimum signal phase time for phase j (sec)
$t_{max,j}$=maximum signal phase time for phase j (sec)
$\Theta_{min,i}$=minimum movement phase time for movement i (sec)
$\Theta_{opt,i}$=optimum movement phase time for movement i (sec)
$\Theta_{max,i}$=maximum movement phase time for movement i (sec)
$g_{min,i}$=minimum green time for movement i (sec)
$g_{opt,i}$=minimum green time for movement i (sec)
$g_{max,i}$=maximum green time for movement i (sec)
$t_{mmin,j}$=artificially adjusted minimum signal phase time for phase j (sec)
$t_{mopt,j}$=artificially adjusted shortest optimum signal phase time for phase j (sec)
$t_{mmax,j}$=artificially adjusted maximum signal phase time that corresponds to the shortest optimum signal phase time for phase j (sec)
$t_{amin,j}$=artificially adjusted minimum green that corresponds to the artificially adjusted longest optimum signal phase time for phase j (sec)
$t_{aopt,j}$=artificially adjusted longest optimum signal phase time for phase j (sec)
$t_{amax,j}$=artificially adjusted maximum signal phase time that corresponds to the longest optimum signal phase time for phase j (sec)
L=total lost time per cycle (sec)
$L_i$=lost time for movement i (sec)
$L_{i,x}$=lost time adjustment factor for movement i (sec)
r=optimum/minimum cycle length coefficient, which equals to $(1.5L+5)/L$ $y_i$=amber time that follows the green time for movement i (sec)
$r_i$=inter-green red time that follows the amber time for movement i (sec)
$C_{min}$=minimum cycle length (sec)
$C_{opt}$=Optimum cycle length (sec)
$C_{max}$=maximum cycle length (sec)
$C_{mmin}$=artificially adjusted minimum cycle length (sec)
$C_{mopt}$=artificially adjusted optimum cycle length (sec)
$C_{mmax}$=artificially adjusted maximum cycle length (sec)

$a_{ij}$ = cell *ij* of the movement-phase matrix
= 1 if movement *i* is handled by phase *j*
= 0 otherwise $q_i$=incoming traffic flow rate for movement i (veh/sec)
$s_i$=saturation flow rate for movement i (veh/sec)
$t_i$=required time for pedestrian movement i.

The observed saturation flow rate for each movement is used if it is available. If not, the saturation flow rate will be defined as:

$$s_i = (\textit{saturation flow rate as defined by input}) * (\textit{capacity factor}). \quad (1)$$

The minimum signal phase time for phase j, $t_{min,j}$, is defined by finding $$t_{min,1}, t_{min,2}, \ldots, t_{min,n} \quad (2)$$

that minimize $$C_{min} = \sum_{j=1}^{n} t_{min,j} \quad (3)$$

subject to $$\sum_{j=1}^{n} (a_{ij} - q_i/s_i) * t_{min,j} \geqq L_i \quad \text{for } i = 1, \ldots, m \quad (4)$$

for vehicular traffic movements, where $a_{ij}$ = cell *ij* of the movement-phase matrix
= 1 if movement *i* is handled by phase *j*
= 0 otherwise and $$\sum_{j=1}^{n} a_{ij} * t_{min,j} \geqq t_i \quad \text{for } i = m+1, \ldots, l \quad (5)$$

for pedestrian movements, where $t_i$=required time for pedestrian movement i.

In some special cases, where the number of traffic movements equals the number of signal phases and the inverse matrix $A^{-1}$ for matrix $A=a(i,j)$ exists, the linear programs may be formulated in such a manner that it would directly yield the minimum movement phase times as the solution.

The constraints in (4) is identical to saying that the total signal phase times assigned to handle traffic movement i are long enough to handle all the vehicles (of that movement) coming into the intersection in one cycle assuming that the incoming flow follows a uniform arrival pattern and the saturation flow also follows a uniform departure pattern.

The constraints (5) say that the total signal phase times assigned to handle pedestrian movement i must be longer than the required time for that movement.

The minimum movement phase time for movement i (both vehicular traffic and pedestrian traffic,) $\theta_{min,i}$, is obtained as:

$$\Theta_{min,i} = \sum_{j=1}^{n} a_{ij} * t_{min,j} \quad (6)$$

The minimum green time for movement i, $t_{min,i}$ (both vehicular and pedestrian traffic,) is given as:

$$g_{min,i} = \sum_{j=1}^{n} a_{ij} * t_{min,j} - y_i - r_i \quad (7)$$

where
$y_i$=amber time that follows the green time for movement i (sec), and
$r_i$=inter-green red time that follows the amber time for movement i (sec).

If the computed $g_{min,i}$ is less than $t_{ini,min}$ sec (which is defined by the input), we will set $g_{min,i}$ zero to make the movement skipping feasible.

The signal/movement phase times and the cycle time obtained from the above operation are the "minimum" signal/movement phase times, because they are obtained using the assumption that both the incoming flow and the saturation flow for vehicular traffic are uniform flows.

The real-world traffic, however, follow neither the uniform arrival nor uniform departure patterns. In the real world, almost always, there are some fluctuations in the traffic flow.

When there is no pedestrian traffic, and all the critical movements are known, it is easily shown that the minimum cycle time is expressed as:

$$C_{min} = L/(1 - \Sigma q_i/s_i) \quad (8)$$

($\Sigma q_i/s_i$) is the sum of degrees of saturation for all critical movements, and L is the sum of lost times of these critical movements, which we call the total lost time in a cycle.
$q_i$=incoming traffic flow rate for movement i (veh/sec)
$s_i$=saturation flow rate for movement i (veh/sec)

In the publication by Webster, F. V. and B. M. Cobbe, *Traffic Signals*, Road Research Technical paper No. 56., Her Majesty's Office, London, 1966, it was shown by computer simulation that the optimum cycle time that gives the least average delay to all vehicles in the intersection is $$C_{opt} = (1.5 * L + 5)/(1 - \Sigma q_i/s_i). \quad (9)$$

Then, for an intersection that deals "only with vehicular traffic," the optimum cycle time, $C_{opt}$, can be approximated as a function of the minimum cycle time $C_{min}$ and the total lost time, L, and $C_{opt}$ is expressed as:

$$C_{opt} = [(1.5 * L + 5)/L] * C_{min}. \quad (10)$$

and, we will define:

$$r = (1.5 * L + 5)/L = C_{opt}/C_{min}. \quad (11)$$

For the total lost time of 20 sec, (which is considered to be a long total lost time) the coefficient r=1.75, and for the total lost time of 8 sec, (which is considered to be a short lost time) the coefficient r=2.13. In most cases, the r value ranges between these two values.

In real-world operations, the simple multiplication of a coefficient to the minimum cycle time often does not yield the optimum cycle time, because usually pedestrian movements play a very important role in determining signal timing.

Equations (8) through (11) imply that the cycle time obtained for the total lost time of L and the fluctuated vehicular traffic pattern equals the cycle time obtained for the total lost time of (r * L) and the uniform arrival-and-departure-traffic pattern.

Thus, to obtain the optimum signal/movement phase times, we will have to solve another linear program, using r * $L_i$, instead of $L_i$, as the lost time for vehicular movement i.

The problem is that the accurate total lost time, and in turn the accurate r value, cannot be computed until we know the critical movements, and we would not know the critical movements until we have the solution to the linear program. The critical movements for the minimum cycle length may not be the same as the critical movements for the optimum cycle time.

To solve this dilemma, we will approximate the total lost time: First, compute the sum of lost time per cycle for each ring, and then, compare them against one another, and select the maximum lost time per cycle. This operation is expressed as:

$$L = \max_{k}(\Sigma\, L_i \text{ in ring } k) \tag{12}$$

The r value is computed from (11) and (12).

Then, the locally optimum signal phase time for phase j, $t_{opt,j}$, is defined by finding $$t_{opt,1}, t_{opt,2}, \ldots, t_{opt,n} \tag{13}$$

that minimize $$C_{opt} = \sum_{j=1}^{n} t_{opt,j} \tag{14}$$

subject to $$\sum_{j=1}^{n} (a_{ij} - q_i/s_i) * t_{opt,j} \geqq L_i \quad \text{for } i = 1, \ldots, m \tag{15}$$

for vehicular traffic movements, and $$\sum_{j=1}^{n} a_{ij} * t_{opt,j} \geqq t_i \quad \text{for } i = m+1, \ldots, l \tag{16}$$

for pedestrian movements.

Then, the optimum movement phase time, $\theta_{opt,i}$, for movement i (both vehicular and pedestrian traffic) is given as:

$$\Theta_{opt,i} = \sum_{j=1}^{n} a_{ij} * t_{opt,j} \tag{17}$$

The locally optimum green time for movement i, $t_{opt,i}$ (both vehicular and pedestrian traffic,) is given as:

$$g_{opt,i} = \sum_{j=1}^{n} a_{ij} * t_{opt,j} - y_i - r_i \tag{18}$$

The maximum signal/movement phase times are obtained by solving yet another linear program. It is assumed that, for the vehicular traffic movement, the difference between the maximum signal/movement phase time and the optimum signal/movement phase time is equal to the difference between the optimum signal/movement phase time and the minimum signal/-movement phase time. Thus, the fictitious lost time used in the constraints is (2 * r−1) * $L_i$ for vehicular movement i.

The maximum signal phase time for phase j, $t_{max,j}$, is defined by finding $$t_{max,1}, t_{max,2}, \ldots, t_{max,n} \tag{19}$$

that minimize $$C_{max} = \sum_{j=1}^{n} t_{max,j} \tag{20}$$

subject to $$\sum_{j=1}^{n} (a_{ij} - q_i/s_i) * t_{max,j} \geqq (2 * r - 1) * L_i \tag{21}$$

for $i = 1, \ldots, m$ for vehicular traffic movements, and $$\sum_{j=1}^{n} a_{ij} * t_{max,j} \geqq t_i \quad \text{for } i = m+1, \ldots, l \tag{22}$$

for pedestrian movements.

The maximum movement phase time for movement i (both vehicular traffic and pedestrian traffic,) $\theta_{max,i}$, is expressed as:

$$\Theta_{max,i} = \sum_{j=1}^{n} a_{ij} * t_{max,j} \quad \text{for all } i\text{'s} \tag{23}$$

The maximum green time for movement i, $t_{max,i}$ (both vehicular and pedestrian traffic,) is given as:

$$g_{max,i} = \sum_{j=1}^{n} a_{ij} * t_{max,j} - y_i - r_i \tag{24}$$

In some cases, the linear programming method may not produce signal timing parameters that are operationally acceptable. For example, when signal coordination is maintained, the signal green time for the coordinated movements should not be too short. Under such circumstances, it may be necessary to impose an artificial limit, such that the "shortest" optimum cycle length is $C_{mopt}$. If the LP method produces a cycle length of less than $C_{mopt}$, the program will automatically increase the cycle length to $C_{mopt}$ and proportion the green times for each movement so that all of them together will have a cycle length of $C_{mopt}$.

If the optimum Cycle length is artificially adjusted to $C_{mopt}$, then the corresponding maximum cycle length must also be adjusted. The corresponding maximum cycle length is given as:

$$C_{mmax}=C_{mopt} \text{ if } C_{max}<C_{mopt}$$

$$C_{mmax}=C_{max} \text{ otherwise.} \quad (25)$$

Adjusting the maximum cycle time is necessary, because the optimum cycle time may, in some case, become greater than the computed maximum cycle time unless the adjustment is made.

The green times must also be adjusted when the optimum cycle length and the maximum cycle length are artificially adjusted. The artificially adjusted optimum, and maximum green times under this condition are obtained as:

$$g_{mopt,i}=g_{opt,i} * \Sigma g_{mopt,i}/\Sigma g_{opt,i} \text{ for all i's}$$

and $$g_{mmax,i}=g_{max,i} * \Sigma g_{mmax,i}/\Sigma g_{max,i} \text{ for all i's.} \quad (26)$$

Adjusting the minimum cycle time is not necessary, because under this condition, the minimum cycle time will always be shorter than the optimum cycle time.

Another artificial limit deals with the operationally acceptable "longest" optimum cycle length: The optimum cycle length must not be longer than $C_{aopt}$ (2.5 to 3.0 min). If the linear programming method produces a cycle length longer than $C_{aopt}$, the program will automatically reduce the cycle length to $C_{aopt}$ and proportion the green time for each movement so that all of them together total a cycle length of $C_{aopt}$.

If the optimum cycle length is artificially adjusted to $C_{aopt}$, the corresponding minimum and maximum cycle lengths must also be adjusted. The minimum cycle length, $C_{min}$, under this condition is defined as:

$$C_{amin}=C_{aopt} \text{ if } C_{aopt}<C_{min}$$

$$C_{amin}=C_{min} \text{ otherwise} \quad (27)$$

The maximum cycle length, $C_{max}$, under the same condition is defined from $C_{aopt}$ as:

$$C_{amax}=A_1 * C_{aopt} \quad (28)$$

$A_1$ is an arbitrary number that is greater than 1.0.

The artificially adjusted optimum, maximum, and minimum green times under this condition are obtained as:

$$g_{aopt,i}=g_{opt,i} * \Sigma g_{aopt,i}/\Sigma g_{opt,i} \text{ for all i's}$$

$$g_{amax,i}=g_{max,i} * \Sigma g_{amax,i}/\Sigma g_{max,i} \text{ for all i's}$$

and $$g_{amin,i}=g_{min,i} * \Sigma g_{amin,i}/\Sigma g_{min,i} \text{ for all i's.} \quad (29)$$

Conditions Imposed on Oversaturated Conditions

Usually, oversaturated traffic flow means that the traffic flow is in the congested region of the flow-density diagram; i.e. that the traffic flow is less than the capacity (or the saturation flow), and the density is higher than that under capacity conditions. (See FIG. 9.) The linear programming method should work very well under these conditions as long as the sum of the incoming traffic flow rates is less than 1.0. The linear programming method would not function if the sum of saturation degrees approaches or exceeds 1.0.

In real-world operations, however, the sum of saturation degrees could easily reach or exceed 1.0 under heavy traffic condition. To assure that the linear programming method works under oversaturated conditions, some of the parameters must be artificially manipulated when these conditions are detected. The procedure described below must be followed every time before the linear programming procedure is initiated. For each ring the following operations are performed:

1. Compute $Q_s=(\Sigma q_i/s_i)$ for one cycle of each ring.
2. If $Q_s<A_2$, then go to the next ring. Otherwise, we will artificially modify the $q_i$ values, so that the new $Q_s=A_2$. $A_2$ is an arbitrary number less than 1.0. We assume $A_2=0.96$ is a reasonable value to adopt as a default value. The modification operation is described in 3.
3. The saturation flow rate $s_i$ is kept the same. Only the incoming traffic flow $q_i$ is modified. If we denote the modified $q_i$ by $q'_i$, then $q'_i$ is expressed as:

$$q'_i=q_i * A_2/Q_s \quad (30)$$

4. Replace this $q_i$ by $q'_i$.
5. Adjust green times so that the cycle length will become the maximum allowable cycle length.

With these conditions, the linear programming will have a solution, and the resultant signal timing will be practical.

Figure 19A:
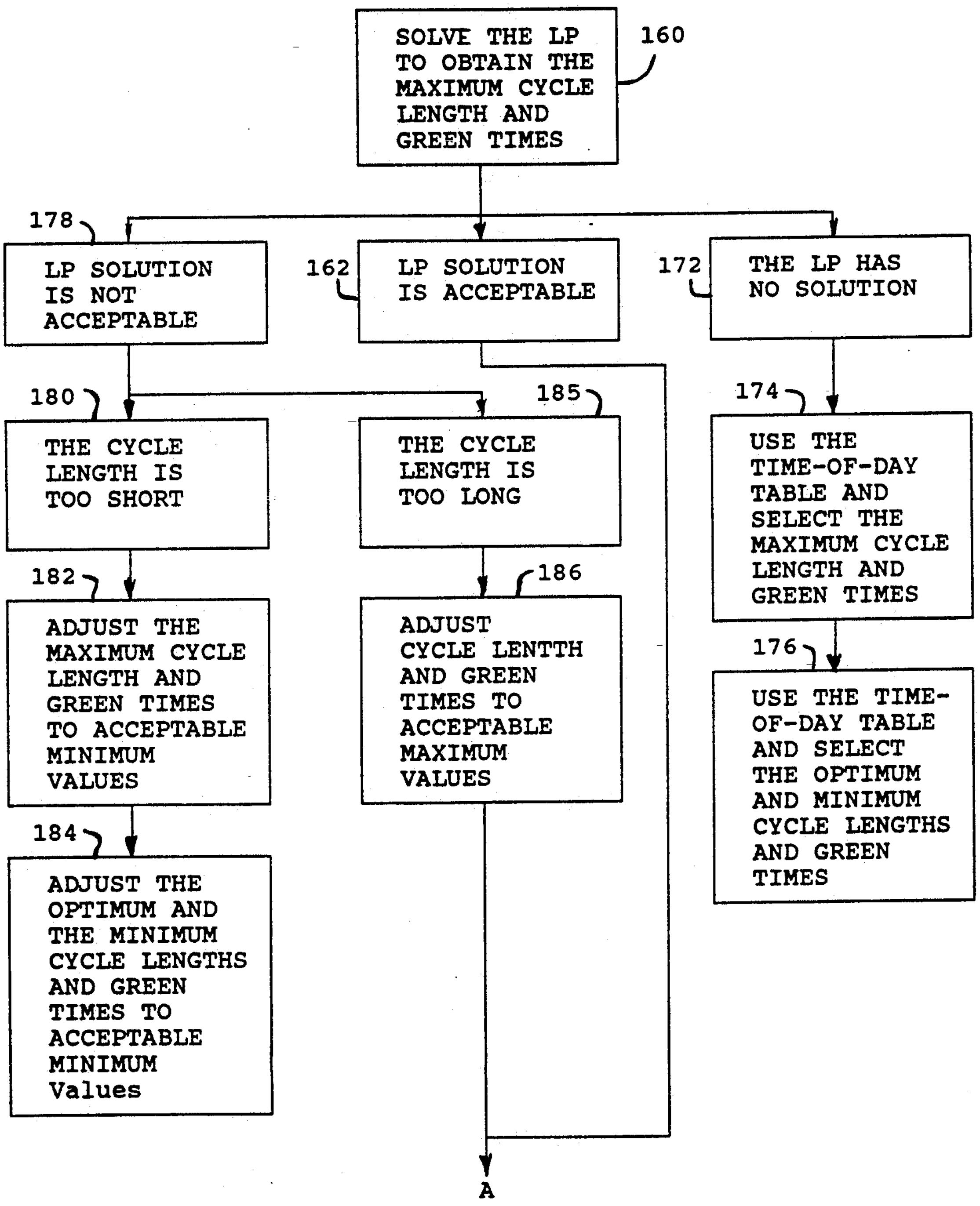
Figure 19B:
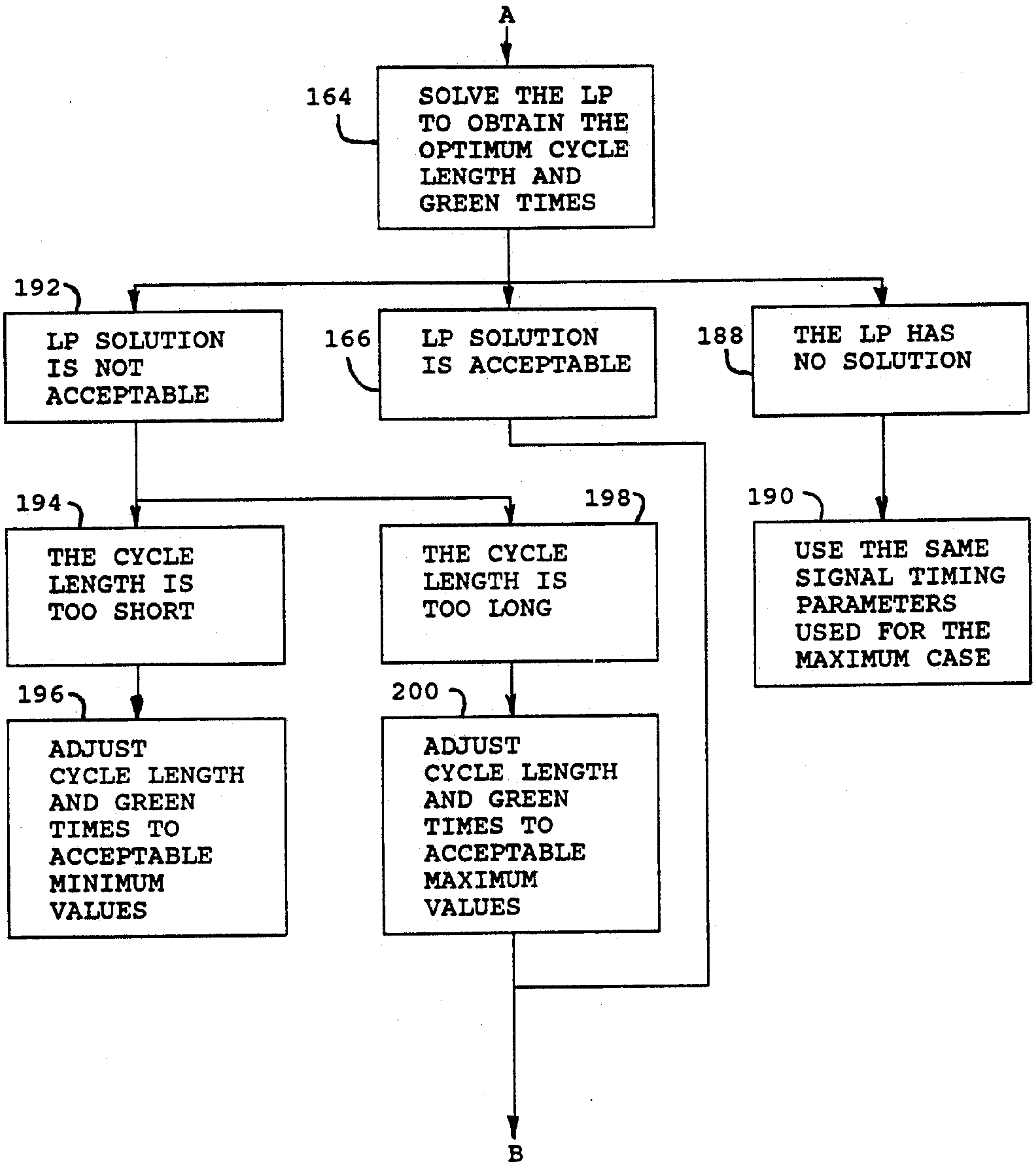
Figure 19C:
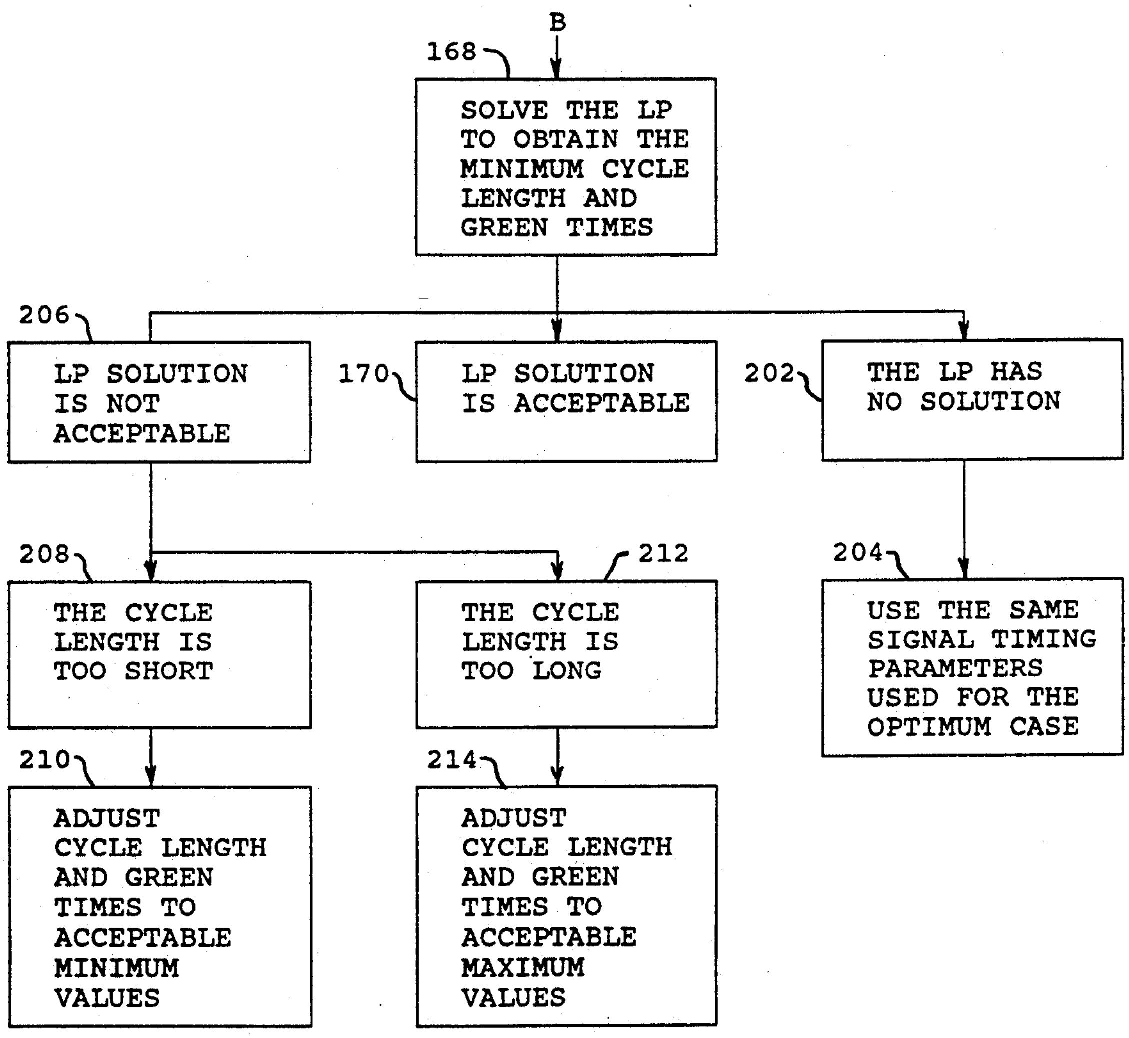

Reference now is made to the flow chart shown in FIGS. 19A, 19B and 19C which depicts operation of the linear programming method when the linear program solution is acceptable, not acceptable, or there is no linear programming solution. As seen at block 160 in FIG. 19A, the maximum cycle length and green times first are determined and, if the linear programming solution is acceptable (block 162), the optimum cycle length and green times then are determined as shown at block 164 of FIG. 19B. If the linear programming solution determined at block 164 is acceptable, as indicated at block 166, then the minimum cycle length and green times are determined as shown at block 166, then the minimum cycle length and green times are determined as shown at block 168 of FIG. 19C. If the solution provided by block 168 is acceptable, as indicated at block 170, then the above-mentioned acceptable maximum, optimum and minimum values are used in further calculations of signal timing parameters.

If the linear program to obtain the maximum cycle length and green times (block 160) has no solution (block 172), then the time-of-day table is used to select the maximum cycle length and green times (block 174), and to select the optimum and minimum cycle lengths and green times (block 176) for use in further calculations of signal timing parameters.

If the linear programming solution for maximum cycle length and green times is not acceptable (block 178) because the cycle length is too short (block 180), then they are adjusted to acceptable minimum values as shown at block 182. Then, at block 184, the optimum and minimum cycle lengths and green times are adjusted to acceptable minimum values, which values, together with values obtained at block 180, are used in further calculations of signal timing parameters. If, on the other hand, the maximum cycle is not acceptable for being too long, (block 185) the cycle length and green times are adjusted to acceptable maximum values at block 186, and operation proceeds to block 164 for computation of the optimum cycle length and green times. If the linear program to obtain the optimum cycle length and green times has no solution (block 188), the same signal timing parameters used for the maximum case are used for both the optimum and minimum signal times parameters. There should be a linear programming solution of optimum cycle length and green times but if for some reason a solution is not obtained, provision is made for using the same signal timing parameters used for the maximum case in subsequent calculations.

If the linear programming solution for optimum cycle length and green times is not acceptable (block 192) because the cycle length is the short (block 194), then the optimum and minimum cycle lengths and green times are adjusted at block 196 to acceptable minimum values. These values, together with maximum, or adjusted maximum, cycle length and green times are used in subsequent computations of signal timing parameters. If the optimum cycle length is not acceptable (block 192) for being too long, (block 198) the cycle length and green times are adjusted to acceptable maximum values at block 200. Operation then proceeds to block 168 for obtaining the linear programming solution for the minimum cycle length and green times.

If the linear program to obtain the minimum cycle length and green times has no solution (block 202), minimum cycle length and green times which are the same as those used for the optimum case are used as shown at block 204. If the linear program solution for the minimum cycle length is not acceptable (block 206) for being too short (block 208), then the minimum cycle length and green times are adjusted to acceptable minimum values (block 210). These values, together with maximum and optimum cycle lengths and green times obtained above are employed in subsequent computations of signal timing parameters. If the minimum cycle length is not acceptable for being too long (block 212) the cycle length and green times are adjusted to acceptable maximum values at block 214. The adjusted minimum cycle length and green times together with maximum and optimum cycle lengths and green times obtained above are used in subsequent computations of signal time parameters.

As described above, adjustment has been made in the LP procedure for oversaturated traffic conditions; therefore we should not expect to observe "no solution" too frequently, although "no solution" is still possible even with the adjustment. In real-world applications, if "the LP has no solution," the local controller will use the time-of-day look-up table to determine signal timing. (To make it possible, we must prepare a time-of-day look up table for all local controllers—this table could contain as few as three sets of timing parameters for different times of the day.)

Consideration for Multiple LP Solutions

If the LP, as described in this section, is applied directly to real-world traffic, it will usually produce more than one solution. Some solutions may be acceptable to the traffic engineer, and some may not. To guarantee that the solution is acceptable to the traffic engineer, the LP must be slightly modified.

Figure 21:
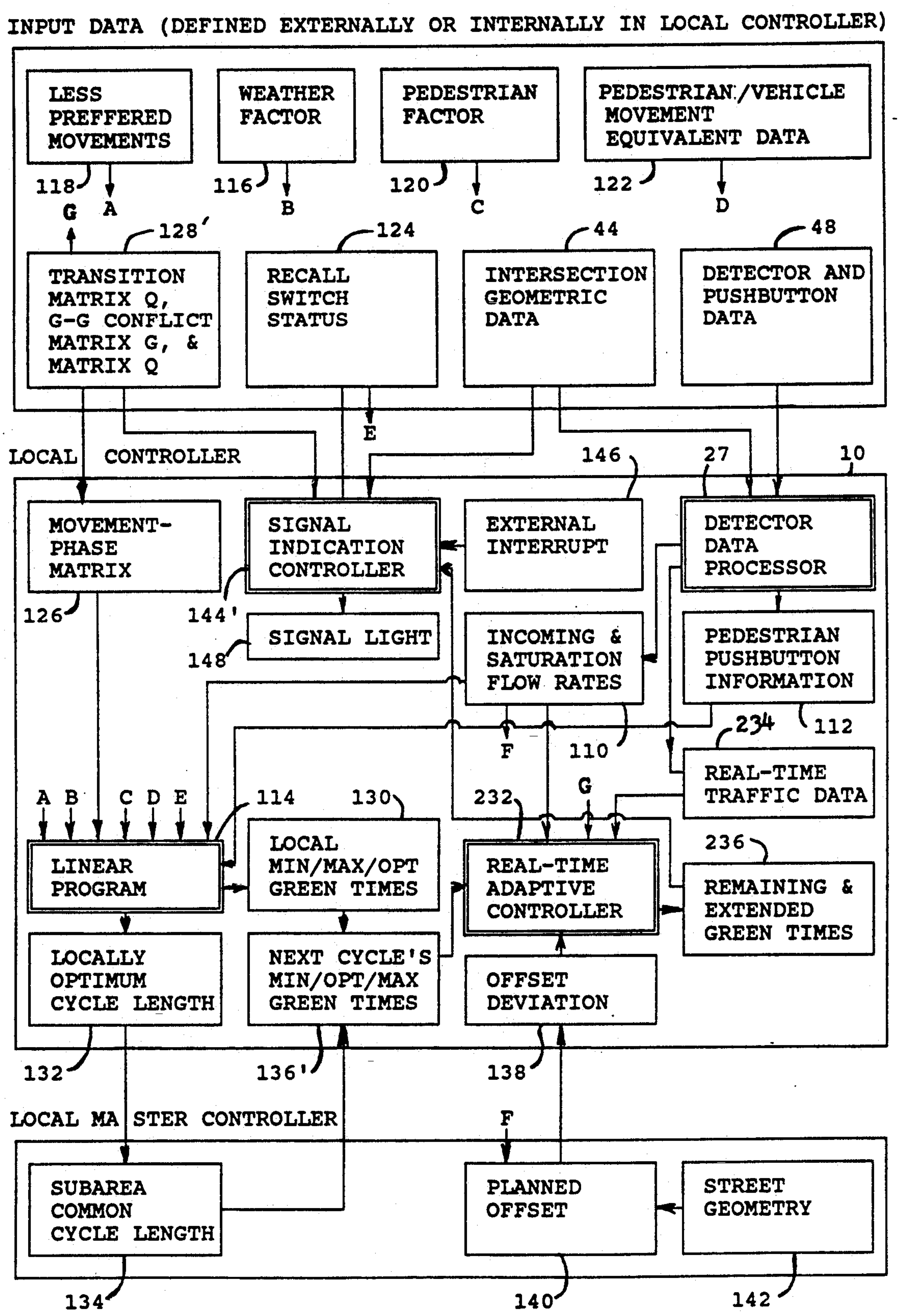
FIG. 21 is a simplified flow chart showing data flow for the traffic-adaptive method of operation shown in FIG. 20.

The proposed modification will be in the constraints for vehicular traffic. In the modified version, we will have to specify in the input the vehicular movements that we consider "less desirable", or "less preferred" than others. "Less desirable" movements are those that should not receive longer green times than necessary. For example, if a signal segment consists of a turning movement and a through movement, we may decide that the turning movement is the "less desirable" movement of the two, and if there is excess green time for the signal segment of the ring, the traffic engineer will allocate it to the through movement. In FIGS. 17 and 21, less desirable movements are identified at input data block 118.

In the LP constraints, "less desirable" movements will have equalities instead of inequalities. This means that the green signal will last just long enough to handle the "less desirable" movements, and the number of multiple linear programming solutions will be reduced.

Consideration for Pedestrian Movements

As described herein, pedestrian movements have been treated as independent movements. Pedestrian movements, however, are usually given the green signal simultaneously with one or more vehicular traffic movements. The LP could be set up without the variables that represent pedestrian movements. This may be done by using variables to represent pedestrian movements instead of vehicular traffic movements in the LP constraints.

Variations of the LP Method

A variety of LP-based traffic-adaptive signal control methods are possible. Some variations between the "pure" LP method and the "full" traffic-adaptive method are:

(1) Turning-traffic actuation with a phase-skipping function—Basically the same as the linear program method, except that it will actuate the turning traffic and set the minimum green to zero when the minimum green time computed by the LP method is less than a preset value (so phase skipping becomes possible). The value obtained from the LP results is used as the green time for the signal segment (the green time duration for one street). The actuation function basically is to cut off the green when no traffic is detected within the secured time, which starts from the initial green period, and whenever traffic is detected to extend the green by a unit extension amount. When the green period reaches its maximum, it is automatically cut off. This method of actuation operation is the commonly used conventional method, except that the unit extension amount is adjusted automatically.

(2) Green cutoff at queue backup—In addition to (1) above, this method incorporates the green cutoff function for any movements when a queue backup is detected.

(3) Addition of adaptive-control capability to through movements in (1) and (2). The adaptive-control method is similar to the actuation type described in (1) above. The adaptive method is designed so that it will control all conditions ranging from extremely light to oversaturated conditions.

These variations could be implemented in the SCP of the local controller.

With these conditions, the LP will have a solution, and the resultant signal timing will be practical.

Consideration on the Dual Problem

In the LP method, linear programs for signal phase times are solved. The linear programs may be formulated in such a manner that they would directly yield the critical movements' phase times as the solution. This is almost identical to the dual problem of the linear program. The linear program seeking the minimum movement times (of critical movements) may be formulated as:

To find minimum movement phase times $$\theta_{min,1}, \theta_{min,2}, \ldots, \theta_{min,m} \quad (31)$$

that maximize $$\sum_{j=1}^{m} \Theta_{min.i} \quad (32)$$

subject to $$\sum_{j=1}^{m} (a_{i,j} - q_i/s_i) * \Theta_{min,i}/L_i \leqq 1 \quad (33)$$

for $j = 1, \ldots, n$ for vehicular traffic movements, and $$\theta_{min,i} \geqq t_i \text{ for } i \in 1, \ldots, m \quad (34)$$

for pedestrian movements.

The solution of the linear program does not yield the minimum movement phase times for non-critical movements. Therefore, we still have to solve the primary problem (of the linear program) first in order to obtain green times for each movement.

The optimum and the maximum movement phase times of critical movements will be obtained in a similar manner.

Consideration on Detector Implementation

To operate the LP method, detectors must be implemented for every movement (at least one detector per movement) of the intersection. The necessary number of detectors to be implemented in the same lane could be as small as 2. The saturation flow rate will be measured by the detector that is placed closest to the stopline of the intersection, and the incoming flow rate is measured by the detector that is placed far away enough (longer than the maximum queue length at the intersection) from the intersection stopline.

If the detector data processing module indicates that the inflow traffic rate for any lane cannot be obtained because of the detector failure, the local controller should not select the LP method. The saturation flow rate may be manually observed for certain time period in the day, and the observed value may be used for the LP method.

Inputs and Outputs

The inputs to the LP method include:

1. Detector status for each detector—active or nonactive (default value: nonactive),
2. Base saturation flow rate per lane for each movement (default value: 2,000 veh/hour/lane for through traffic and 1,500 veh/hour/lane for turning traffic),
3. Incoming traffic flow rate per lane for each movement (default value: not defined),
4. Lost time (amber and inter-movement-red times) for each movement (default values: 4 and 2 sec),
5. Capacity factor ID (default value: 10),
6. Matrix indicating the relationship between the movements and the phases (default values: not implemented),
7. Minimum pedestrian crossing time (default value: read in from the intersection geometry data table),
8. Pedestrian flashing green time (default value: read in from the intersection geometry data table),
9. Movements to be coordinated (default values: read in from the intersection geometry data table),
10. Artificial minimum green cut off time ($t_{ini,min}$) (default value: 3 sec),
11. Artificial cycle length limits:
    $C_{mopt}$ (default value: 0 sec)
    $C_{aopt}$ (default value: 150 sec), and
12. parameters used to compute artificial cycle lengths:
    $A_1$ (default value: 4/3)
    $A_2$ (default value: 0.96).

The outputs from the LP method include:

1. Cycle ID, and date,
2. Clock time,
3. Day of the week, and holiday ID,
4. Capacity factor ID,
5. Special event ID,
6. IDs of tables used,
7. Executed phasing sequence,
8. Coordinated movements,
9. Minimum green time for each movement,
10. Minimum cycle length,
11. Optimum green time for each movement,
12. Optimum cycle length,
13. Maximum green time for each movement,
14. Maximum cycle length,
15. Optimum cycle length,
16. Executed green time for each movement,
17. Executed cycle length,
18. Planned offset execution time,
19. Adjusted offset execution time, and
20. Actual offset execution time.

2.3.3 On-Line Real-Time Traffic-Adaptive Control Control Method

Figure 20:
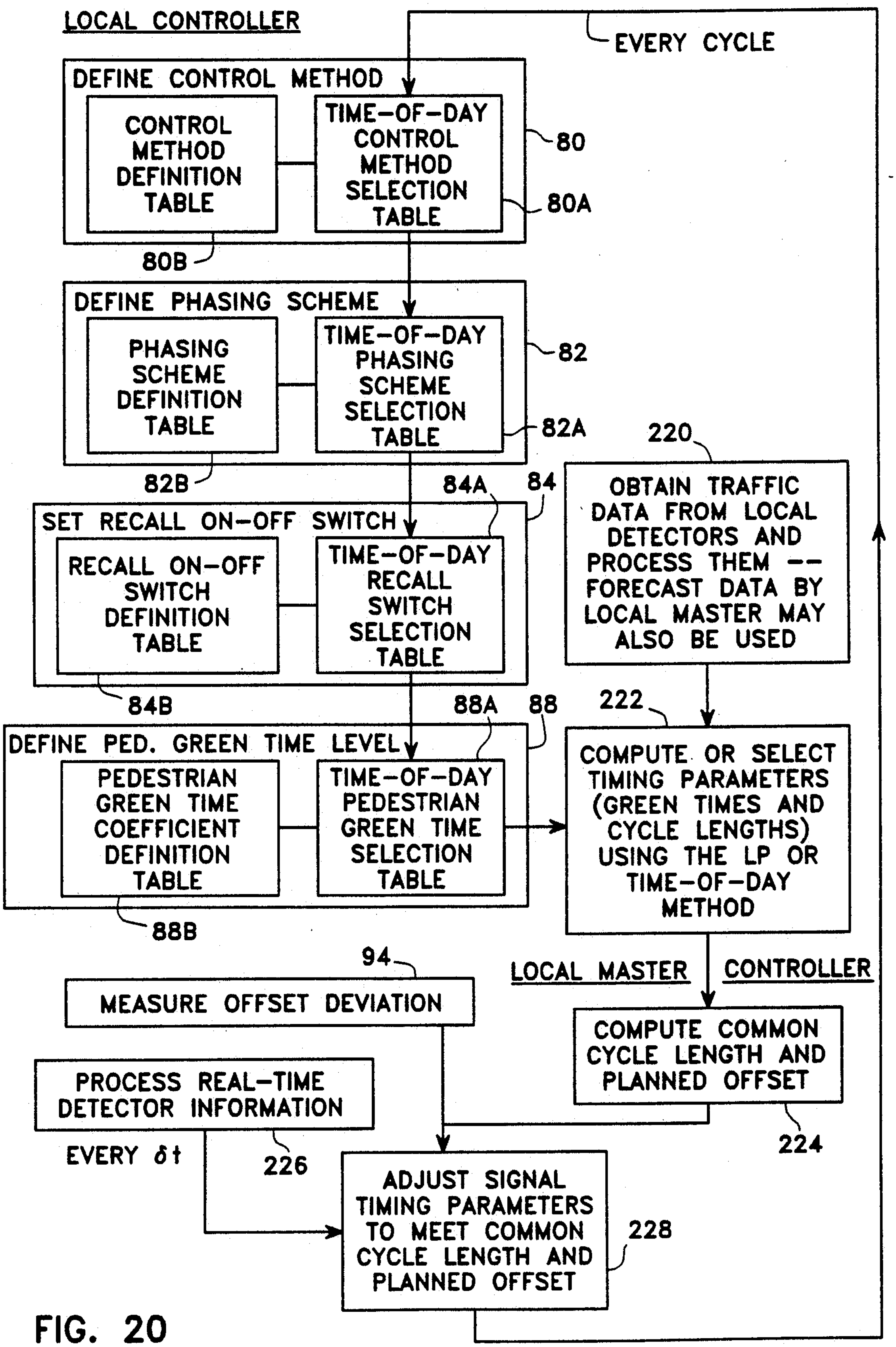
FIG. 20 is a simplified work flow diagram for the on-line real-time traffic-adaptive control method of this invention.

The on-line real-time traffic-adaptive signal control method operates in somewhat similar manner as the traffic-responsive method. In this case also, the unit of signal operation is one cycle. FIG. 20 is the conceptual work flowchart. The work performed in the on-line real-time traffic-adaptive control method is:

(1) The local controller defines the signal control method, the signal phasing scheme, the recall switch status, and the pedestrian traffic level by the time-of-day table look-up method (blocks 80, 82, 84 and 88 in FIG. 20).

(2) The local controller collects and processes the traffic detector data to be used in computing signal timings. The local master controller forecasts traffic counts (if necessary) using the data from various local controllers in the subarea. The forecast traffic counts are sent to the local controller (block 220).

(3) The local controller computes the signal timing parameters with the LP method using the forecast traffic data, or selects the signal timing parameters with the time-of-day table look-up method. In either case, it obtains the minimum, optimum, and maximum green times for each movement and the minimum, optimum, and maximum cycle length for the intersection (block 222).

(4) The local controller sends the locally computed (or selected) timing parameters to the local master controller.

(5) The local master controller computes the common cycle length and the planned offset (block 224).

(6) The local controller measures the offset deviation (block 94).

(7) The local controller processes the detector information on an on-line real-time basis (block 226).

(8) The local controller adjusts local signal timing to accommodate the common cycle length and to catch up with the planned offset and the on-line real-time detector information (block 228). Also, see the following section.

The signal control procedure is similar to that for the traffic-responsive control method. The major difference is that in the traffic-responsive traffic control method, the green time for each movement is computed before the cycle starts, while in the traffic-adaptive method, the green time is determined using the on-line real-time detector information. The minimum and maximum green times for each movement computed using the LP method (or selected using the time-of-day look-up table) are used as the lower and upper limits for extending green times. The common cycle length for the subarea is used to keep the offset reference points (ORPs) of the cycle in proper coordination. In the on-line real-time traffic-adaptive method, the common cycle length will not become visible, because the green time for each movement varies within the minimum and maximum boundaries.

Reference now is made to the data flow chart of FIG. 21 for the traffic-adaptive control method which employs many of the functions of the traffic-responsive method illustrated in FIG. 17. Functions shown in FIG. 21 which correspond to those shown in FIG. 17, and which are described above, include those for blocks 27, 44, 48, 110, 112, 114, 116, 118, 120, 122, 124, 126, 130, 132, 134,138,140,146 and 148. Block 128' differs from block 128 by the inclusion of a Q matrix, data from which matrix is supplied to a real-time adaptive controller, block 232. A Q matrix is shown in FIG. IID and described in detail below. It here will be noted that zero-containing cells are identical for both the green-green conflict matrix, G, of FIG. 11B and simultaneous green matrix Q. Only non-zero data elements differ in value. It will be apparent, therefor, that green-green matrix, G, is a subset of simultaneous green matrix, Q, since green-green conflict information is contained in matrix Q. Obviously, the simultaneous green matrix, Q, may be used in place of green-green conflict matrix p if the contents of cells containing numerals 2, 3 and 4 are interpreted as cells containing ones.

In addition to the Q matrix data from block 128', real-time adaptive controller 232 is provided with next cycle's minimum, maximum and optimum green times from block 136'. With the traffic-adaptive method, the next cycle's minimum, maximum, and optimum green times from block 136, define the range of the green time, instead of the exact green time length. The adaptive method fine-tunes the green time so that it will best reflect the current traffic condition within this green time range.

Real-time traffic data, block 234, are input data for the real-time adaptive-control algorithm. The queue backup status and detector occupancy status at each approach lane belong to this category.

Real-time traffic-adaptive controller 232 comprises a program for on-line real-time processing of whether to extend or cut off the green signal using the real-time traffic data. The real-time traffic-adaptive algorithm illustrated herein uses the minimum and the maximum green times either computed by the linear programming method or selected by the time-of-day method as the basis of signal timing.

The remaining and extended green times, block 236, are determined from the current green status and the green extension and/or cut-off policy determined by the real-time traffic-adaptive algorithm.

On-Line Real-Time Traffic-Adaptive Algorithm

A simple algorithm to perform on-line real-time traffic-adaptive signal control is installed in the signal control processor SCP of the local controller of this invention.

The traffic-adaptive control method proposed here is simple powerful enough to handle problems that have been difficult to deal with in the past.

The objective is to maximize the traffic throughput by minimizing the ineffective use of the green time. This objective is achieved by imposing questions relevant to green time extension in an on-line real-time basis.

In this method, the local controller keeps track of the status of all detectors at and around the intersection. The vehicular detector types around the intersection are identified as follows:

1. Detector Group (i-A): Detectors in the approach lanes of the ith movement, and
2. Detector Group (i-X): Detectors in the exit lanes of the i-th movement.

For the i-th vehicular movement in ring j, the detector status is classified as follows:

1. For Detector Group (i-A): Detectors in the approach lanes for the i-th movement, the traffic level is classified into the following three levels:
   - Level 3: More than $X_{j,i}$ percent of the lanes in the current approach have registered traffic in the past $\delta_t$, where the value of $X_{j,i}$ will be defined by the user. (If any one of the detectors in the same approach lane —usually more than one detectors is placed at the intersection approach lanes—registers traffic in the past $\delta_t$, it is said that the lane has registered traffic.)
   - Level 2: More than 0 percent but less than $X_{j,i}$ percent of lanes in the current approach have registered traffic in the past $\delta_t$.
   - Level 1: No traffic has registered in the past $\delta_t$.
2. Detector Group (i-X): Detectors in the exit lanes for the i-th movement, the queue status is classified into:
   - Yes: Indicates queue backup
   - No: Otherwise.

Whether or not the current green signal for the current vehicular movement (let us assume that the current movement is movement i) should be extended or cut off is determined based on the green indication status and on the detector information obtained from all detectors in and around the intersection.

The signal status update, which includes green extension and/or green cut off operation is performed every $\delta_t$ seconds. Green extension and cut off decision criteria to be applied will be different depending on what is called the current green state.

The current green state for the vehicular movement is classified into the following five cases:

(A) It is between the start of the green time and $e_i$ seconds before the minimum green time.

(B) It is in the $e_i$-second duration just prior to the minimum green time.

(C) It is between the minimum green time and $e_i$-second before the maximum green time.

(D) It is in the $e_i$-second duration just prior to the maximum green time.

(E) It is after the maximum green time.

Under (A) and (B), the vehicular green signal indication for the current movement (movement i) will be cut off if condition (1) lasts for $e_i$ seconds and at the end of $e_i$ condition (2) is satisfied:

(1) For the vehicular movements,
Detector Group (i-A) status is Level 1, and
Detector Group (i-X) status is Yes.

(2) The pedestrian movement that is programmed to end green indication simultaneously with vehicular movement i is ready to be changed to red (currently in green flashing), or the pedestrian signal is currently in the red indication.

Under (B) and (C), the vehicular green signal indication for the current movement (movement i) is extended by $e_i$ sec from the end of the current time increment (the amount $e_i$ is variable), if the following condition is met (See FIG. 22):

Detector Group (i-A) status is Level 3, and
Detector Group (i-X) status is No.

Under (D) and (E), the vehicular green signal indication for the current movement (movement i) is extended by $e_i$ sec from the end of the current time increment (the amount $e_i$ is variable), if the following condition is met:

Detector Group (i-A) status is Level 3, and
Detector Group (i-X) status is No, and
Detector Group (j-A) status is Level 1 for all $j \neq i$.

If the above conditions are not met under (A) through (E), no special action will be taken regarding the green extension or cut-off. (The green indication can continue as long as the remaining green lasts, and the green is automatically cut off when the remaining green expires.)

Here, the unit green extension amount, $e_i$, is a variable that is frequently changed (as frequently as every cycle). The minimum value $e_i$ can have is $e_{i,min}$ sec and the maximum value it can have is $e_{i,max}$. We assume that the proper amount for the $e_{i,min}$ will be $\delta_t$ and the $e_{i,max}$ will be 1 to 6 sec. These values will vary depending on the number of detectors placed at the intersection approach in each lane.

The algorithm reduces the unit green extension by $\delta_t$ if none of the green times in cycle i (last cycle) and cycle i-1 (the cycle before the last) have been forced to cut off before the minimum green or extended longer than the maximum green, and:

$$C_i/C_{i-1} > 1.0 \text{ and}$$

$$\mu_i/\mu_{i-1} < 1.0 \qquad (35)$$

where $C_i$=The observed cycle time for cycle i (the last cycle)

$\mu_i$=The degree of saturation used to compute the cycle time for cycle i

The algorithm increases the unit green extension by $\delta_t$ if none of the green times in cycle i and cycle i-1 have been forced to cut off before the minimum green or extended longer than the maximum green, and:

$$C_i/C_{i-1} > 1.0 \text{ and}$$

$$\mu_i/\mu_{i-1} < 1.0 \qquad (36)$$

Otherwise, the algorithm will keep the present unit green extension.

$e_i$ may be varied between $e_{i,min}$ and $e_{i,max}$. Criteria (35) and (36) are not applicable when the local controller is in the offset catchup mode; i.e., the observed offset deviation amount $F_{dev}$ is greater than a certain value ($A_4$ sec). If $F_{dev} > A_4$, Criteria (35) and (36) will be ignored and the currently operational unit extension will be used.

The criteria (35) and (36) were constructed on the premise that the cycle length should reflect the degree of saturation, and therefore, in any two consecutive cycles, if the degree of saturation increases, the cycle length should also increase.

In the above discussion, "green cut off" or "green extension" does not mean, to cutting off or extending the green for the movement by itself. The "green cut off" means to reduce the remaining green to zero, and "green extension" means to extend the remaining green for that movement.

If the signal phase consists of one vehicular traffic movement and possibly one pedestrian movement, the problem is simple—the green extension, cut off policy for the vehicular traffic movement (and the pedestrian traffic) will be adopted as the policy for the signal phase timing. In a multi-movement signal phase, sometimes one movement must end before the others, and some times all of them must end at the same time. The procedure in determining the green extension policy could involve more than one stage of decision making. The procedure uses the Q matrix shown in FIG.11D that indicates the simultaneous green indication scheme. Each cell of the Q matrix, $q_{i,j}$ indicate the green signal indication relationship between movements i and j, and can have values ranging from 0 to 4. The value zero means that movements i and j should not be given green indication at the same time. For those movement pairs that are simultaneously given green indication, three case are possible as follows:

Case A: The green times for movements i and j can be terminated independent of each other ($q_{ij}$=1)

Case B: The green times for movement i must be terminated at the same time or before movement j ends ($q_{ij}$=2)

Case C: The green times for movement j must be terminated at the same time or before movement i ends ($q_{ij}$=3)

Case D: The green times for movements i and j must be terminated at the same time ($q_{ij}$=4)

We also define:

Green extension policy—the policy regarding green time extension, cut off, or do nothing.

Current remaining green time for a movement—each traffic movement that is receiving the green signal is assigned a remaining green time.

Desired remaining green time for a movement—the green extension policy is determined in several stages. When a green extension policy is tentatively adopted for a movement in a stage, the algorithm will store the newly computed remaining green time, instead of immediately taking an action.

Simultaneous green indication scheme—cases involved with simultaneous green indication are expressed by a matrix, we call the Q matrix, each cell of which can take values 1 to 3 as shown below for simultaneously lit green movement pair. All other cells of the matrix has a value of zero. The multi-stage procedure of determining the green extension policy is described below (See also FIG. 23):

First Stage (1) Determine the desired qreen extension policy (extend, cut off, or do nothing) for each movement independently of other movements (this green extension decision making process is presented in the earlier discussion of this section).
(2) For each movement, record the current remaining green time, and the desired remaining green time.
(3) Using the Q matrix, identify the currently active movement pairs that can end the green signal independent of other movements.
(4) If any of the movements belong to this category, replace the current remaining green times by the desired remaining green times, and execute signal control. Scratch these movements off the Q matrix—for them, the green extension policy have been established.
(5) Look for movements that have 0 desired remaining green time. If there is none, (it means that none of the current green indications will be terminated, and thus no conflicting decision will result in green extension policy making. We can execute the green extension policy—replace the current remaining green times by the desired remaining green times for all the movements. Otherwise go to the next stage.

Second Stage (1) Usrng the Q matrix, identify sets of currently active movements that must end the green signal at the same time (we call each of them a movement group—some of them may have only one movement in a set, and others may have more movements).
(2) Revise the Q matrix for the movement groups, $Q_2$. In $Q_2$ matrix, each cell $q_{i,j}$ represents cases involved with simultaneous green signal indication for movement groups i and j.
(3) For each of those newly grouped movements, apply the stage 1 operation (treat the mixed-movement flow as if it is one vehicular movement), and formulate a new desired green extension policy—if extension is to be recommended for that group, amount of extension in a group may be different for each movement.
(4) In the $Q_2$ matrix, look for movement groups, whose extension policy may be independently performed. For the movements that belong to these movement groups, replace the current remaining green times by the desired remaining green times. Scratch these movements off the $Q_2$ matrix. For them the green extension policy has been established.
(5) For the rest, look for movement groups that have 0 desired remaining green times. If there is none, (it means that none of the current green indications will be terminated, and thus no conflicting decision will result in green extension policy making. We can execute the green extension policy—replace the current remaining green times by the desired remaining green times for all the movements. For all the movements, the green extension policy has been established. Otherwise, go to the next stage.

Third Stage (1) Examine the $Q_2$ matrix cells of these movements that have 0 desired remaining green times. For each of these cells, if the cell indicates that the green for a movement must be terminated before the other, but the green extension policy wants to do otherwise, they may have to be terminated at the same time. Apply the green extension policy criterion (see the earlier discussion of this section) for the group of movements, and determine the green extension policy for the group of movements.
(2) Continue (1) until we exhaust all the cells.

The green extension and cut off adjustment criteria described here are but a few of many possible criteria. The rules adopted for extending and cutting off the green time are somewhat intuitive and arbitrary. Other rules may be added to this algorithm after extensive examination and evaluation of the algorithm using a test bed and in the real-world environment.

The controller may be equipped with a switch (by software) that will activate/inactivate the green extension adjustment criteria.

The movement phase skipping may also be applied as part of the traffic adaptive control method. The next movement in a signal ring will be skipped if the following conditions are met:

(1) The recall switch of the next movement is set at the "off" status
(2) The minimum green time for the movement is computed or selected to be zero sec
(3) At $\delta_t$ sec prior to the start of the green for the movement, no traffic is observed for that movement (or no traffic has been registered for that movement within the last cycle) and/or the downstream queue has backed up to the exit point detector.
(4) Skipping the green does not cause problem for the pedestrian movement (or, no pedestrian green signal is required to be given at the same time with the green for the current vehicular movement).

It will be apparent that the recall on-off switch can function only for those movements equipped with detectors. For non-detectorized movements the recall switch must always be at the "on" status.

Consideration on Detector Implementation

The method of this invention is designed for application at intersections with full detector implementation. This method, however, may also be applicable to partially detectorized intersections.

When a traffic movement is not detectorized, we assume that the movement is equipped with a virtual (or imaginary) detector. The virtual detectors at the intersection approach lanes are assumed to indicate the "Level 2" status. The virtual detectors at the exit lanes are assumed to indicate the "back-up queue does not exist" status.

The minimum and the maximum green times for non-detectorized movements are both adjusted to the optimum green time. The recall on-off switch setting for the non detectorized movement must be always "on".

Inputs and Outputs

Inputs to this routine, in addition to the inputs already specified in the linear programming methods, are:

1. Control method to be used to define the signal timing parameters.
2. Parameters to be used for the LP method (default value: none).
3. Parameters to be used for the time-of-day table look-up method (default value: none).
4. Detector status for each detector—active or nonactive (default value: nonactive).
5. Congestion levels at each detector at the $\delta_t$ interval (default value: no detector information is available).

6. Queue spillover detection at the $\delta_t$ interval (default value: no queues).
7. Parameter $X_i$'s that specifies the traffic level (default value: 60 percent, or 0.6).
8. Unit extension of green, $e_i$ (default value: 2 sec).
9. Minimum unit extension of green, $e_{i,min}$ (default value: $\delta_t$).
10. Maximum unit extension of green, $e_{i,max}$ (default value: 4 sec).
11. Amber and inter-movements-red times (default values: 4 and 2 sec).
12. Movements to be coordinated (default value: read in from the intersection geometry data).
13. Unit extension adjustment on/off switch (default value: on).
14. Parameters used to define artificial minimum and maximum cycle lengths, $A_1$ and $A_2$ (default values: $\frac{2}{3}$ and 4/3).
15. Parameter used to define the maximum degree of saturation for using the LP method, $A_3$ (default value: 0.9).
16. Parameter $A_4$ that specifies if the controller is in the offset catchup process (default value: 10 sec.).

The outputs from this signal control method are:

1. Cycle ID, and date.
2. Clock time.
3. Day of the week, and holiday ID.
4. Capacity factor ID.
5. Special event ID.
6. IDs of tables used.
7. Unit extension of green used for signal operation.
8. Unit extension adjustment on/off switch status.
9. Actual phasing sequence.
10. Coordinated movements.
11. Minimum green time for each movement.
12. Minimum cycle length.
13. Optimum green time for each movement.
14. Optimum cycle length.
15. Maximum green time for each movement.
16. Maximum cycle length.
17. Optimum cycle length.
18. Executed green time for each movement.
19. Executed cycle length.
20. Executed amber and inter-movement-red times.
21. Detector parameters at the end of the green.
22. Planned offset execution time.
23. Adjusted offset execution time.
24. Actual offset execution time.

2.3.4 Executing Signal Control Tasks

As stated above, the cycle-by-cycle signal control task entails definition of the control method, the phasing scheme, the recall switch status, and the signal timing parameters that will be used to control the signal indication.

As noted above, for every cycle, the signal indication control mechanism requires such input data as:

1. Maximum green for each movement (the M vector).
2. Minimum green for each movement (the N vector).
3. Amber time for each movement (the Y vector).
4. Inter-movement-red time for each movement (the R vector).
5. Transition matrix from one traffic movement to another (the P matrix).
6. Simultaneous green indication matrix (the Q matrix).
7. Movement-phase matrix (the M matrix) which indicates all the movements included in each phase.
8. Unit green for each movement (the E vector).
9. Signal identification vector, which distinguishes the pedestrian signals from the vehicular traffic signals (the W vector).
10. Movements to be coordinated.
11. Amounts of offset deviation.
12. Recall switch status for each movement.

Every $\delta_t$, the signal indication control mechanism examines the signal timing conditions and determines whether each signal light status should be continued or cut off. Every $\delta_t$, the switching mechanism produces the output: the signal indication status for each movement, including the pedestrian signals (the $A_t$ vector).

Figure 24:
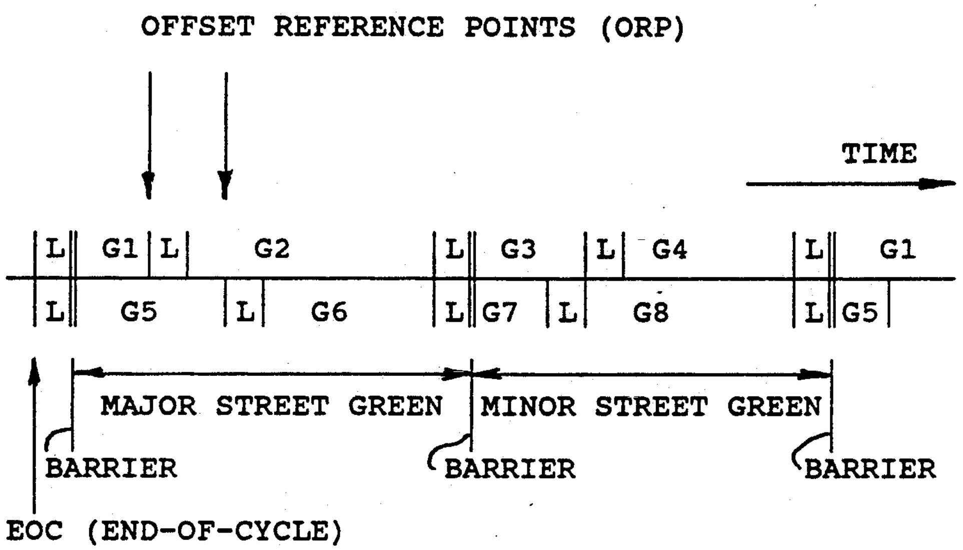
FIG. 24 is a diagram showing signal control execution timing.

The timing of the execution of signal control—especially the timing of the signal timing computation for the next cycle—will be an important factor. FIG. 24 is a schematic representation of the signal control execution timing. The signal phasing definition and timing computation for the next cycle are performed during the amber and inter-movement-red period immediately prior to the major street's green for each cycle. (We will call the time point that is the beginning of the amber period just before the major street's green start point the EOC, or the end-of-cycle.)

In FIG. 24, Gl through G8 indicate green times for movements 1 through 8. Lost time, L, is a combination of the amber period and the intergreen red period. The offset reference point (ORP) is the beginning of the amber period just prior to the start of the green period for the traffic movement. The end-of-cycle (EOC) is the beginning of the amber period just prior to the start of the green period for the major street, where the major street is identified as the time period between two barriers that contain the traffic movement for which the signal is coordinated. At the end-of-cycle (EOC) the local controller reads the phasing table, etc., computes signal timing parameters for use in the next cycle, and transmits the data to the local master controller. The local master controller computes the common cycle length and planned offset and sends the data to the local controller. At the offset reference points (ORP) the local controller measures the offset deviation for each direction, and the results are used for the timing computation for the next cycle.

The amount of offset deviation is computed from the planned offset and the observed actual offset for the immediate past cycle.

The overall signal control execution process described here is common to all the signal control methods. Of course, the real-time on-line traffic-adaptive method performs $\delta_t$-by-$\delta_t$ examination of traffic conditions and green time extension, which other methods do not do.

2.4 Executing Signal Offset Control

In executing signal control, offset design and execution are commonly used among all signal control methods discussed in the preceding sections. To avoid repetitious discussion of these elements for each signal control method, these elements are discussed in the sections that follow.

2.4.1 Subarea Signal Timing Computation

The local master controller computes the common cycle length for the subarea and planned offset for all intersections in the subarea. We briefly describe here one possible method of determining the common cycle length and the input to and output from the local controller for the computation of the subarea signal control timing parameters.

The subarea common cycle length, $C_{com}$, may be obtained, for example, as the weighted average of the optimum cycle lengths of all intersections in the area. The weight is the total traffic volume during a specific time duration at the intersection. This is expressed as:

$$C_1 = \left[ \sum_{\text{all } i} (x_i * C_{opt,i}) \right] / \sum_{\text{all } i} x_i \quad (37)$$

where $x_i$ is the sum of traffic volume at Intersection i in the last five cycles (expressed in terms of vehicles per hour) or the projected traffic volume in the next five cycles (expressed in terms of vehicles per hour).

If we impose the condition that the common cycle length must be longer than or equal to, for example, 1.2 times the minimum cycle time at any intersection in the subarea, then the minimum common cycle length is expressed as:

$$C_2 = 1.2 * \text{Max}\,(C_{min,i}) \quad (38)$$

The common cycle length for the subarea is obtained as:

$$\text{If } C_2 > C_1, \text{ then } C_{com} = C_2$$

$$\text{Otherwise } C_{com} = C_1 \quad (39)$$

We used the safety factor of 1.2 in $C_2$ because sometimes the cycle length may be too short to handle the prevailing traffic at the most critical intersection.

The signal control timing parameters are computed using the input parameters from each local controller. They are:

1. Optimum cycle length ($C_{opt,i}$ or $C_{aopt,i}$), and
2. Minimum cycle length ($C_{min,i}$ or $C_{amin,i}$) at Intersection i.

The output signal control parameter is:

Common cycle length for the subarea ($C_{com}$).

As is well known, the travel time (or distance) between intersections and the travel speed influence the effectiveness of signal coordination. Thus, this should also be taken into consideration in determining the common cycle length.

2.4.2 Offset at Each Intersection

Many studies have been conducted in the area of signal coordination and offset computation. Different types of input may be used for different types of algorithms.

Here we will define the possible input and output parameters that fit our method of approach. Possible input parameters used in computing the offset are:

(1) Distance between neighboring intersections
(2) Estimated speed of travel
(3) Inflow traffic volume
(4) Capacity and capacity factor for each movement at each intersection
(5) Range of common cycle length acceptable for signal operation
(6) Right-turn (Japanese-style) phasing pattern at each intersection
(7) Number of vehicles in the queue (or each block)
(8) Traffic movements that will be coordinated.

Possible output parameters from this routine are:

(1) Common cycle length for coordination
(2) Next planned offset (defined by clock time) for coordinated traffic movements at each intersection.

Of these, input data types (2), (3), (6), and (8) will be sent from the local controller to the local master controller. The other input data types are either resident at the local master controller or computed by the local master controller using the raw data available. Both (1) and (2) of the output data types will be sent from the local master controller to the local controller.

2.4.3 Offset Reference Point

Figure 25:
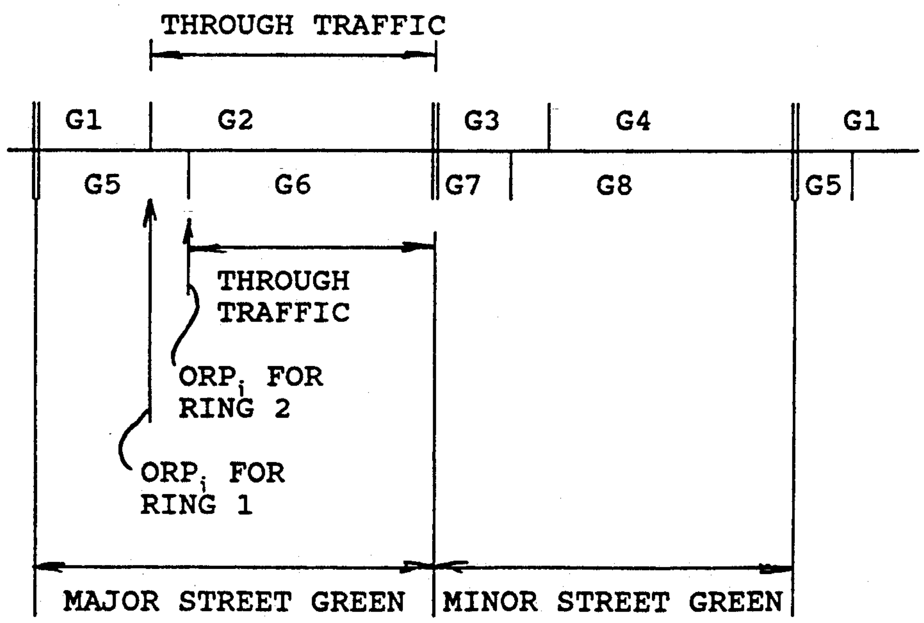
FIG. 25 is a diagram showing offset reference points.

The offset reference point (ORP) is the time in a signal Cycle at which signal coordination is arranged. The offset reference point of a signal cycle is approximately the start of the green time of the movement for which signal coordination is applied (or, more precisely, the start of the amber time just before the start of the coordinated movement). FIG. 25 is a graphical representation of offset reference points at an intersection.

It is possible to have two offset values for one street: one for one direction and another for another direction. This is true, for example, when the signal is coordinated for the through movements of the major street, where the turning movements are given green signal before the through movements.

Yet having two offset reference points makes the coordination process more complex. This problem may be avoided by selecting the start of the inter-barrier time as the offset reference point. Nonetheless, the software may be designed so that data for two offset values for one street.

When the offset is defined in terms of time duration between the key intersection and the current intersection, to implement the offset the actual time of the ORP of the key intersection must also be defined. We may define the offset of an intersection in terms of the clock time of the ORP to avoid dealing with two parameters. The use of the clock time will force us to define the offset value at every cycle.

2.4.4 Offset Deviation and Offset Catchup for Time-of-Day and Traffic Resoonsive Signal Control Methods As noted above, the range between the minimum and the maximum cycle lengths at each intersection is very wide, and we will take advantage of this point in offset catchup operation. First, we find the common cycle length (for the subarea) and then compute the offset deviation at each intersection and execute the offset catchup operation. The offset catchup operation forces shrinking and enlarging of the signal cycle length at each intersection.

Figure 26:
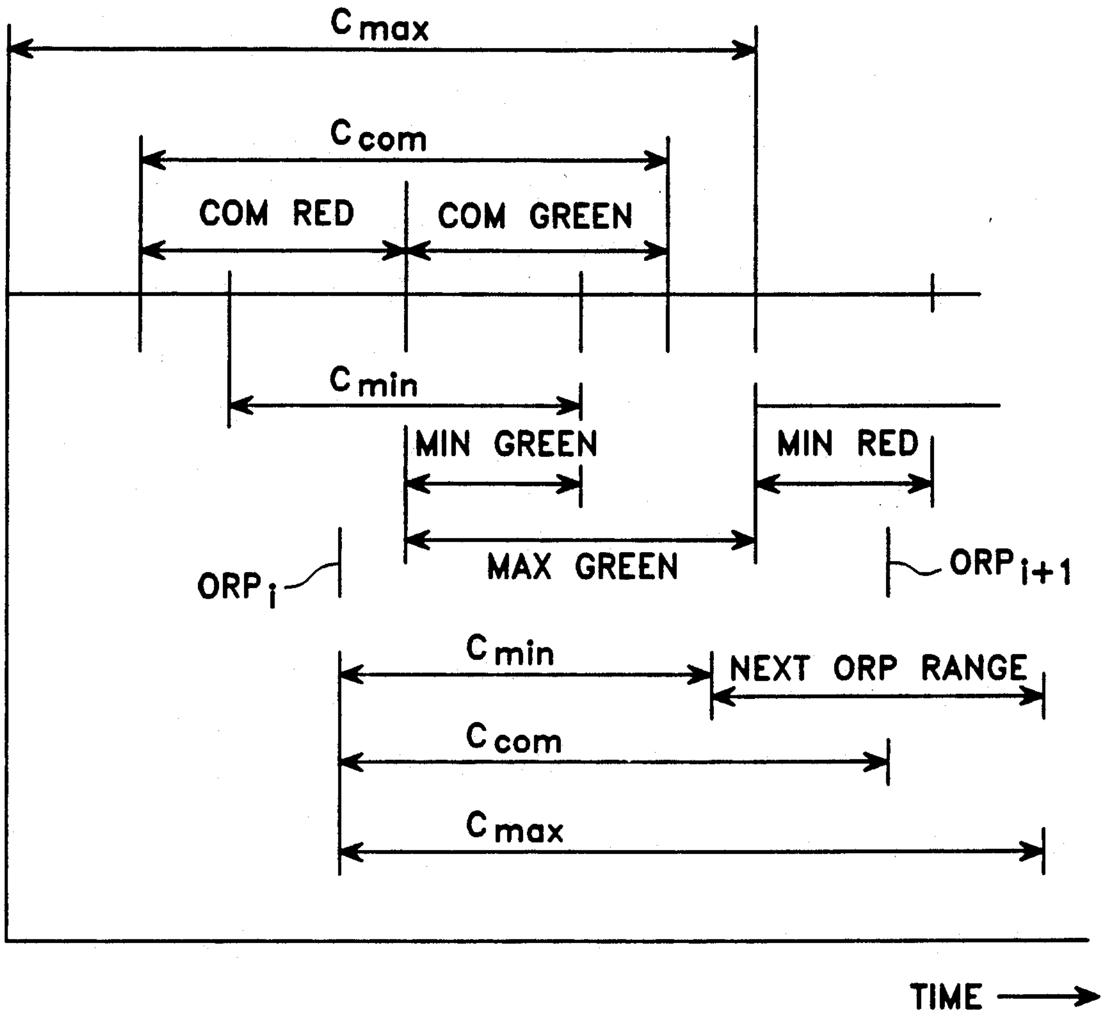
FIG. 26 is a diagram showing minimum, maximum and common cycle length.

If the difference between the minimum and the common cycle lengths, and the difference between the maximum and the common cycle lengths are significantly large, it is convenient for this operation. FIG. 26 illustrates this concept: The next ORP can occur any time within the minimum and maximum time limits specified in the figure.

The local controller evaluates the amount of offset deviation using such input parameters as:

1. Previous planned offset execution time, $t_{pplan,off}$
2. Previous actual offset execution time, $t_{pact,off}$
3. Common cycle time for the subarea, $C_{com}$.

The amount of offset deviation, $F_{dev}$, is computed as:

$$F_{dev}=t_{pplan,off}-t_{pact,off} \quad (40)$$

Because of the cyclic nature of offset, the following operations are performed:

If $abs(F_{dev})>C_{com}$ $$\text{then } F'_{dev}=F_{dev}/C_{com}-Mod(F_{dev}, C_{com}) \quad (41)$$

$$\text{Otherwise } F'dev=F_{dev} \quad (42)$$

If $abs(F'_{dev})>0.5 * C_{com}$, and $F'_{dev}>0$ $$\text{then } F'_{dev}=F'_{dev}-C_{com} \quad (43)$$

If $abs(F'_{dev})>0.5 * C_{com}$, and $F'_{dev}<0$ $$\text{then } F'_{dev}=F'_{dev}+C_{com} \quad (44)$$

The above operations become necessary because we want to minimize the amount of offset catchup.

For the resultant $F'_{dev}$:

If $F'_{dev}<0$, then the current cycle time must be shortened,

If $F'_{dev}>0$, then the current cycle time must be lengthened.

For the pre-timed signal control methods (the cycle length is known before the cycle starts), such as the time-of-day and traffic-responsive signal control methods, the offset catchup amount too is known before the cycle starts. If no constraints are imposed in offset catch up operation, the next offset execution time should be always $t_{pact}+C_{com}+F_{dev}$ or we could express that:

$$C_{next}=C_{com}+F_{dev}. \quad (45)$$

In the real world operation, we must consider the constraints, such as the minimum and the maximum cycle lengths, and how quickly the offset must be caught up. To avoid too slow a catching up process, or to avoid too much impact on traffic, we will impose the offset catch up policy that is in line with the current Japanese practice; i.e., the offset is caught up in 4 cycles.

Figure 27A:
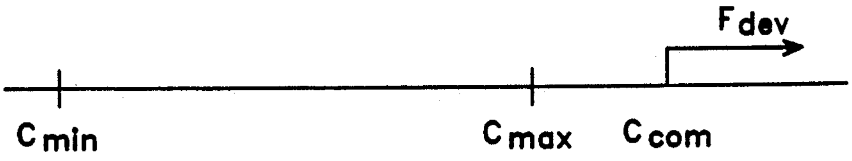
FIGS. 27A and 27F are diagrams showing different offset catchup conditions.

Then, the next cycle length, $C_{next}$ is defined as follows (See FIGS. 27A through 27F):

Case (A-1) FIG. 27A: When $C_{com}>C_{max}$ and $F'_{dev}>0$ $$C_{next}=C_{com}+(\tfrac{1}{4}) * F'_{dev} \quad (46)$$

Figure 27B:
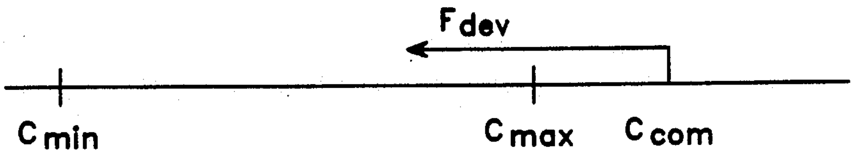

Case (A-2) FIG. 27B: When $C_{com}>C_{max}$ and $F'_{dev}<0$

If $Abs(F'_{dev})<C_{com}-C_{min}$ $$\text{then, } C_{next}=C_{com}-Abs(F'_{dev}) \quad (47)$$

If $Abs(F'_{dev})>C_{com}-C_{min}$ and $Abs(F'_{dev})<4 * (C_{com}-C_{min})$ $$\text{then, } C_{next}=C_{min} \quad (48)$$

If $Abs(F'_{dev}) \geqq 4 * (C_{com}-C_{min})$ $$\text{then, } C_{next}=C_{com}-\tfrac{1}{4} * Abs(F'_{dev}) \quad (49)$$

Figure 27C:
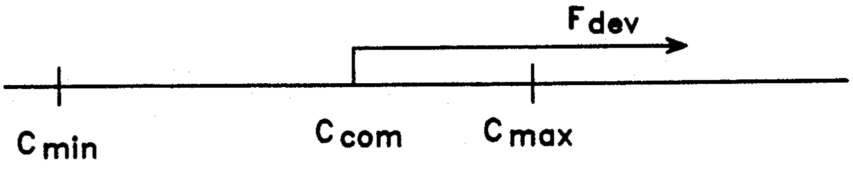

Case (A-3) FIG. 27C: When $C_{max} \geqq C_{com}>C_{min}$ and $F'_{dev}>0$

If $Abs(F'_{dev})<C_{max}-C_{com}$ $$\text{then, } C_{next}=C_{com}+Abs(F'_{dev}) \quad (50)$$

If $Abs(F'_{dev})>C_{max}-C_{com}$ and $Abs(F'_{dev})<4 * (C_{max}-C_{com})$ $$\text{then, } C_{next}=C_{max} \quad (51)$$

If $Abs(F'_{dev}) \geqq 4 * (C_{max}-C_{com})$ $$\text{then, } C_{next}=C_{com}+\tfrac{1}{4} * Abs(F'_{dev}) \quad (52)$$

Figure 27D:
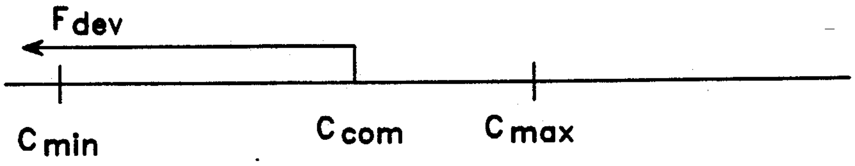

Case (A-4) FIG. 27D: When $C_{max}>C_{com}>C_{min}$ and $F'_{dev}<0$

If $Abs(F'_{dev})<C_{com}-C_{min}$ $$\text{then, } C_{next}=C_{com}-Abs(F'_{dev}) \quad (53)$$

If $Abs(F'_{dev})>C_{com}-C_{min}$ and $Abs(F'_{dev})<4 * (C_{com}-C_{min})$ $$\text{then, } C_{next}=C_{min} \quad (54)$$

If $Abs(F'_{dev})>4 * (C_{com}-C_{min})$ $$\text{then, } C_{next}=C_{com}-\tfrac{1}{4} * Abs(F'_{dev}) \quad (55)$$

Figure 27E:
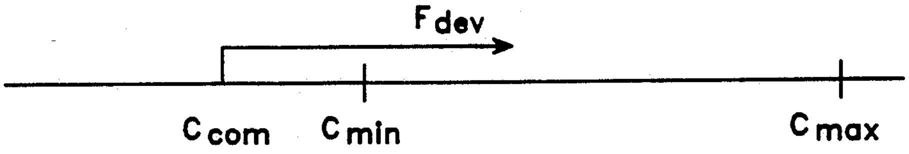

Case (A-5) FIG. 27E: When $C_{com} \geqq C_{min}$ and $F'_{dev}>0$

If $Abs(F'_{dev})<C_{max}-C_{com}$ $$\text{then, } C_{next}=C_{com}+Abs(F'_{dev}) \quad (56)$$

If $Abs(F'_{dev})>C_{max}-C_{com}$ and $Abs(F'_{dev})<4 * (C_{max}-C_{com})$ $$\text{then, } C_{next}=C_{max} \quad (57)$$

If $Abs(F'_{dev})>4 * (C_{max}-C_{com})$ $$\text{then, } C_{next}=C_{com}+\tfrac{1}{4} * Abs(F'_{dev}) \quad (58)$$

Figure 27F:
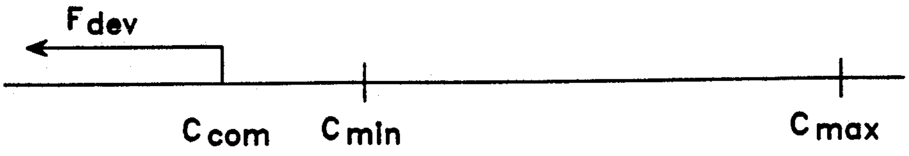

Case (A-6) FIG. 27F: When $C_{com} \geqq C_{min}$ and $F'_{dev}<0$

If $(C_{com}-(\tfrac{1}{4}) * Abs(F'_{dev}))>C^*_{min}$ $$\text{then, } C_{next}=C_{com}-(\tfrac{1}{4}) * Abs(F'_{dev}) \quad (59)$$

$$\text{Otherwise } C_{next}=C^*_{min} \quad (60)$$

where $C^*_{min}$=Absolute minimum cycle length (this is defined as the sum of all the amber, red, and the minimum green times in the ring, that contains the maximum number of movements).

The cycle time for each movement will have to be adjusted in such a manner that the resultant total cycle time will satisfy this objective for offset control.

The inputs to this routine are:

1. Previous planned offset execution time ($t_{pplan,off}$),
2. Previous actual offset execution time ($t_{pact,off}$),
3. Common cycle length for the subarea ($C_{com}$),
4. Minimum cycle length ($C_{min}$),
5. Maximum cycle length ($C_{max}$), and
6. Optimum cycle length ($C_{opt}$).

The outputs from this routine are:

1. Planned offset execution time ($t_{plan,off}$),

2. Adjusted offset execution time ($t_{adjust,off}$), and the cycle length of the next cycle ($C_{next}$).

2.4.5 Offset Deviation and Offset Catchup for Traffic Adaotive Signal Control Method The offset deviation computation method for the traffic adaptive signal control method is identical to that used for the time-of-day and the traffic responsive signal control method.

The method of offset catchup for the traffic adaptive method, however, is slightly different from that used for the time-of-day and the traffic responsive methods.

In the traffic adaptive method, two control policies; namely, the areawide offset control policy and the local green extension policy, will be involved in determining the green time for each traffic movement.

The green time of a movement that satisfy the offset catchup control method does not necessarily satisfy the green extension control method. Thus, we must implement a type of compromised method that will partially satisfy both control methods. Still, in general offset catchup policy is to:

If $F_{dev}<0$, then the current cycle time will be shortened.

If $F_{dev}>0$, then the current cycle time will be lengthened.

In both cases above, the minimum and maximum green times of each movement will be adjusted in such a manner that they will satisfy the above objectives for offset control.

In the real world operation, different ranges of the next planned offset, $t_{plan,off}$, and the next cycle's cycle length, $C_{next}$ are specified for different circumstances. Basically, the same offset catchup policy we used for the pre-timed signal control methods apply to the real-time adaptive control method.

The minimum and the maximum cycle lengths, $C'_{min}$ and $C'_{max}$ that will be used for the adaptive control is defined as follows (See FIGS. 29A through 29F):

Case (B-1) FIG. 27A: When $C_{com}>C_{max}$ and $F'_{dev}>0$ $$C'_{min}=C'_{max}=C_{com}+(\tfrac{1}{4})*F'_{dev} \qquad (61)$$

Case (B-2) FIG. 27B: When $C_{com}>C_{max}$ and $F'_{dev}<0$

If $Abs(F'_{dev})<Ccom-C_{min}$ $$\text{then, } C'_{min}=C'_{max}=C_{com}-Abs(F'_{dev}) \qquad (62)$$

If $Abs(F'_{dev})>C_{com}-C_{min}$ and $Abs(F'_{dev})<4*(C_{com}-C_{min})$ $$\text{then, } C'_{min}=C'_{max}=C_{min} \qquad (63)$$

If $Abs(F'_{dev})>4*(C_{com}-C_{min})$ $$\text{then, } C'_{min}=C'_{max}=C_{com}-\tfrac{1}{4}*Abs(F'_{dev}) \qquad (64)$$

Case (B-3) FIG. 27C: When $C_{max}>C_{com}>C_{min}$ and $F'_{dev}>0$

If $Abs(F'_{dev})<C_{max}-C_{com}$ $$\text{then, } C'_{min}=C_{com} \text{ and } C'_{max}=C_{max} \qquad (65)$$

If $Abs(F'_{dev})>C_{max}-C_{com}$ and $Abs(F'_{dev})<4*(C_{max}-C_{com})$ $$\text{then, } C'_{min}=C'_{max}=C_{max} \qquad (66)$$

If $Abs(F'_{dev})>4*(C_{max}-C_{com})$ $$\text{then, } C'_{min}=C'_{max}=C_{com}+\tfrac{1}{4}*Abs(F'_{dev}) \qquad (67)$$

Case (B-4) FIG. 27D: When $C_{max}>C_{com}>C_{min}$ and $F'_{dev}<0$

If $Abs(F'_{dev})<C_{com}-C_{min}$ $$\text{then, } C'_{min}=C_{min} \text{ and } C'_{max}=C_{com} \qquad (68)$$

If $Abs(F'_{dev})>C_{com}-C_{com}$ and $Abs(F'_{dev})<4*(C_{com}-C_{min})$ $$\text{then, } C'_{min}=C'_{max}=C_{min} \qquad (69)$$

If $Abs(F'_{dev})>4*(C_{com}-C_{min})$ $$\text{then, } C'_{min}=C'_{max}-C_{com}-\tfrac{1}{4}*Abs(F'_{dev}) \qquad (70)$$

Case (B-5) FIG. 27E: When $C_{com}\geqq C_{min}$ and $F'_{dev}>0$

If $Abs(F'_{dev})<C_{max}-C_{com}$ $$\text{then, } C'_{min}=C'_{max}=C_{com}+Abs(F'_{dev}) \qquad (71)$$

If $Abs(F'_{dev})>C_{max}-C_{com}$ and $Abs(F'_{dev})<4*(C_{max}-C_{com})$ $$\text{then, } C'_{min}=C'_{max}=C_{max} \qquad (72)$$

If $Abs(F'_{dev})\geqq 4*(C_{max}-C_{com})$ $$\text{then, } C'_{min}=C_{max}=C_{com}+\tfrac{1}{4}*Abs(F'_{dev}) \qquad (73)$$

Case (B-6) FIG. 27F: When $C_{com}\geqq C_{min}$ and $F'_{dev}<0$

If $(C_{com}-(\tfrac{1}{4})*Abs(F'_{dev}))\geqq C^*_{min}$ $$\text{then, } C'_{min}=C'_{max}=Ccom-(\tfrac{1}{4})*Abs(F'_{dev}) \qquad (74)$$

$$\text{Otherwise } C'_{min}=C_{max}=C^*min \qquad (75)$$

where $C^*_{min}$=Absolute minimum cycle length (thiS is defined as the sum of all the amber, red, and the minimum green times in the ring, that contains the maximum number of movements).

The cycle time for each movement will have to be adjusted in such a manner that the resultant total cycle time will satisfy this objective for offset control.

As described above, in this case, the exact offset execution time will not be specified. The traffic adaptive green extension method will determine the exact green time that will satisfy these constraints.

The inputs to this routine are:

1. Previous planned offset execution time ($t_{pplan,off}$)
2. Previous actual offset execution time ($t_{pact,off}$)
3. Common cycle length for the Subarea ($C_{com}$)
4. Minimum cycle length ($C_{min}$)
5. Maximum cycle length ($C_{max}$)
6. Optimum cycle length ($C_{opt}$)

The outputs from this routine are:

1. Planned offset execution time ($t_{plan,off}$)
2. Adjusted offset execution time range, and the minimum and the maximum cycle lengths for signal control, $C'_{min}$, and $C'_{max}$.

3. SIGNAL INDICATION CONTROL SOFTWARE

3.1 Introduction

This section discusses the basic method of handling signal indication changes in the variable signal phasing scheme.

The signal indication control mechanism described in this section is programmed in the SCP of the local controller. It is one of the basic building blocks of the entire signal control scheme. The same signal control mechanism will stay in the local controller regardless of the signal control algorithm, geometric condition, or phasing specification used in signal operation.

We describe first isolated intersection signal operation and then coordinated operation. The functions in isolated intersection signal operation are common to coordinated signal operation. Thus, the description of coordinated operation will not repeat the individual intersection operation.

The signal indication control method of the present invention is applicable to almost all intersection types including complex ones. It is able to handle not only the NEMA type dual-ring method (for simple intersections), but also multiple ring signal control

3.2 Overview of Signal Indication Control Software

Figure 28:
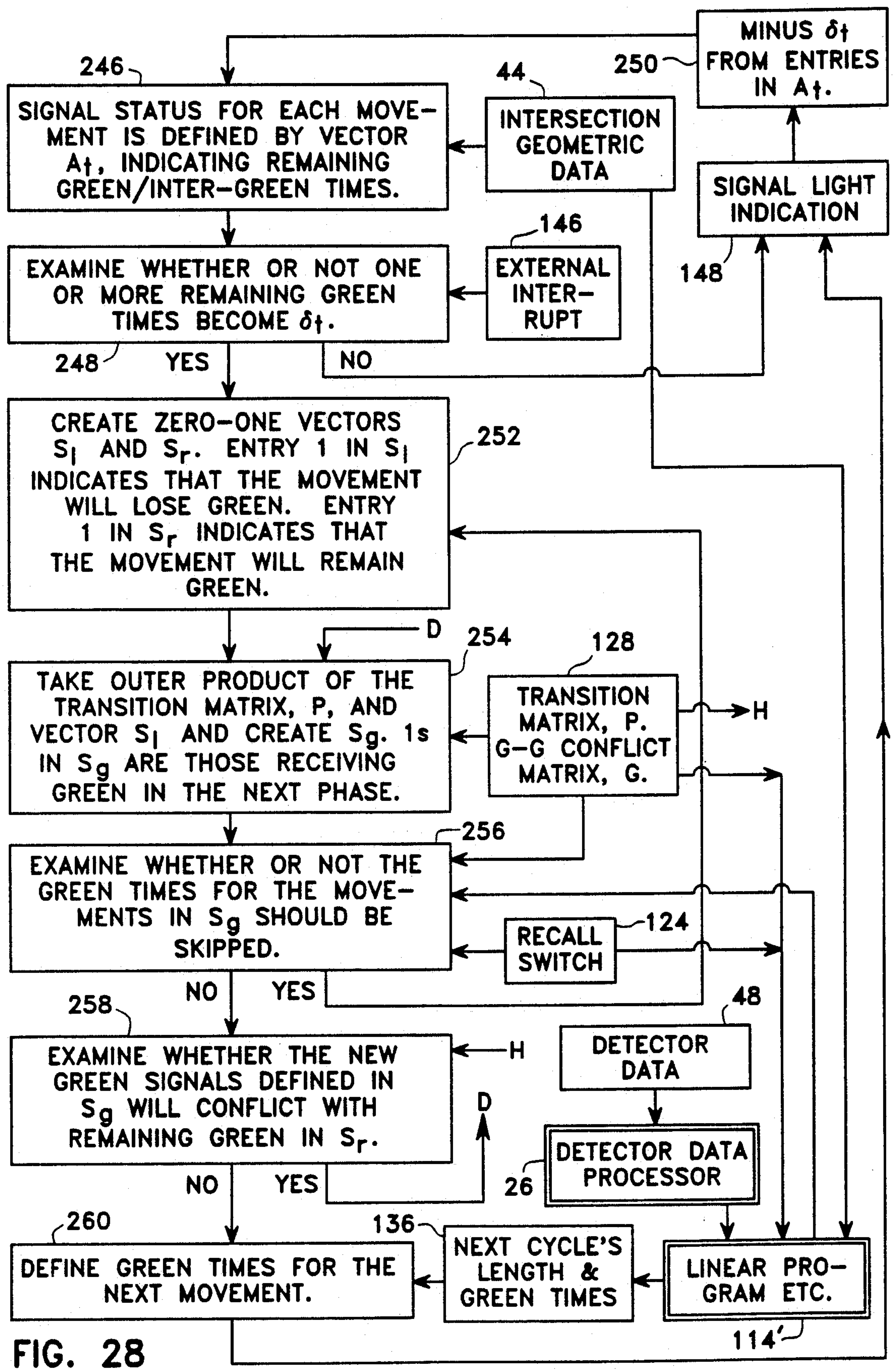
FIG. 28 is a block diagram of signal flow of the signal indication control mechanism for a traffic-responsive method of traffic control.
Figure 29:
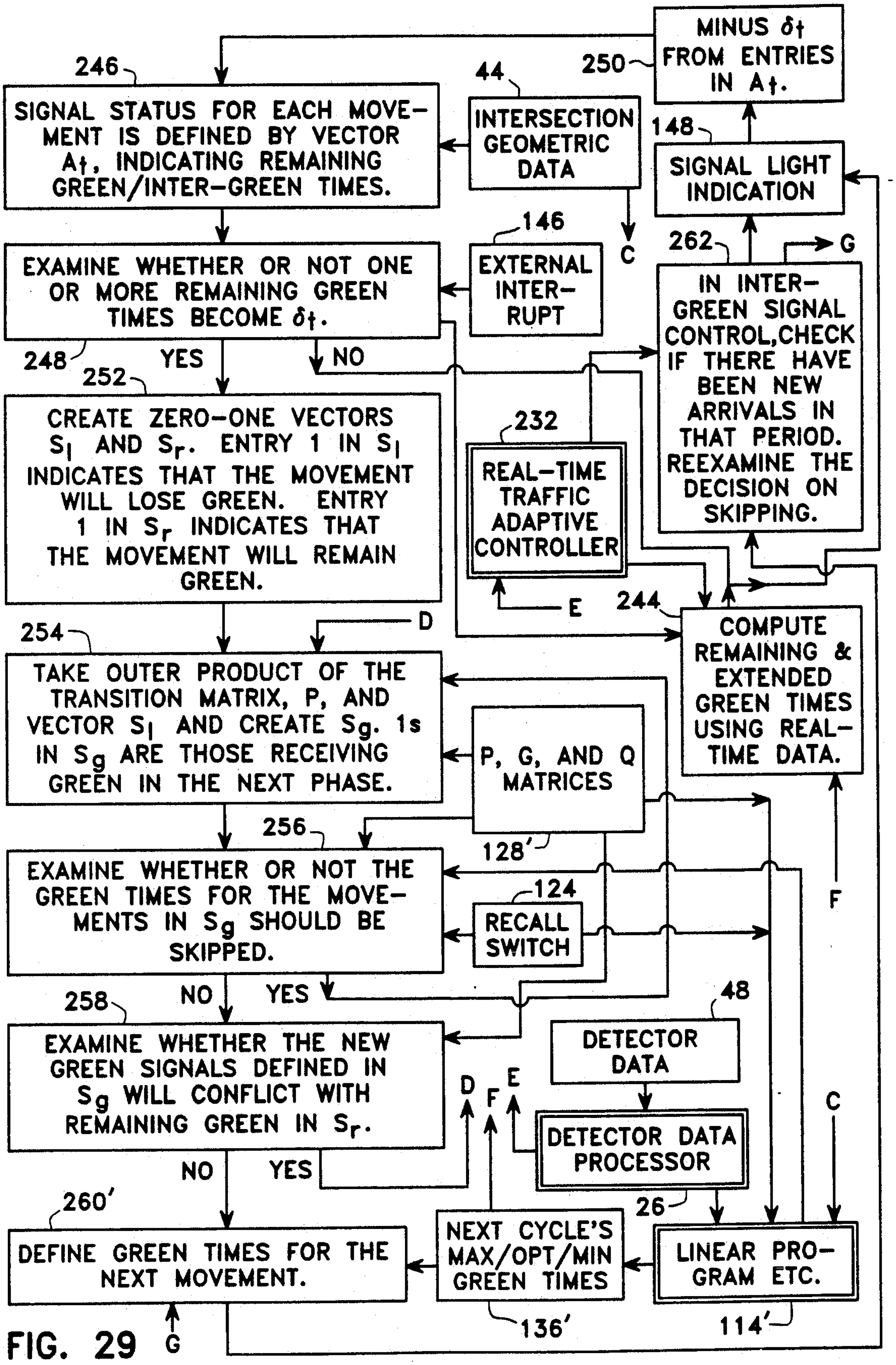
FIG. 29 is a block diagram of signal flow of the signal indication control mechanism for a traffic-adaptive method of traffic control.

Overviews of signal flow for signal indicator control mechanisms for traffic-responsive and traffic-adaptive methods of traffic control are shown in FIGS. 28 and 29, respectively, to which figures reference now is made. The signal indication control mechanism continuously generates electronic signals that switch on and off the signal lights at the intersection, in accordance with predetermined rules and constraints.

If the current remaining green time is longer that $\delta_t$, where, as noted above, a value of $\delta_t$ on the order of 0.5 seconds may be used, the flow of work for switching operations is depicted in both FIGS. 28 and 29 by the loop formed by blocks 246, 248, 148, 250 and back again to block 246.

As indicated at block 246, the signal status for each movement is expressed by a vector $A_t$, each data element, or cell, of which vector indicates the remaining green, plus amber, plus intergreen red times for movements that are currently in the green, amber and intergreen red periods. The amber plus intergreen red times are identified as intergreen times at block 246. Intersection geometric data from block 44 are used to identify the signal light and movement relationships. Signal status vector $A_t$ is shown in FIG. 29A wherein remaining times of 20 and 15 seconds for current movements 1 and 5, respectively, are shown. Non-current movements are indicated by zeros.

If any element in signal status vector $A_t$ is in the last $\delta_t$ of the green period under non-real-time traffic-adaptive control, as seen in FIG. 29B (which implies that the green will terminate), the signal indication controller will start the operation of searching for the movement that will receive the green signal next, as shown in the traffic-responsive method of FIG. 28. In the traffic-adaptive method of FIG. 29, if minimum green $<t<$ maximum green, the traffic-adaptive algorithm (implemented at blocks 232, and 244) will determine whether the green time should be extended or should be cut off using detector data from detector data processor 26.

If the current green is not to be terminated at the next $\delta_t$, the signal indication process proceeds to block 148 whereupon the current signal light indication is given to all signal lights at the intersection. Next, the signal indication controller subtracts $\delta_t$ from elements of signal status vector $A_t$, which vector, as noted above, indicates remaining green times +amber times+intergreen red times.

If the remaining green time is $\delta_t$, and no extension green is given, the green signal time will expire in $\delta_t$, in which case the switch will initiate a search for the next movement that will receive the green indication. This time, for the traffic-responsive method shown in FIG. 28, the loop to be traversed includes blocks 252, 254, 256, 258, 260, 148 and 250, with some extra looping as required within the loop. For the traffic-adaptive method shown in FIG. 29, the loop includes block 262 between blocks 260 and 148 where a check for new arrivals is made, and the decision on skipping is reexamined.

The first step in the process of searching for the next movement to be implemented is to create a zero-one vector, $S_1$, in which the ith entry being 1 implies that the movement will lose its green signal, as shown in block 252. Vector $S_1$ is referred to as the lose vector. A lose vector $S_1$ is shown in FIG. 29C which implies that movement 5 will lose its green signal. A vector $S_r$ indicating the remaining green movement also is generated as shown in FIG. 29D, wherein movement 1 is identified as the remaining green movement.

At block 254, the signal indication controller takes the outer product of $S_1$, and the zero-one transition matrix, P, shown in FIG. IIA. As noted above, in the P matrix, entry $p_{ij}=1$ indicates that movement j is planned to receive the green signal when the green signal for movement i expires. The result of this operation is a new vector, $S_g$, which indicates the movement which will receive the green signal. Vector S9 is referred to as the gain vector. This operation is illustrated in FIG. 29E where movement 6 is identified as the movement to receive the next green.

Next, at block 256, it is determined whether or not the "planned green signal should be skipped. If skipping of the green signal for the "planned" next movement indicated (i.e. if step 256 is affirmative) the routine described in blocks 252, 254 and 256 are repeated. Whether or not skipping takes place is determined by processed detector data, from block 26, and the skipping policy within the algorithm used. (If the recall switch is "on" for the "planned next movement, no skipping will take place.) The movement that will be skipped is treated as the movement that will lose the green signal at block 252.

When no skipping is indicated, block 258 is entered from block 256. At block 258 it is determined whether or not the planned, or anticipated, green signal conflicts with the remaining green signal, it being understood that the green signal for the movements that do not lose green in the next $\delta_t$ increment will stay green. This operation involves use of green-green conflict matrix G data from block 128 (shown in FIG. 11B). If a green-green conflict exists, the process described in blocks 252, 254, and 256 is repeated. The new movement that has a green-green conflict is treated as if it were the one that loses the green signal in the process.

If every other movement except for the "planned to be skipped" movement will cause green-green conflict, the "planned to be skipped" movement will no longer be skipped but must be given the green signal.

Next at block 260, the new green times for the next movement are defined. For the traffic-responsive method, the next cycle's length and green times are obtained from block 136, and the signal lights are controlled accordingly as indicated by connection of block 260 to signal light indication block 248. In FIG. 29F a status vector showing remaining times for remaining movement 1 and for new movement 6, which succeeded movement 5, is shown.

For the traffic-adaptive method shown in FIG. 29, define green times for next movement block 260' receives inputs from blocks 136' and 262. Linear program etc. block 114' in FIGS. 28 and 29 includes linear program block 114 shown in FIGS. 17 and 21 together with other inputs to block 114 not shown in FIGS. 28 and 29.

In the traffic-adaptive method of FIG. 29, as shown at block 262, if any of the signal is in the last $\delta_t$ of the intergreen signal period, and if it has been decided that the next green should be skipped, as determined at block 256, the decision of skipping is reexamined to determine whether or not that movement really should be skipped. If detectors at the approach for the movement planned to be skipped have detected traffic within the intergreen period, then the skipping decision will be overturned, and the green signal will be reassigned.

If the green signal is reassigned to the next movement at block 262, then operation returns to block 260' where the green time for the next movement is redefined.

3.3 Signal Indication Control Method—Isolated Intersection

3.3.1 Definition of Terminology

A signal control method may be best defined using vectors and matrices. Vectors are used to specify the signal status and signal timing constraints for each individual traffic movement. The matrices are used to specify authorized signal transitions and permissible simultaneous green indications. All vectors discussed here are m-vectors, where m equals the number of traffic movements in the intersection. The transition matrix, P, (FIG. 11A) and the permissible simultaneous green indication matrix, Q, (FIG. 11D) are both square matrices of m×m.

Signal control vectors and matrices are defined as follows:

$A_t=(a_i)_t$ is the signal indication status vector at time t, where $a_i=y_i+r_i+x$ indicates that the signal indication for Movement i will be green for the next x sec, $y_i$ is the amber duration, and $r_i$ is the all-red period for Movement i (on a per ring basis). At the start of green, $a_i$ is equal to $n_i+y_i+r_i$ ($n_i$=the minimum green for Movement i).

$a_i=y_i+r_i$, $y_i+r_i-\delta_t$, . . . , $r_i$ indicates that the signal indication for Movement i is amber.

$a_i=r_i-\delta_t$, . . . , $\delta_t$ indicates that the signal indication for Movement i is in the all-red period.

$a_i=0$ indicates that the signal indication for that movement is red.

$N_{max}=(n_{max,i})$ is a vector that indicates the maximum green time for each movement.

$N_{min}=(n_{min,i})$ is a vector that indicates the minimum green time for each movement.

$Y=(y_i)$ is a vector that indicates the amber time for each movement.

$R=(r_i)$ is a vector that indicates the all-red duration for each movement.

$C_t=(c_i)_t$ is a vector that indicates cumulative elapsed green time for each movement at time t.

$D_t=(d_i)_t$ is a vector that indicates the maximum allowable remaining green for Movement i at time t. The maximum allowable remaining green is equal to the maximum green minus the elapsed green. At the start of green, $d_i$ is equal to $m_i$ (the maximum green). The green time requirement for each ring is different, so minor adjustments may be necessary.

$P=(p_{ij})$ is the transition matrix from one signal phase to another, where $p_{ij}=1$ indicates that the transition of the green signal from Movement i to Movement j is permissible.

$p_{ij}=0$ indicates that the transition of the green signal from Movement i to Movement j is not permissible.

$G=(g_{ij})$ is the green-green conflict matrix which indicates permissible simultaneous green indications, where $g_{ij}=0$ indicates that the green signal for Movements i and j cannot be simultaneously indicated.

$g_{ij}=1$ indicates that the green signal for Movements i and j can be simultaneously indicated.

$S_{current}=(s_i)_{current}$ is a vector that identifies the green indication in the current phase, where $s_i=1$ indicates that the signal indication of Movement i is green.

$s_i=0$ indicates otherwise.

$S_{next}=(s_i)_{next}$ is a vector that identifies the green indication in the next phase, where $s_i=1$ indicates that the signal indication of Movement i is green.

$s_i=0$ indicates otherwise.

$S_{lose}=(s_i)_{lose}$ is a vector that identifies the movement(s) that will lose the green indication in the next phase, where $s_i=1$ indicates that Movement i will lose the green indication in the next phase.

$s_i=0$ indicates otherwise.

$S_{gain}=(s_i)_{gain}$ is a vector that identifies the movement(s) that will gain the green indication in the next phase, where $s_i=1$ indicates that the signal indication for Movement i will be green in the next phase.

$s_i=0$ indicates otherwise.

$S_{remain}=(s_i)_{remain}$ is a vector that identifies the movement(s) that will keep the green indication, while the other movement(s) lose(s) the green, where $s_i=1$ indicates that the signal indication of Movement i will remain green, while another movement will lose the green indication in the next phase.

$s_i=0$ indicates otherwise.

$E=(e_i)$ is a vector, whose elements are either a positive number or 0, where $e_i$=the green extension time for Movement i given by the signal control algorithm at the time of operation.

3.3.2 Signal Control Execution—Isolated Intersection Basic Operation

The signal status is defined by the signal status indication vector, $A_t$. As noted above, the $A_t$ vector indicates how many seconds of green time (plus the following amber and all-red duration) are left for the current phase. The local controller examines the signal indication status every $\delta_t$ sec. and updates $A_t$.

This update is commonly performed for any algorithm used for signal operation. If the signal operation method is a pretimed type, the update work will involve simply subtracting green time from the remaining green of the current phase. If the signal operation method is a traffic-adaptive type, the green extension (and cutoff) is examined in the update process.

For discussion purposes, we describe the traffic-adaptive dual-ring (always two traffic movements are receiving green indication simultaneously) signal control method (traffic actuation is a type of traffic-adaptive control).

Let us assume that the signal operation status vector shows that Movements i and j currently have green indication, and also assume that the green indication for Movements i and j are extended by adding a "proper" amount of green extension $e_i$ and $e_j$ to the i-th and j-th elements of the signal indication status vector, $A_t$, at the time the signal operation status vector is updated. If no extension is allowed or attempted, $e_i$ and $e_j$ will be 0.

The signal status at time $t+\delta_t$ is expressed as:

$$A_{t+\delta t}=A_t+E * S_{current}-\delta_t * S_{current} \quad (76)$$

where "*" indicates inner (or scalar) product, and $\delta_t$ is the signal time scanning increment. Here, the i-th and j-th elements of the $S_{current}$ vector are 1, and all the other elements in the $S_{current}$ vector are 0.

The cumulative elapsed time is updated every scanning period by adding the scanning interval, $\delta_t$, to its elapsed time counter, $C_t$. The cumulative elapsed time is initially equal to 0.

$$C_{t+\delta t}=C_t+\delta_t * S_{current} \quad (77)$$

The maximum allowable green time is also updated every scanning period by subtracting the scanning interval, $\delta_t$, from its remaining maximum allowable green time counter, $D_t$. The maximum allowable green time for each movement is initially equal to each element of $N_{max}$.

$$D_{t+\delta t}=D_t-\delta_t * S_{current} \quad (78)$$

The green indication will be cut off, when:

1. The cumulative elapsed time reaches the maximum green, and/or
2. The remaining green is zero and the algorithm requests zero green extension.

Cutting off the green indication for one movement means giving the green indication to another movement, a change in signal phase. There are two key rules in signal phase change:

(1) At the sink phase, which is defined as the phase that terminates at a barrier in the dual-ring system, the green times for different movements end at the same time. Otherwise, green-green conflict will result. Here, if the cumulative elapsed time reaches the maximum green in one ring and has not reached the maximum green in another, the green for both rings will be cut off at that time point.

(2) If the green for one movement is cut off and the green for a new movement is due to be started while the green for another movement remains in effect, or active, the new green indication and the continuing green must not result in a green-green conflict.

As noted above, the G matrix indicates permissible simultaneous green indications. The examination of permissible simultaneous green indications for the next phase must be made just before the current phase ends, while the signal indication for the current phase is in the last $\delta_t$ increment of green.

The cumulative maximum green is defined for each movement (turning, through movement, etc.). Ideally, the maximum green time for each movement should be assigned (even though this is not necessary) in such a manner that it does not require redefinition at the barrier of the dual-ring. But often the maximum green time in one ring is reached while the other ring still has remaining allowable green time.

Ensuring simultaneous termination of green times at the barrier can be achieved by assigning maximum green times in the $N_{max}$ vector in such a manner that the inter-barrier times of the two rings become the same; in other words, the maximum green time for either movement (or both movements) in the sink phase will be made variable.

When Movements i and j are currently receiving green indication and the remaining available green time for movement i is δt, and no green extension for Movement i is requested by the signal control algorithm, the signal indication control mechanism performs the following operations:

Case (1-a): If $g_{ij}=0$, the current green indication has a green-green Conflict and/or the signal control method is not working correctly. Therefore, the signal operation using the current routine must be stopped.

Case (1-b): If $g_{ij}=1$, the green signal for Movement i can be terminated. The signal operation using the current routine should be continued.

At the barrier movements i and j must be terminated at the same time. If there is x sec of green still remaining for Movement j, an extra green extension for movement i must be given so that at least the green for movement i will last x sec, and the signal operation using the current routine should be continued.

When movement i is currently receiving green and movement j is receiving amber or intergreen-red indication and the remaining available green time for movement i is $\delta_t$, and no green extension for movement i is requested by the signal control algorithm, the signal indication control mechanism performs the following operations:

Case (2-a): If $g_{ij}=0$, the current green indication has a green-green conflict and/or the signal control method is not working correctly. Therefore, the signal operation using the current routine must be stopped.

Case (2-b): If $g_{ij}=1$, the signal operation using the current routine should be continued.

At the barrier, the green for movement i must have been terminated at the same time as the green for movement j was terminated. An error has occurred and the signal operation using the current routine must be stopped.

When the yellow interval for movement i starts, the green extension function will be cut off for that movement until the next cycle, when movement i again receives the green.

Let us assume that the all-red time period ends at time t and a new phase starts at time $t+\delta_t$.

If the green indication for movement i is cut off and the green indication for movement j is continued, the movement that receives new green indication (movement k) is found by performing the operation:

$$S_{gain}=S_{lose} \times P \quad (79)$$

where

"x" indicates outer product of two matrices or vectors and, $S_{gain}$ indicates the new movement that receives green. The k-th element of the $S_{gain}$ vector is 1, and the all other elements in the $S_{gain}$ vector are 0. Here, the i-th element of the $S_{lose}$ vector is 1, and all other elements in the $S_{lose}$ vector are 0.

The movements that Will have the green indication in the next phase are expressed as:

$$S_{next}=S_{gain}+S_{remain} \quad (80)$$

where $$S_{remain}=S_{current}-S_{lose} \quad (81)$$

The j-th element of the $S_{remain}$ vector is 1 and all other elements in the same vector are 0. The j-th and k-th elements of the $S_{next}$ vector are 1 and all other elements in the same vector are 0.

The signal status at time $t+\delta_t$ is expressed as:

$$A_{t+\delta t} = A_t * S_{remain} - \delta_t * S_{remain} + [N_{min} \text{ (or } E)] * S_{gain} - \delta_t * S_{gain} + Y * S_{gain} + R * S_{gain} \quad (82)$$

where "*" indicates inner (or scalar) product and "x" outer product of two vectors.

If both Movements i and j lose the green indication at the same time, the movements that receive a new green indication (Movement k and l) are found by performing the operation:

$$S_{next}=S_{current} \times P \quad (83)$$

The k-th and l-th elements of the $S_{next}$ vector are 1, and all the other elements in the $S_{next}$ vector are 0. The i-th and j-th elements of the $S_{current}$ vector are 1, and all the other elements in the $S_{current}$ vector are 0.

In this case, if the minimum green duration for Movements k, $n_k$, and l, $n_l$, is 0 and no demand for green is requested by the algorithm, the phase consisting of Movements k and 1 may be skipped. If this occurs, then the next set of movements that receive the green indication must be sought. We again perform the same operation expressed in (83) with a different set of parameters (this time, the k-th and l-th elements of the $S_{current}$ vector are 1 and the rest are 0) and obtain the new movements for the green indication.

In this manner, the search for the new phase could go on and on, continuously circulating the same search pattern. This situation is possible, if no demand exists and the minimum green for every movement is 0. This perpetual search is prevented by specifying a minimum green time that is not 0 for at least one movement in each ring.

The signal status at time $t+\delta_t$ is expressed as:

$$A_{t+\delta t}=[N_{min} \text{ (or E)}] * S_{next}-\delta_t * S_{next}+Y * S_{next}+R * S_{next} \quad (84)$$

Pedestrian Signal

The pedestrian green signal on a crosswalk is given simultaneously with the through vehicular movement that travels next to it, unless turning traffic will pass over the crosswalk. Thus, a frequent occurrence may be that, on the same street, a pedestrian crossing on one side gets the pedestrian green while one on the other side does not.

The pedestrian signal could be operated with or without the signal request using a pushbutton. Pressing the pushbutton is equivalent to a vehicle passing through the vehicular detector. When there is a request, the green time for the parallel through movement is directly affected by the pedestrian green requirement; the green must be given to the parallel vehicular traffic next to the crossing as long as the pedestrian green is given.

The proposed local controller is able to handle various types of pedestrian signal control methods. In fact, in the signal indication switching mechanism, we treat the pedestrian signal in a similar manner we treat the vehicular traffic signal. The major difference between the pedestrian signal and the vehicular signal is that flashing red is given instead of the amber indication. Otherwise, the pedestrian green should be "identical" to the vehicular signal in switching mechanism.

Pedestrian signal control related vectors are defined as follows:

$W=(w_i)$ is the signal identification vector, where
- $w_i=1$ indicates that the i-th element represents Vehicular Movement i
- $w_i=-1$ indicates that the i-th element represents Pedestrian Movement i
- $w_i=0$ indicates that the i-th element is not in use Then, for those elements, with which $w_i=-1$, $A_t=(a_i)_t$ is the pedestrian signal indication status vector at time t, where
- $a_i=y_i+r_i+x$ indicates that the signal indication for Pedestrian Movement i will be receiving green for the next x sec, $y_i$ is the green flashing duration, and $r_i$ is the all-red period for Pedestrian Movement i (on a per ring basis). At the start of green, $a_i$ is equal to $n_i+y_i+r_i$, ($n_i$=the minimum green for Pedestrian Movement i).
- $a_i=y_i+r_i$, $y_i+r_i-\delta_t$, . . . , indicates that the signal indication for Pedestrian Movement i is flashing green.
- $a_i=r_i-\delta_t$, . . . , $\delta_t$ indicates that the signal indication for Pedestrian Movement i is in the all-red period.
- $a_i=0$ indicates that the signal indication for that pedestrian movement is red.

$Y=(y_i)$ is a vector that indicates the flashing green time for each pedestrian movement.vector shows that the system is being operated with reasonable coordination (what is "reasonable" will have to be defined by algorithms), no special attempts will be made to catch up with the planned offset.

3.4 Signal Indication Control Method Coordinated System

With the coordinated system, offset must be considered in the signal control mechanism in addition to the factors described for the isolated intersection. The principal problem here is how to adjust the offset to the planned offset when the observed signal offset deviates from the planned offset.

3.4.1 Definition of Terminology

In addition to the vectors and matrices defined above in section 3.3, some special vectors are related to offset control, as defined as follows:

$F=(f_i)$ is the planned offset vector. The offset is measured at the end of the green time of the movement preceding the one for which signal coordination is applied, where $f_i$=the amount of offset of Movement i (in interger seconds), measured at the end of the green $f_i$=0.1 for other movements.

The offset, which is defined in integer seconds, indicates the difference between the green end time for a movement at one intersection and green end time of a movement at the critical intersection.

$F_{dev}=(f_i)_{dev}$ is the signal offset deviation vector, which indicates the amount of deviation from the planned offset in integer seconds, where $f_i>0$ indicates that the green signal for Movement i ended early relative to the planned offset.

$f_i=0$ indicates that the green signal for Movement i ended exactly at the planned offset.

$f_i<0$ indicates that Movement i,s green signal ended late relative to the planned offset.

3.4.2 Signal Control Execution—Coordinated System

Each signal control algorithm will have its own offset adjustment method. The coordination control execution mechanism described here is the basic tool for offset adjustment.

The process described in Section 3.3 is applied, with extra constraints, for offset control. In this case, at the start of the signal execution operation, we must define the signal offset vector, F, in addition to the signal status vector, $A_t$.

The $F_{dev}$ vector is defined by observing the green end time(s) for the applicable movement(s) and the F vector. If the $F_{dev}$ vector indicates that the offset must be corrected, however, offset correction will be performed. For example, offset correction would be performed if the $F_{dev}$ vector shows that the actual offset in the present cycle and the preceding cycles have been continuously off in one direction.

The simplest approach in coordinating signals is to have a common cycle length throughout the system and use it for all intersections controlled by the system. But, in the real world, the required green time for each movement at each intersection is different, and thus the duration of green time that can be assigned for signal coordination is also different. It is believed that maintaining a common cycle length for every cycle is not warranted as long as the green band for coordination can be assured.

The method of coordination with or without keeping a constant cycle length may be taken care of by each algorithm.

3.5 Interaction Between the Signal Control Mechanism and the Signal Control Algorithm The signal control mechanism is independent of the signal control algorithms, and thus it is able to operate in conjunction with any algorithm.

In the signal control mechanism, the parameters in the $N_{max}$ and $N_{min}$ vectors and the P and G matrices are created either by the user or by the internally stored algorithm, and the F vector is created either by the user or by the local master controller.

In the non-traffic-responsive type of system operation, either the user or the algorithm determines the green time for each movement by assigning one value for the minimum and maximum green times.

In the traffic-responsive type also, equal minimum and maximum green times will be assigned for a traffic movement to guarantee that the signal green time is given to that movement. In the traffic-responsive case, however, all those vectors and matrixes ($N_{max}$, $N_{min}$, P, G, and F mentioned above, and $N_{max}$ equals $N_{min}$) are generated either by the table look-up method or by computation, based on the detector data taken in the immediate past time period (5 min to 15 min) or based on the predicted traffic data.

In both cases, the $A_t$ vector is updated at every scanning time interval. But in these cases, the $A_t$ vector will be used only for the purpose of examining whether or not the green has reached the preplanned end time.

In the traffic-adaptive system, those vectors and matrixes mentioned above ($N_{max}$, $N_{min}$, P, G, and F) would be automatically defined and updated at certain interval. The $A_t$ vector would also be updated every scanning time interval.

4. DETECTOR DATA PROCESSING SOFTWARE

4.1 Introduction

The new local controller is able to handle any type of predefined traffic detector using the "universal" interface that is installed between the detector units and the signal control processor (SCP) of the local controller.

The "universal" detector interface takes in inputs from different types of detectors and produces outputs that will be used by the SCP. The traffic detector types to be connected to the "universal" detector interface include:

a) Conventional loop or ultrasonic detectors
b) Video graphics detectors
c) Radar
d) Pedestrian push buttons
e) Preemption and bus detectors
f) Rail crossing signal detectors.

Data taken by the detectors include:

a) On-off state of each detector
b) Speed at each detector
c) Speed for each movement or lane
d) Queue length for each movement or lane
e) Pedestrian green request
f) Preemption request
g) Request for the green signal for the desired movements.

The SCP's detector data-processing software reads in these data and arranges them in the specified format, so that they can be used in signal control.

In the conventional loop and ultrasonic detectors, the detector interface puts out detector on-off status, cumulative traffic counts, cumulative time occupancy, and estimated vehicular speed every 50 milli-second at each individual detector. The other traffic characteristics data, such as queuing condition and speed, are synthesized by the SCP of the local controller from the on-off pulses and detector arrangements. These synthesized data (for example, queue length) are not as accurate as those taken from more sophisticated detectors, so the software is designed in such a manner that these synthesized data will be automatically replaced when data from the detector with higher accuracy are put into the SCP through the "universal" detector interface.

The detector data-processing module reads two types of data: detector definition data and detection data. The detector definition data (or permanent data) define the detector type, detector location and the detector,s relationship to traffic movements, and the time interval between data acquisition from the interface. These data are read in whenever new detectors are attached to the local controller. More than one detector type can be attached to a local controller at one time. The detection data (or real-time data) are read in from the detector interface dynamically as the system operates. From the detector definition information, the SCP software will internally specify the input data used and output data produced.

4.2 Loop (or Ultrasonic) Detector Data Processing

In the conventional loop or ultrasonic detectors, inputs to the SCP detector data-processing software module are detector definition data, stored in the intersection geometry data table, and on-line real-time detector information, sent from the detector interface. Different detector data are sent from different detector types. Detector definition inputs from the intersection geometry data table include (for each detector):

a) Detector ID,
b) Intersection approach ID,
c) Lateral location (lane number),
d) Location relative to the intersection (approach, inside the intersection, exit, mid-block, exit from the upstream intersection),
e) Longitudinal location within each group (lst, to nth),
f) Longitudinal distance from the stopline,
g) The effective detection length.

Intersection geometry definition inputs from the intersection geometry data table include:

a) The distance between intersections, L, and
b) The distance between detector groups.

Detector data collection specification (DCS) inputs read in from the DCS table in the SCP include:

a) Threshold values for detector error checking,
b) Threshold values for traffic condition level identification,
c) Threshold values for traffic condition level identification,
d) Traffic detection periods, and
e) The threshold used for spillover detection.

The detector data processor determines traffic conditions by examining whether or not the observed data are greater than or less than these threshold values.

The detector data processor not only generates outputs that are used for the linear program method and real-time traffic adaptive method, but also other data that may be useful to other signal control methods. They include:

First Level Output a) Detector status (active, failed, or not used),
b) Cumulative traffic counts for the last 10 min at 5-sec increments,
c) Cumulative time occupancy for the last 10 min at 5-sec increments, and
d) Cumulative traffic counts and occupancy amount at 30-min increments.

Second-Level Output a) Traffic counts for the immediate past $T_1$ and $T_2$ sec,
b) Time occupancy for the immediate past $T_1$ and $T_2$ sec,
c) Traffic counts for the immediate past $N_1$ and $N_2$ cycles for each detector,
d) Time occupancy for the immediate past $N_1$ and $N_2$ cycles for each detector,
e) Saturation flow rate for the last $N_3$ cycles for each movement,
f) Incoming traffic flow rate for the last $N_3$ cycles for each movement,
g) Traffic congestion level for the last $N_1$ cycles for each leg,
h) Traffic queue spillover condition,
i) Estimated travel time between intersections, and
j) The number of vehicles in a block (NVIB).

The invention having been described in detail hereinbelow, various changes and modifications will suggest themselves to those skilled in this art. It is intended that such changes and modifications shall fall within the spirit and scope of the invention defined in the appended claims.

I claim:

1. A signal indication switching method for use in controlling traffic signal indicators for control of traffic movements at an intersection, which method includes linear programming solutions for maximum, optimum and minimum cycle lengths and maximum, optimum and minimum phase times, said method comprising;

generating a movement-phase matrix, M, having data elements for defining the relationship between movements and phases where $M_{ij}=1$ indicates that movement i is included in phase j, and $M_{ij}=0$ indicates that movement i is not included in phase j, wherein each of said movements identifies a green display of said traffic signal indicators for a single traffic movement at said intersection and each of said phases identifies a green display of said traffic signal indicators given to a combination of traffic movements at said intersection, constructing linear constraints using data elements from the movement-phase matrix, M, incoming and saturation flow rates, and lost time constants for each movement to be implemented during the next cycle of traffic movements, computing said maximum, optimum and minimum cycle lengths and maximum, optimum and minimum phase times using the said linear constraints in linear programming solutions thereof, using said computed maximum, optimum and minimum phase times for determining maximum, optimum and minimum movement green times for movements to be implemented, and using the maximum, optimum and minimum green times and said maximum, optimum and minimum cycle lengths, to obtain signal timing parameters for control of said signal indicators at the intersection.

2. A method as defined in claim 1 including identifying movements to be implemented in the next cycle of traffic movements using inputs from traffic detectors and recall switch status information in said step of constructing linear constraints.

3. A method as defined in claim 2 including using pedestrian pushbutton data in said step of constructing linear constraints to identify said movements to be implemented.

4. A method as defined in claim 1 including identifying less preferred traffic movements, and making equalities of said linear constraints for said less preferred traffic movements for reducing the probability of obtaining more than one of said linear programming solutions.

5. A method as defined in claim 1 including, sequentially obtaining said linear programming solutions for said maximum, optimum and minimum signal phase times and cycle lengths.

6. A method as defined in claim 5 wherein, if the linear programming solution for said maximum cycle length is determined to be too short, then adjusting the maximum cycle length and green times to acceptable minimum values of said maximum cycle length and green times, adjusting the optimum cycle length and green times to acceptable minimum values of said optimum cycle length and green times, adjusting the minimum cycle length and green times to acceptable minimum values of said minimum cycle length and green times, and using the adjusted minimum values for obtaining said signal timing parameters.

7. A method as defined in claim 5 wherein, if the linear programming solution for said maximum cycle length is determined to be too long, then adjusting the maximum cycle length and green times to acceptable maximum values, and using the adjusted maximum cycle length and green time values together with said linear program solutions for said optimum and minumum phase times and cycle lengths for obtaining said signal timing parameters.

8. A method as defined in claim 7 wherein, if the linear program solution for said optimum cycle length is determined to be too short, then adjusting the optimum cycle length and green times to acceptable minimum values of said optimum cycle length and green times, adjusting the minimum cycle length and green times to acceptable minimum values of said minimum cycle length and green times, and using the adjusted maximum, optimum and minimum cycle lengths and green times for obtaining said signal timing parameters.

9. A method as defined in claim 7 wherein, if the linear program solution for said optimum cycle length is determined to be too long, then adjusting the optimum cycle length and green times to acceptable maximum values, and using said adjusted maximum and optimum cycle lengths and green times together with said linear programming solutions for said minimum phase times and cycle length for obtaining said signal timing parameters.

10. A method as defined in claim 5 wherein, if the linear program solution for said optimum cycle length is determined to be too long, then adjusting the optimum cycle length and green times to acceptable maximum values, and using said adjusted optimum cycle length and green times together with said linear programming solutions for said maximum and minimum cycle lengths and phase times for obtaining said signal timing parameters.

11. A method as defined in claim 10 wherein, if the linear programming solution for said minimum cycle length is determined to be too short, then adjusting the minimum cycle length and green times to acceptable minimum values, and using said linear programming solutions for said maximum cycle length and phase times, together with said adjusted optimum and minimum cycle lengths and green times for obtaining said signal timing parameters.

12. A method as defined in claim 10 wherein, if the linear program solution for said minimum cycle length is determined to be too long, then adjusting the minimum cycle length and green times to acceptable maximum values, and using said linear programming solutions for said maximum cycle length and phase times, together with said adjusted optimum and minimum cycle lengths and green times for obtaining said signal timing parameters.

13. A method as defined in claim 5 including, determining if any of said linear programming solutions for said maximum, optimum and minimum cycle lengths is unacceptable for being too long, adjusting said maximum, optimum and minimum cycle lengths and associated green times determined to be unacceptable to acceptable maximum, optimum and minimum cycle lengths and associated green times, respectively, and using said adjusted maximum, optimum and minimum cycle lengths and associated green times for obtaining said signal timing parameters.

14. A method as defined in claim 5 wherein, if there is no linear programming solution for said maximum cycle length, then selecting maximum green times and cycle length, optimum green times and cycle length, and minimum green times and cycle length from tables of predetermined values thereof, and using the predetermined values for obtaining said signal timing parameters.

15. A method as defined in claim 5 wherein, if there is no linear solution for said optimum cycle length, then employ the signal timing parameters obtained for said maximum cycle length and green times for said optimum and minimum cycle lengths and green times.

16. A method as defined in claim 1 wherein the maximum signal phase time for phase j, $t_{max,j}$, is defined by finding $t_{max,1}$, $t_{max,2}$, . . . $t_{max,n}$ that minimize $$C_{max} = \sum_{j=1}^{n} t_{max,j}$$

subject to constraints $$\sum_{j=1}^{n} (a_{ij} - q_i/s_i) * t_{max,j} \geqq (2 * r - 1) * L_i$$

for i=1, . . . , m traffic movements wherein:

$C_{max}$ is the maximum cycle length, $t_{max,j}$ is the maximum signal phase time for phase j, $a_{ij}$ is the movement-phase matrix data element for the ith movement and jth phase, $q_i$ is the incoming flow rate for the ith movement, $s_i$ is the saturation flow rate for the ith movement, r is a lost time coefficient, and $L_i$ is lost time for movement i.

17. A method as defined in claim 16 which includes identifying less preferred traffic movements, and making equalities of said constraints for said less preferred traffic movements to reduce the probability of obtaining more than one linear programming solution for said $C_{max}$.

18. A method as defined in claim 16 wherein the optimum signal phase time for phase j, $t_{opt,j}$, is defined by finding $t_{opt,1}$, $t_{opt,2}$, . . . , $t_{opt,n}$ that minimize $$C_{opt} = \sum_{j=1}^{n} t_{opt,j}$$

subject to constraints $$\sum_{j=1}^{n} (a_{ij} - q_i/s_i) * t_{opt,j} \geqq r * L_i$$

for i=1, . . . , m traffic movements wherein $c_{opt}$ is the optimum cycle length, and $t_{opt,j}$ is the optimum signal phase time for phase j.

19. A method as defined in claim 18 which includes identifying less preferred traffic movements, and making equalities of said constraints for said less preferred traffic movements to reduce the probability of obtaining more than one linear programming solution for said $C_{opt}$.

20. A method as defined in claim 18 wherein the minimum signal phase time for phase j, $t_{min,n}$ that minimize $$C_{min} = \sum_{j=1}^{n} t_{min,j}$$

subject to constraints $$\sum_{j=1}^{n} (a_{ij} - q_i/s_i) * t_{min,j} \geqq L_i$$

for i=1, . . . , m traffic movements wherein $C_{min}$ is the minimum cycle length, and $t_{min,j}$ is the minimum signal phase time for phase j.

21. A method as defined in claim 20 which includes identifying less preferred traffic movements, and making equalities of said constraints for said less preferred traffic movements to reduce the probability of obtaining more than one linear programming solution for said $C_{min}$.

22. A method as defined in claim 16 wherein said lost time coefficient, r, is defined as $$r=(1.5L+5)/L$$

wherein L is estimated total lost time in a cycle.

23. A method as defined in claim 1 wherein the step of obtaining signal timing parameters includes, adjusting the maximum, optimum and minimum green times and maximum, optimum and minimum cycle lengths for coordinating control of traffic at the intersection with traffic at other intersections within a group of intersections.

24. A method as defined in claim 1 which includes adjusting said saturation flow rates by a weather coefficient for reducing said saturation flow rates during inclement weather condition.

25. A method as defined in claim 1 wherein the step of generating a movement-phase matrix, M, includes using data elements from a green-green conflict matrix, G, which indicate conflicting pairs of traffic movements.

26. A method as defined in claim 1 wherein the step of obtaining signal timing parameters for control of signal indicators includes adjusting said optimum green times and said optimum cycle length within limits of said maximum and minimum green times and maximum and minimum cycle lengths to accommodate a common cycle length and to catch up with a planned offset.

27. A method as defined in claim 26 which further includes adjusting said signal timing parameters within said limits in response to real-time detector information.

28. A signal indication switching method for use in controlling traffic signal indicators for control of traffic movement at an intersection, which method includes the following machine-implemented, non-metal, steps, defining the signal status for each movement by a signal status vector, $A_t$, which indicates the remaining green plus intergreen times for green movements, when one or more remaining green plus intergreen times becomes less than a predetermined value, $\delta_t$, creating a zero-one lose vector, $S_1$, in which a data element of 1 indicates that the movement will lose green, creating a zero-one gain vector, $S_g$, in which a data element of 1 indicates the movement to gain green, creating a zero-one remain vector, $S_r$, in which a data element of 1 identifies the movement(s) that will keep the green, determining whether or not the movement identified by the gain vector, $S_g$, should be skipped, if the movement identified by the gain vector, $S_g$, should not be skipped, then determining whether or not the new movement identified by the gain vector, $S_g$, will conflict with the remaining green movement(s), if the movement identified by the gain vector, $S_g$, does not conflict with said remaining green movement(s), then defining new green times for use in the new movement, and employing said new green times in controlling said traffic signal indicators.

29. A method as defined in claim 28 including, checking for traffic arrivals at said intersection during the intergreen period and reexamining the skipping decision to determine whether or not a movement planned to be skipped will not be skipped.

30. A method as defined in claim 28 wherein the step of creating said gain vector, $S_g$, includes taking the outer product of the lose vector, $S_1$, and a transition matrix, P, said transition matrix identifies transitions between movements.

31. A method as defined in claim 28 including determining whether or not the movement identified by said gain vector, $S_g$, conflicts with remaining green movements identified by the remaining vector, $S_r$, by checking said remaining green movements and said movement identified by said gain vector against data elements of a green-green conflict matrix which indicates conflicting pairs of movements.

32. A method as defined in claim 28 wherein the step of determining whether or not the movement identified by the gain vector, $S_g$, should be skipped includes determining whether or not a recall switch for the movement identified by the gain vector $S_g$, is set or not set.

33. A method as defined in claim 28 including, in response to real-time data from traffic detector means responsive to traffic receiving a green signal from said traffic signal indicators, extending green time by adding to remaining green time of the signal status vector, $A_t$.

34. A signal control method for use in a traffic control system which includes a plurality of local controllers for control of traffic signal indicators at a plurality of intersections along an artery within an area and, including a local master controller operatively connected to each of said local controllers, said method comprising at the local controllers, defining local signal timing parameters including maximum, optimum and minimum cycle lengths and maximum, optimum and minimum green times for each movement to be implemented at the associated intersection, computing at the local master controller a common cycle length using said optimum cycle lengths from said local controllers, computing at the local master controller planned offset times for each of the local controllers, at the local controllers, adjusting said local optimum green times and optimum cycle length within limits of said local maximum and minimum green times and maximum and minimum cycle lengths using the common cycle length and the planned offset times to coordinate operation of said traffic signal indicators at said plurality of intersections.

35. A signal control method as defined in claim 34 including further adjusting said local signal timing parameters within said limits in response to real-time detector information.

36. A signal control method as defined in claim 34 wherein the step of defining local signal timing parameters includes selecting said parameters from a time-of-day table.

37. A signal control method as defined in claim 34 wherein the step of defining local signal timing parameters includes computing said local signal timing parameters every traffic control cycle.

38. A signal control method as defined in claim 37 wherein said local signal timing parameters are computed using linear programming methods.

* * * * *